United States Patent
Kim

(10) Patent No.: US 9,256,323 B2
(45) Date of Patent: Feb. 9, 2016

(54) MOBILE TERMINAL AND CONTROLLING METHOD THEREOF

(75) Inventor: Jonghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 14/233,331

(22) PCT Filed: Feb. 3, 2012

(86) PCT No.: PCT/KR2012/000640
§ 371 (c)(1),
(2), (4) Date: Jan. 16, 2014

(87) PCT Pub. No.: WO2013/032076
PCT Pub. Date: Mar. 7, 2013

(65) Prior Publication Data
US 2015/0205399 A1    Jul. 23, 2015

(30) Foreign Application Priority Data

Aug. 26, 2011   (KR) .................. 10-2011-0085994

(51) Int. Cl.
*G06F 3/042* (2006.01)
*H04M 1/02* (2006.01)
(Continued)

(52) U.S. Cl.
CPC .............. *G06F 3/042* (2013.01); *G03H 1/0005* (2013.01); *G03H 1/0443* (2013.01);
(Continued)

(58) Field of Classification Search
CPC . G03H 1/0005; G03H 1/0443; G03H 1/2294; G03H 2001/0061; G03H 2001/0452; G06F 2203/0384; G06F 2203/04108; G06F 3/042

USPC .................................................. 345/156, 173
See application file for complete search history.

(56) References Cited

U.S. PATENT DOCUMENTS

2009/0046140 A1    2/2009  Lashmet et al.
2009/0076766 A1*   3/2009  Fein et al. ..................... 702/150
(Continued)

FOREIGN PATENT DOCUMENTS

EP          1670216 A1    6/2006
KR     2003-0071238 A     9/2003
(Continued)

OTHER PUBLICATIONS

Hariharan, "Optical holography, Principles, techniques and applications," Press Syndicate of the University of Cambridge, Jan. 1, 1991, pp. 64-69 (8 pages total).

*Primary Examiner* — Viet Pham
(74) *Attorney, Agent, or Firm* — Birch, Stewart, Kolasch & Birch, LLP

(57) ABSTRACT

The present invention includes a user input unit, a controller, a holography storing medium configured to record an interference pattern generated by interference of light, a holography output module configured to output a 1st holography image attributed to diffraction between the light applied to the holography storing medium and the interference pattern under the control of the controller, and a sensing unit configured to detect a plurality of recognition based events, wherein if at least one holography function corresponding to each of a plurality of the recognition based events is previously designated via the user input unit and a 1st event among a plurality of the recognition based events is detected via the sensing unit, the controller controls the 1st holography image to be outputted in accordance with a 1st holography function corresponding to the 1st event.

19 Claims, 63 Drawing Sheets

(51) Int. Cl.
*H04M 1/2745* (2006.01)
*H04M 1/725* (2006.01)
*G06F 3/0488* (2013.01)
*G06F 3/01* (2006.01)
*G03H 1/22* (2006.01)
*G03H 1/04* (2006.01)
*G03H 1/00* (2006.01)
*H04M 1/57* (2006.01)

(52) U.S. Cl.
CPC .......... *G03H 1/2249* (2013.01); *G03H 1/2294* (2013.01); *G06F 3/011* (2013.01); *G06F 3/0488* (2013.01); *H04M 1/0272* (2013.01); *H04M 1/2745* (2013.01); *H04M 1/72547* (2013.01); *G03H 2001/0061* (2013.01); *G03H 2001/0452* (2013.01); *G03H 2227/02* (2013.01); *G06F 2203/0384* (2013.01); *G06F 2203/04108* (2013.01); *H04M 1/576* (2013.01)

(56) References Cited

U.S. PATENT DOCUMENTS

| | | | |
|---|---|---|---|
| 2009/0109175 A1* | 4/2009 | Fein et al. | 345/156 |
| 2009/0109176 A1* | 4/2009 | Fein et al. | 345/158 |
| 2009/0109215 A1* | 4/2009 | Fein et al. | 345/419 |
| 2009/0143098 A1 | 6/2009 | Shiono | |
| 2010/0027083 A1* | 2/2010 | Kroll et al. | 359/9 |
| 2010/0046050 A1* | 2/2010 | Kroll et al. | 359/9 |
| 2010/0097439 A1 | 4/2010 | Kroll et al. | |
| 2011/0249087 A1* | 10/2011 | Tsang et al. | 348/40 |

FOREIGN PATENT DOCUMENTS

| KR | 10-0800854 B1 | 2/2008 |
|---|---|---|
| KR | 10-2011-0045686 A | 5/2011 |

\* cited by examiner

MOBILE TERMINAL AND CONTROLLING METHOD THEREOF

TECHNICAL FIELD

The present invention relates to a mobile terminal, and more particularly, to a mobile terminal and controlling method thereof. Although the present invention is suitable for a wide scope of applications, it is particularly suitable for providing a holography user interface.

BACKGROUND ART

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, as a terminal is capable of implementing a holography image, the demand for facilitating a method of manipulating a holography user interface is rising.

DISCLOSURE OF INVENTION

Technical Problem

Accordingly, the present invention is directed to a mobile terminal and controlling method thereof that substantially obviate one or more problems due to limitations and disadvantages of the related art.

An object of the present invention is to provide a mobile terminal and controlling method thereof, by which a further convenient holography user interface may be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a mobile terminal according to the present invention includes a user input unit, a controller, a holography storing medium configured to record an interference pattern generated by interference of light, a holography output module configured to output a 1st holography image attributed to diffraction between the light applied to the holography storing medium and the interference pattern under the control of the controller, and a sensing unit configured to detect a plurality of recognition based events, wherein if at least one holography function corresponding to each of a plurality of the recognition based events is previously designated via the user input unit and a 1st event among a plurality of the recognition based events is detected via the sensing unit, the controller controls the 1st holography image to be outputted in accordance with a 1st holography function corresponding to the 1st event.

Preferably, the mobile terminal may further include a touchscreen, a plurality of the recognition based event may include a shape recognition based event, a docking recognition based event and a sensor recognition based event, the shape recognition based event may be based on an event of inputting a shape via the touchscreen, the docking recognition based event may be based on an event of fixing a location of the mobile terminal over preset duration, and the sensor recognition based event may be based on an event recognized by each of a plurality of sensors included in the sensing unit.

More preferably, the shape inputted via the touchscreen in the shape recognition based event may include a dot, a line and a closed curve shape.

Preferably, the at least one holography function may include comprises at least one of a content setting function for the 1st holography image, a pattern setting function for the 1st holography image and a holography background setting function for the 1st holography image.

More preferably, at least one of a plurality of contents and applications may be set as a content for the 1st holography image through the content setting function.

More preferably, the holography pattern set via the pattern setting function may be determined by at least one of a distance difference between the holography output module and the 1st holography image and a shape of the 1st holography image and each of the distance difference and the shape of the 1st holography image may be variable in accordance with time.

More preferably, the holography pattern set via the pattern setting function may be determined by at least one selected from the group consisting of shift, rotation, color change, size change and flickering of the 1st holography image and each of the shift, the rotation, the color change, the size change and the flicking may be variable in accordance with time.

More preferably, the 1st holography image may be outputted by being included in a 1st region within the holography background through the holography background setting function.

In this case, the controller may partition the 1st region into a plurality of regions by a command inputted via the user input unit and control the 1st holography image to be included in each of a plurality of the regions.

Preferably, the mobile terminal may further include a wireless communication unit, the controller may establish a data path to at least one external device via the wireless communication unit, and the controller may control information on the holography function corresponding to the 1st event to be transmitted to the at least one external device via the established data path.

More preferably, if a plurality of holography functions are set to correspond to the 1st event, the controller may display a 1st list of a plurality of the holography functions on the touchscreen. If a prescribed holography function is selected from the 1st list, the controller may control the 1st holography image to be outputted in accordance with the selected prescribed holography function.

More preferably, if the 1st event is a docking recognition based event, the controller may control a content of the 1st holography image to be set to an activated result of at least one of a plurality of idle applications previously set to correspond to the 1st event. And, a plurality of the idle applications may include an e-frame idle application, a clock idle application, a schedule idle application, an alarm idle application, an illumination idle application and a CCTV idle application.

More preferably, the sensor recognition based event may include a motion recognition event, a specific-pattern touch input recognition event, a fingerprint recognition event, a voice recognition event, an eye-tracking recognition event, a wind recognition event and a specific object recognition event.

In this case, the motion recognition event may be determined in accordance with at least one of an inclination level value of the terminal sensed by the sensing unit, an inclining speed of the terminal sensed by the sensing unit, a moving path of the terminal sensed by the sensing unit, a moving speed of the terminal sensed by the sensing unit, and a count of predetermined section round-trips of the terminal sensed by the sensing unit.

And, in the specific-pattern touch input recognition event, the specific-pattern touch input may include one of a long touch input, a proximity touch input, a long proximity touch input and a double touch input.

Preferably, if the 1st holography image is outputted in accordance with the holography function corresponding to the 1st event and a second event among a plurality of the recognition based events is detected via the sensing unit, the controller may control the 1st holography image to be modified and outputted in accordance with a 2nd holography function corresponding to the 2nd event.

More preferably, the 2nd holography function may include a size setting function, a content setting function, a pattern setting function and a holography background setting function for the 1st holography image.

In another aspect of the present invention, a method of controlling a mobile terminal includes the steps of designating at least one holography function corresponding to each of a plurality of recognition based events detected via a sensing unit, detecting a 1st event among a plurality of the recognition based events via the sensing unit, and outputting a 1st holography image from a holography output module in accordance with a 1st holography function corresponding to the 1st event.

Preferably, a plurality of the recognition based event may include a shape recognition based event, a docking recognition based event and a sensor recognition based event, the shape recognition based event may be based on an event of inputting a shape via the touchscreen, the docking recognition based event may be based on an event of fixing a location of the mobile terminal over preset duration, and the sensor recognition based event may be based on an event recognized by each of a plurality of sensors included in the sensing unit.

Preferably, the at least one holography function may include at least one of a content setting function for the 1st holography image, a pattern setting function for the 1st holography image and a holography background setting function for the 1st holography image.

Advantageous Effects of Invention

Accordingly, the present invention provides the following effects and/or advantages.

First of all, the above-configured mobile terminal according to one embodiment of the present invention may be more conveniently manipulated using a holography user interface.

Secondly, according to the present invention, a user may be provided with a holography function previously designated based on an event recognized by a terminal.

Thirdly, according to the present invention, a holography image provided with a holography pattern effect may be projected.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
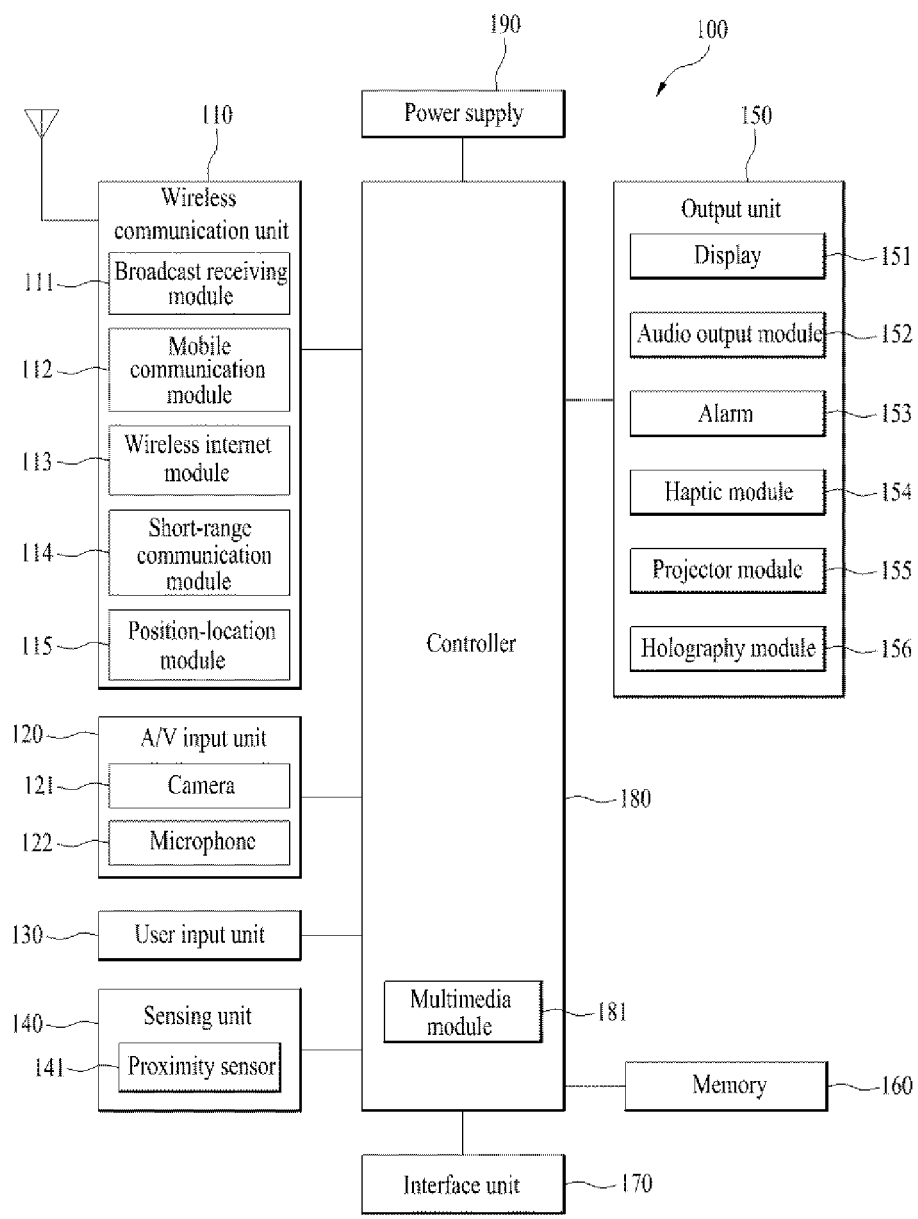
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless interne module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

Therefore, the sensing unit 140 generates a sensing signal by detecting one of motions in various shapes through a location change and a direction change of the mobile terminal 100. And, at least one function can be executed to correspond to the sensing signal in accordance with each of the motions. Moreover, the relation between the motion and the function executed through the corresponding motion can be saved in the memory unit.

And, the sensing unit 140 is able to sense whether a power is supplied by the power supply unit 190, whether an external device is connected to the interface unit 170, and the like. Besides, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

Subsequently, the holography module 156 may include a holography storing medium and a holography output module. And, the holography module 156 may be able to project a holography image externally.

The holography storing medium is the storing medium for recording an interference pattern generated from interference between an applied object wave and a reference wave and may be formed of such a material reacting with light intensity as photopolymer and the like.

In this case, the holography output module applies a reconstructing wave equal to the reference wave to the holography output module and then outputs a holography image generated from the diffraction effect between the applied reconstructing wave and the interference pattern recorded in the holography storing medium, under the control of the controller 180.

A holography image projecting method shall be described in detail with reference to FIGS. 4 to 7 later.

In the above description, the holography storing medium and the holography output module are implemented in a manner of being included together in the holography module 156, which is just exemplary. Alternatively, the holography storing medium and the holography output module may be separately configured and included in the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, in order to support the holography image projection of the holography module 156, information on the holography interference pattern may be saved. In particular, user's voice, application activated result and the like can be externally outputted via the holography module 156 using the information saved in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

Meanwhile, the sensing unit 140 is able to generate a sensing signal by detecting one of motions in various shapes through the location and direction changes of the mobile terminal 100. And, at least one function can be executed to correspond to the sensing signal in accordance with each of the motions. Moreover, the relation between the motion and the function executed through the corresponding motion can be saved in the memory unit 160.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
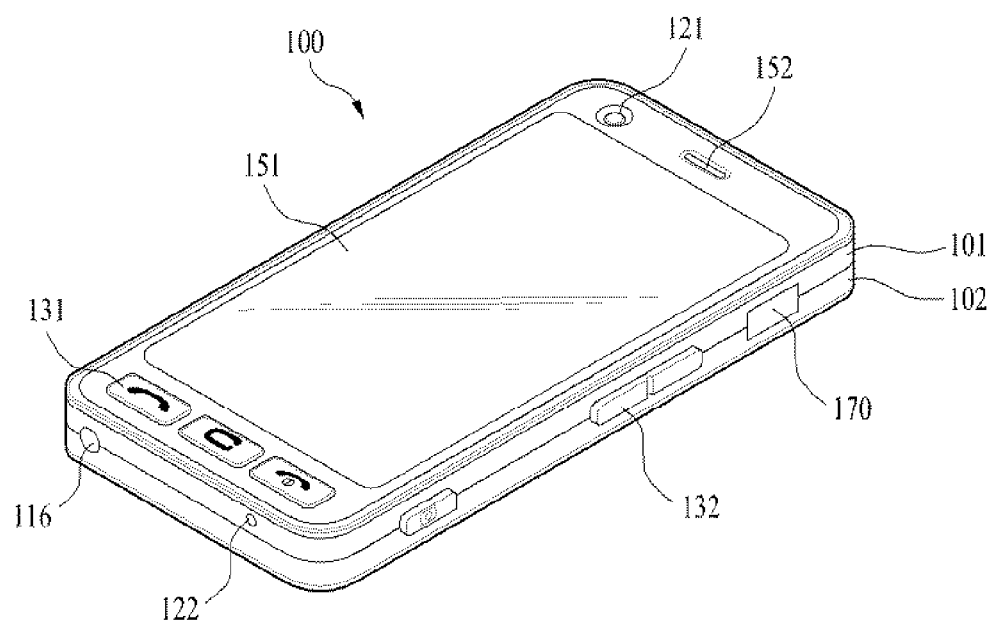
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130, a microphone 122, an interface 170 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be input to the second manipulating unit 132.

Interconnected operational mechanism between the display 151 and the touchpad 135 are explained with reference to FIG. 3 as follows.

Figure 3:
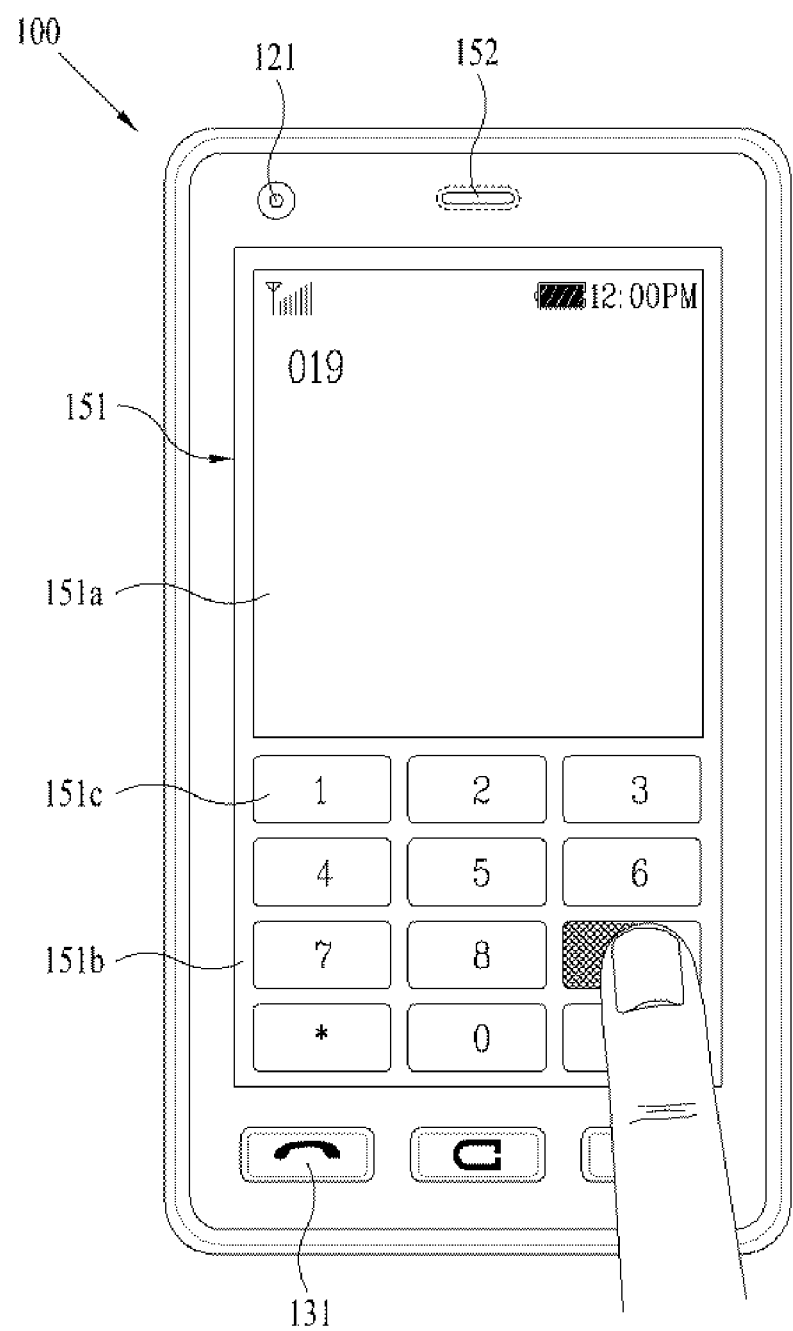
FIG. 3 is a front diagram of a mobile terminal according to one embodiment of the present invention to describe one operating status thereof.

FIG. 3 is a front-view of terminal 100 according to various embodiment of the present invention. Various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is input through a front face of a terminal body. The display 151 is operable through an entire area or by being divided into a plurality of regions. In the latter case, a plurality of the regions can be configured interoperable. For instance, an output window 151*a* and an input window 151*b* are displayed on the display 151. A soft key 151*c* representing a digit for inputting a phone number or the like is outputted to the input window 151*b*. If the soft key 151*c* is touched, a digit corresponding to the touched soft key is output to the output window 151*a*. If the first manipulating unit 131 is manipulated, a call connection for the phone number displayed on the output window 151*a* is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

In the following description, a method of representing a holography image in a mobile terminal and a structure therefor, which are applicable to embodiments of the present invention, are explained as follows.

Prior to the detailed description of holography image, a configuration of a mobile terminal including a holography module 156 is described with reference to FIG. 4.

First of all, the holography module 156 may be installed in the mobile terminal in a manner of being loaded on a front side or backside of the mobile terminal.

FIG. 4 is a diagram of a mobile terminal including a holography module according to one embodiment of the present invention.

Figure 4A:
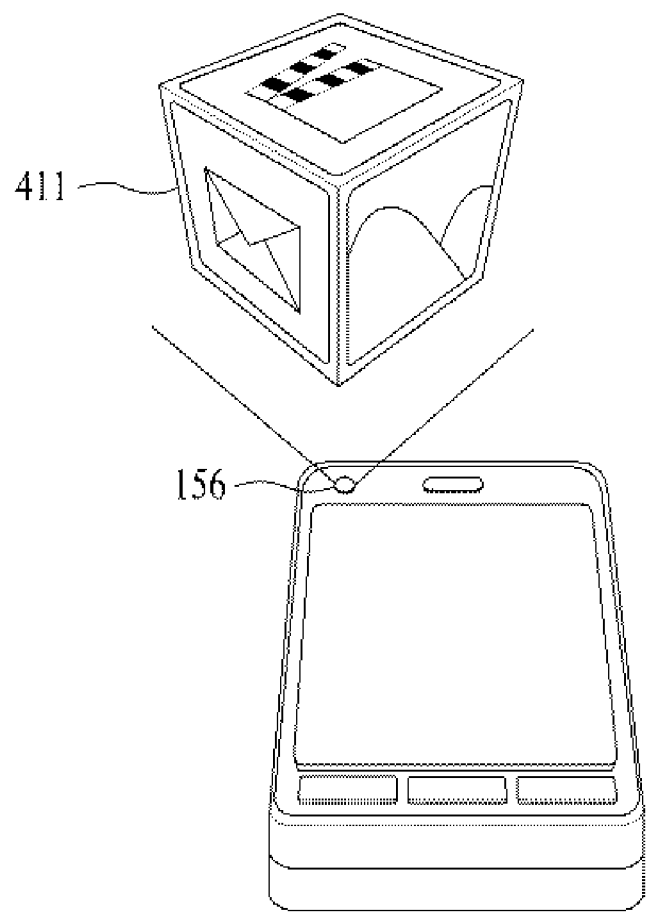
FIGS. 4A-4B are diagrams of a mobile terminal including a holography module according to one embodiment of the present invention.

Referring to FIG. 4A, the holography module 156 is provided to the front side of the mobile terminal. In particular, the holography module 156 may be provided to the front side of the mobile terminal together with the camera 121. And, the holography module 156 may be able to project and display a holography image 411 created under the control of the controller 180.

Figure 4B:
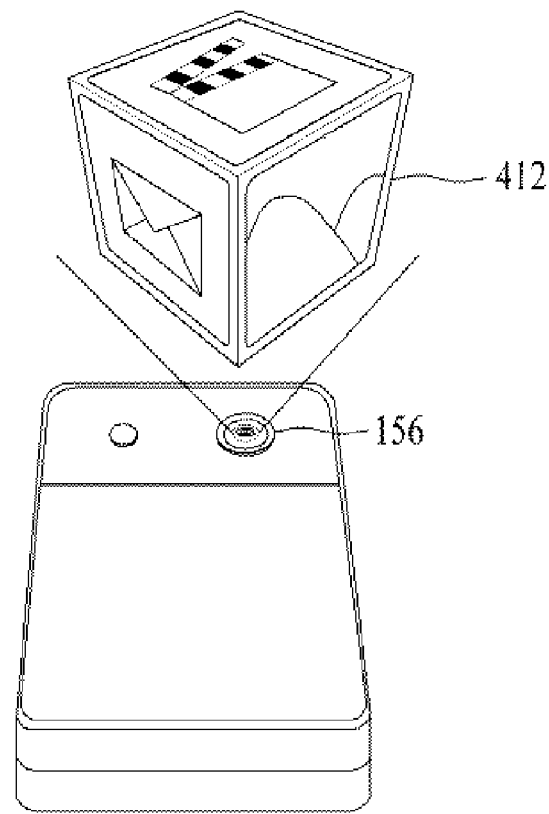

Referring to FIG. 4B, the holography module 156 may be provided to a prescribed portion of the backside of the mobile terminal. In particular, the holography module 156 may be included together with the camera 121. And, the holography module 156 may be able to project and display a holography image 412 created under the control of the controller 180.

The holography images implemented through the holography module 156 may include a planar image and a stereoscopic image both.

In particular, the stereoscopic image implemented through the holography module 156 may be mainly classified into a 2D (2-dimensional) stereoscopic image and a 3D (3-dimensional) stereoscopic image.

Substantially, a 2D stereoscopic image system is a monoscopic system that provides the same image to both eyes. In particular, according to the 2D stereoscopic image system, a polyhedron created using at least one point, at least one line, at least one plane and a combination thereof is placed in a virtual stereoscopic space and an image generated from viewing the placed polyhedron in a specific view is then displayed, under the control of the controller 180.

A 3D stereoscopic image system is a stereoscopic system that provides different images to both eyes, respectively. And, the 3D stereoscopic image system adopts the principle of sensing a 3D effect of an object viewed via bare eyes of a human. In particular, human eyes sense different planar images in viewing the same object due to a distance between both eyes. The sensed different planar images are delivered to a brain through retinas. And, the brain synthesizes the delivered different images together to sense depth and reality of the corresponding stereoscopic image. Although there is a slight difference between humans, binocular disparity attributed to a distance between both eyes enables a 3D effect. Thus, the 3D stereoscopic image system may correspond to a method of displaying an image using this binocular disparity.

Holography image created through the holography module 156 may include both of the planar image and the stereoscopic image. For clarity and convenience of the following description, assume that the holography image may be displayed by the 2D stereoscopic image system, by which the present invention may be non-limited.

In the following description, a method of representing a holography image in a mobile terminal and a structure therefor, which are applicable to embodiments of the present invention, are explained in detail as follows.

First of all, a holography image representing method may be understood as an image displaying method of simultaneously cumulating and playing all informations (i.e., amplitude and phase) on a light (i.e., wave motion), whereas a related art image is a recording of distribution of bright and dark sides of an object.

A holography image representing method is described with reference to FIG. 5 as follows.

Figure 5A:
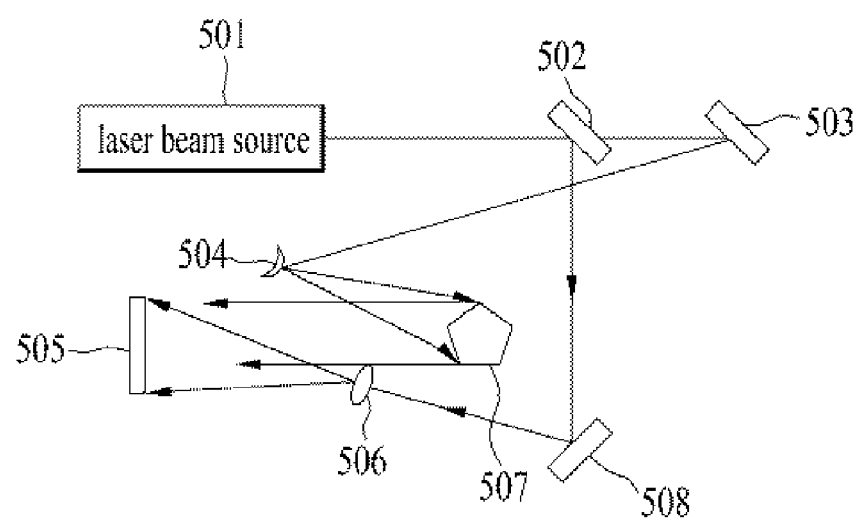
FIGS. 5A-5B are diagrams for explaining holography principle conceptionally.
Figure 5B:
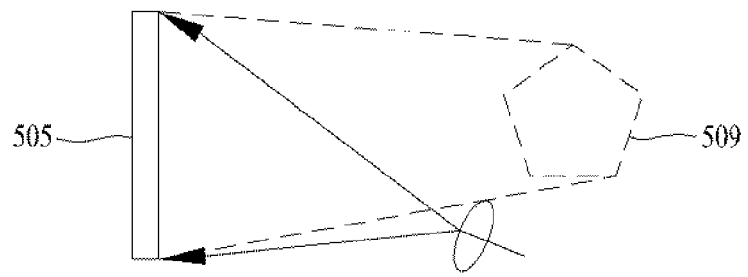

FIG. 5 is a diagram for explaining holography principle conceptionally.

Referring to FIG. 5 (a), a coherent light from a laser beam source 501 is slit into two beams via a splitter 502.

In particular, if one of the two beams is applied to a subject, a surface of the subject reflects the corresponding light. And, this beam will be named an object wave in the following description.

The other beam is diffused through a lens to be directly applied to a front face of a holography photosensitive material 505. And, this beam will be named a reference wave in the following description.

As the object wave and the reference wave cause an interference effect in-between, about 500~1,500 delicate and complicated interference patterns per 1 mm are generated. And, a photo of recording these interference patterns is called a hologram.

Referring to FIG. 5 (b), if such a beam as the generated reference wave is projected on the photosensitive material 505, a light diffracts at a position different from an incident direction of the reference wave in a manner of being affected by the interference patterns. Subsequently, the diffractive lights gather together to form the light initially reflected by the object. Hence, a holography image 509 is projected. In particular, an initial object wave is reconstructed from hologram. And, an image representing method using the reconstructed initial object wave may be named a holography image representing method.

Looking into an inside of a reconstructed wave surface, an object is initially seen as if situated inside. If a viewing point moves, a viewed position of the object changes correspondingly. Moreover, since an original wave surface of the object is reconstructed, it may interfere with a wave surface coming from a slightly modified object.

A holography image representing method may be classified into a transmittive type holography image representing system and a reflective type holography image display system.

(1) Transmittive Type Holography Image Representing System

According to the transmittive type holography image representing system, an image generated from light, which transmits a hologram if applied in rear of the hologram, is observed in front of the hologram. In the transmittive type holography image representing system, an object wave and a reference wave are applied to a photo film in the same direction to generate a holography image. And, the generated holography image is characterized in having clear and bright colors.

(2) Reflective Type Holography Image Displaying System

According to the reflective type holography image displaying system, an image generated from light, which is reflected if applied in front of the hologram, is observed in front of the hologram. In the reflective type holography image displaying system, an object wave and a reference wave are incident on a photosensitive material in directions opposite to each other, respectively. And, the holography image generated by the reflective type holography image displaying system is characterized in having an excellent 3D effect.

The transmittive type holography image representing system and the reflective type holography image displaying system are described in detail with reference to FIG. 6 and FIG. 7 as follows.

FIG. 6 is a diagram for conceptionally explaining a transmittive type holography system.

Figure 6A:
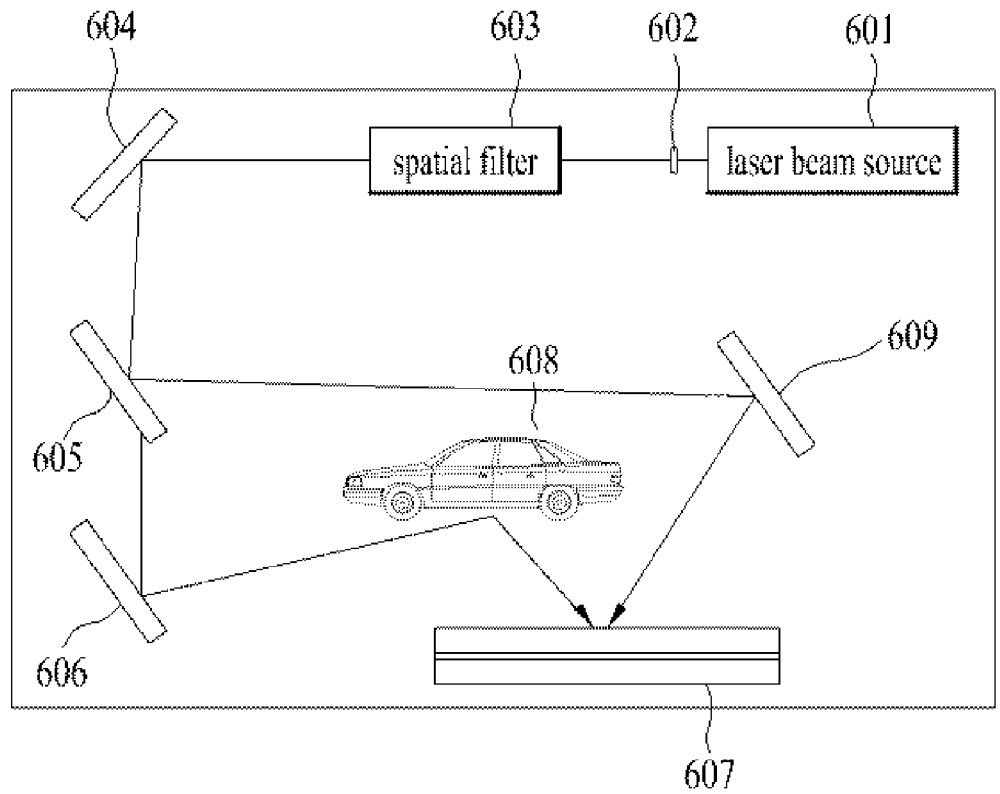
FIGS. 6A-6C are diagrams for conceptionally explaining a transmittive type holography system.

Referring to FIG. 6A, a light from a laser beam source 601 passes through a spatial filter 603 and is then spread as a smooth spherical wave. The spherical wave is split into two beams by a 50:50 beam splitter 605. One of the two beams of the spherical wave illuminates an object 608 to produce an object wave, while the other intactly illuminates a film 607 to produce a reference wave. In doing so, the object wave created from the object 608 illuminates the film 607 as well.

Subsequently, the object and reference waves having illuminated the film 607 cause an interference effect on each other to produce an interference pattern. The interference pattern is then imprinted on the film 607.

Figure 6B:
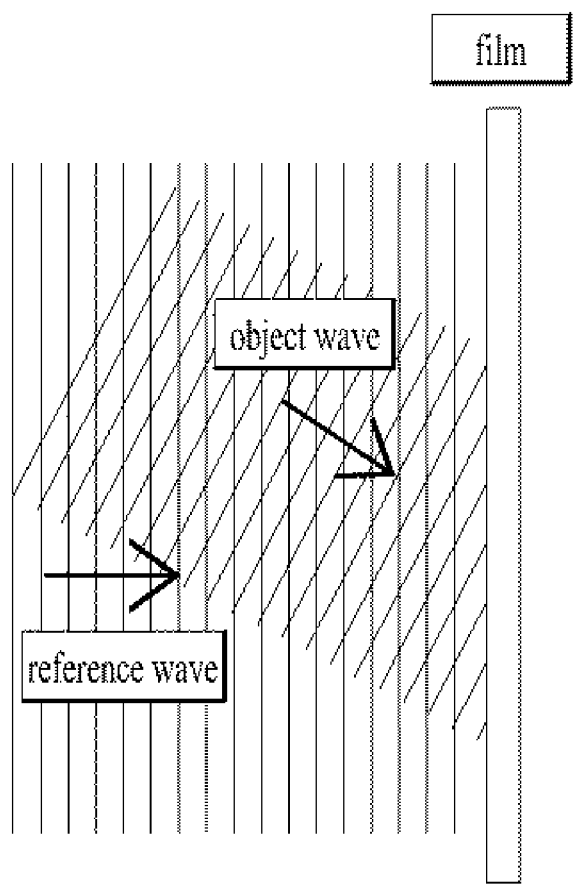

In particular, referring to FIG. 6B, the object wave and the reference wave are projected on the same surface of the film 607 to produce the interference pattern.

Figure 6C:
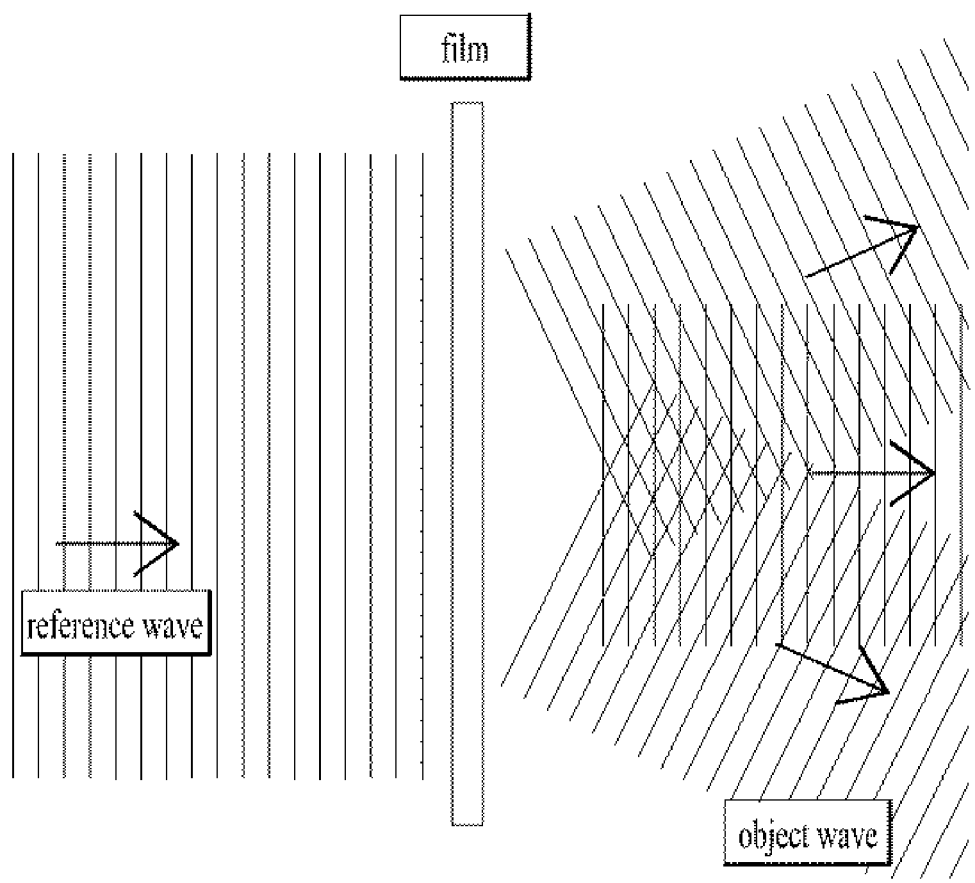

Subsequently, referring to FIG. 6C, if the reference wave is projected on the film 607, an object wave transmits in a direction of a surface opposite to the incident surface of the previous object and reference waves, thereby creating a holography image.

Figure 7A:
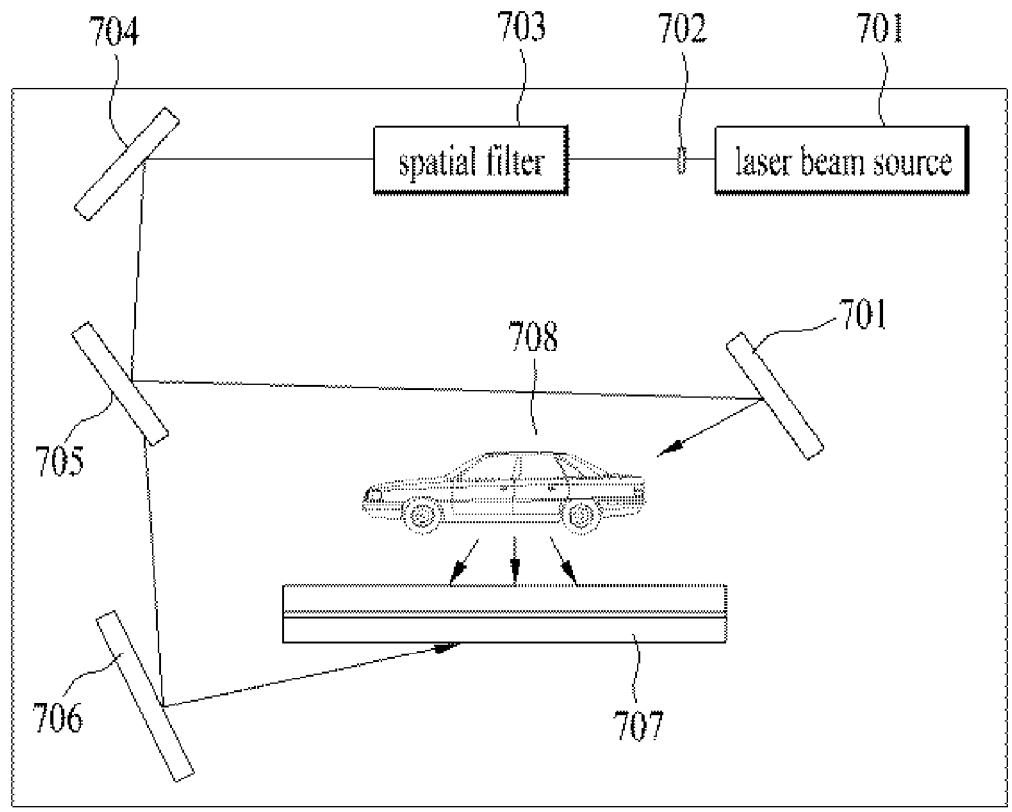
FIGS. 7A-7C are diagrams for conceptionally explaining a reflective type holography system.
Figure 7B:
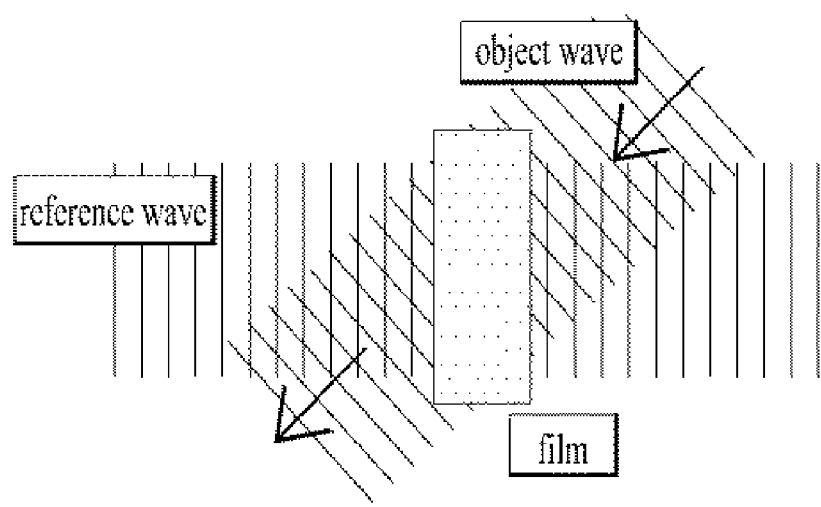
Figure 7C:
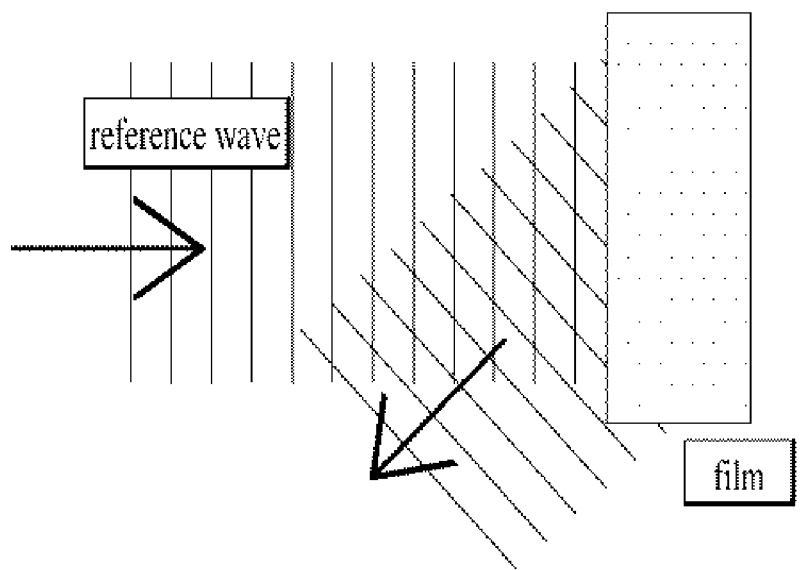

FIG. 7 is a diagram for conceptionally explaining a reflective type holography system.

Referring to FIG. 7A, like FIG. 6A, a light from a laser beam source 701 passes through a spatial filter 703 and is then spread as a smooth spherical wave. The spherical wave is split into two beams by a 50:50 beam splitter 705. One of the two beams of the spherical wave illuminates an object 708 to produce an object wave, while the other intactly illuminates a film 607 to produce a reference wave.

Unlike FIG. 6A, FIG. 7A shows that the reference wave and the object wave illuminate the film 707 in directions opposite to each other, respectively.

In particular, the reference wave is projected on a left surface of the film 707 and the object wave is projected on a right top surface of the film 707. Subsequently, referring to FIG. 7C, if the reference wave is projected on the film, the object wave transmits the film in opposite direction to create a holography image.

In the above descriptions, each of the films 607 and 707 is represented as a holography storing medium and another component capable of creating a holography image by emitting a light to the film is represented as a holography output module in this specification.

As mentioned in the foregoing description, for clarity and convenience of the description of this specification, the holography storing medium and the holography output module are implemented in a manner of being included in the holography module 156, which is just exemplary. Alternatively, the holography storing medium and the holography output module may be included as separate components in the mobile terminal 100.

For clarity and convenience, assume that a mobile terminal mentioned in the following description includes at least one of the components shown in FIG. 1 and that a display unit 151 includes a touchscreen.

Generally, a graphic of an arrow or finger type to point out a specific object or select a menu on the display unit 151 is called a pointer or a cursor.

Specifically, the pointer may be frequently regarded as a finger or a stylus pen for a touch manipulation or the like.

In this specification, in order to clearly discriminate the pointer and the cursor from each other, a graphic displayed on the display unit 151 may be named a cursor, while such a physical means for performing a touch, a proximity touch, a gesture and the like as a finger, a stylus pen and the like may be named a pointer.

As mentioned in the foregoing description, a holography image may include a planar image and a stereoscopic image both. For clarity and convenience of the following description, assume that a holography image is displayed by 2D stereoscopic image system.

Regarding a holography image representing method, the present invention provides a method of setting a holography pattern and representing a holography image in accordance with the set holography pattern.

Prior to the detailed description of a holography pattern, a method of triggering a projection of a holography image is explained as follows.

First of all, it may be able to control a holography image to be displayed in accordance with a user's menu selection in general.

And, a holography image may be displayed only if a prescribed trigger event occurs. In this case, the prescribed trigger may become a target of holography pattern assignment basically provided by a terminal as well as a holography pattern previously set by a user.

A trigger event used for a terminal to display a holography image may be mainly classified into a user-designated event and a system event.

First of all, a user-designated event may mean an event previously set by a user for convenience in utilizing a holography image.

For instance, if a specific event (e.g., an event that a terminal is shifted to a pre-designated location, an event that a pre-designated time is up, an event of reception/transmission of call and/or message, an event of a touch input of a specific pattern, etc.) is activated or a previously set content among a plurality of contents is activated, it may be able to display a holography image without separate manipulation.

In particular, after a user has set up a condition for activating a holography image in a manner of discriminating an environment of utilizing a holography image frequently from an environment not suitable for displaying a holography image, if the condition is met, the holography image may be instantly displayed for user/s convenience.

Secondly, a system event may mean an event related to whether a terminal is in mode of displaying a holography image.

For instance, a holography image may be displayed only if a battery level of a terminal is equal to or higher than a predetermined level, a terminal is still charging, ambient brightness of a terminal is equal or lower than a predetermined level, or the holography image is projected via a holography module in accordance with a type of a terminal.

In particular, in order to prevent power consumed for displaying a holography image to provide another function (e.g., call reception, message reception, internet access, etc.) of a terminal or prevent power from being wasted in displaying a holography image unnecessarily despite an environment in which a user is unable to recognize the holography image, the holography image may be displayed only if a prescribed system event is satisfied.

Yet, the above-mentioned detailed examples of the user-designated event and the system event are just exemplary, by which the present invention may be non-limited.

Particularly, the user-designated event may include any event previously settable for user's convenience in utilizing a holography image. And, the system event may include any event related to whether a terminal is able to display a holography image.

Moreover, details of the user-designated event and the system event may be modified by a user. In particular, through a separate event setting or modifying menu, an event related to a trigger condition may be deleted, added or modified.

Therefore, through the trigger condition, a user is facilitated to display a holography image in an environment having the holography image utilized frequently therein and prevent power from being wasted in displaying the holography image unnecessarily.

FIG. 8 is a diagram for one example of triggering a holography operation based on a location event among user-designated events according to one embodiment of the present invention.

Figure 8A:
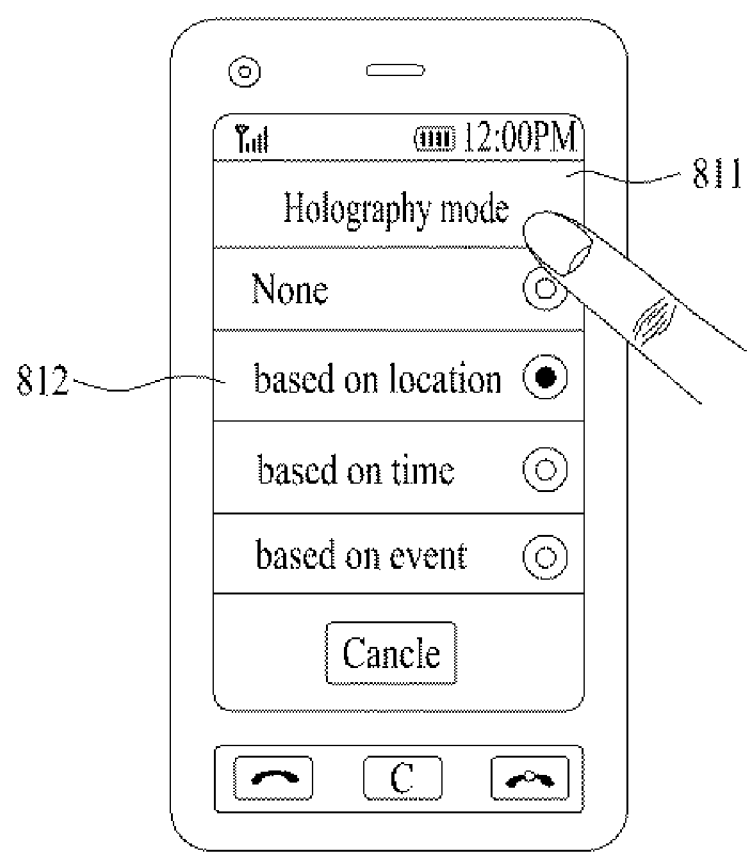
FIGS. 8A-8C are diagrams for one example of triggering a holography operation based on a location event among user-designated events according to one embodiment of the present invention.

Referring to FIG. 8A, a user activates a holography mode 811 and is then able to set a holography image to be displayed based on a location event 812 among user-designated events.

Figure 8B:
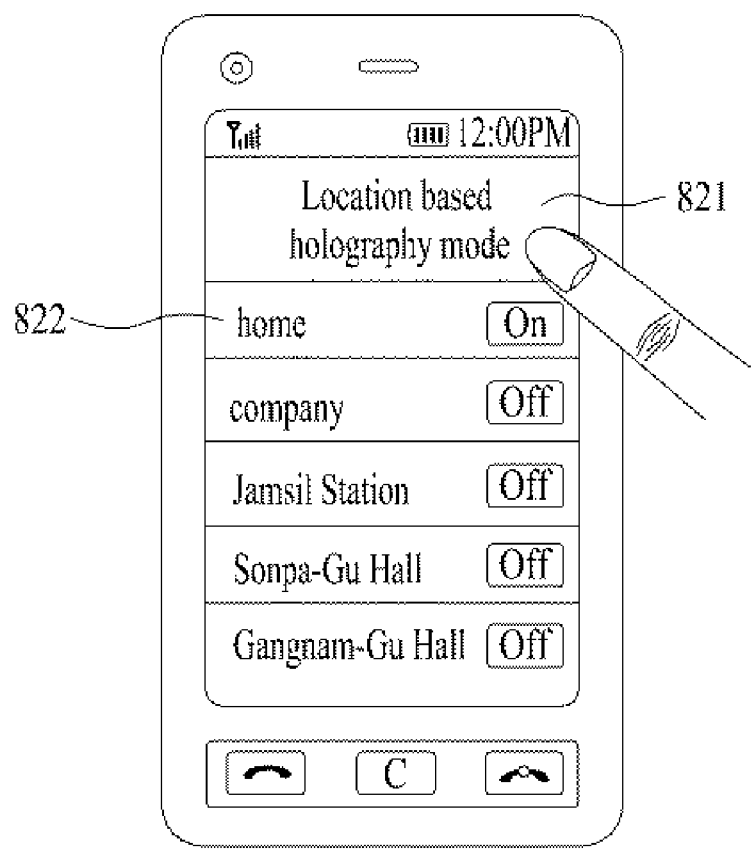
Figure 8C:
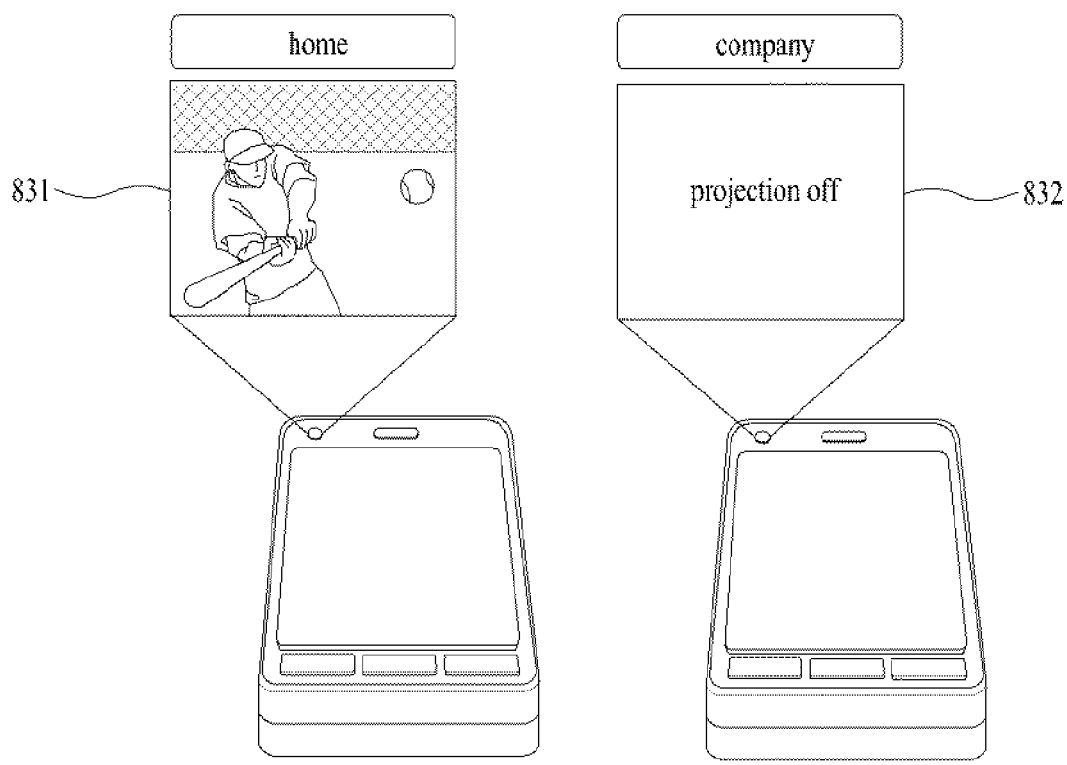

Referring to FIG. 8B, a location 822 for displaying a holography image may be designated in a location based holography mode 821. In FIG. 8B, home, company, Jamsil Station, Sonpa-Gu Hall and Gangnam-Gu Hall are shown as examples of locations to be designated. Optionally, a user may be able to add various locations through a map search application or the like. In doing so, a user sets 'On' for the home only and may set 'Off' for others (i.e., company, Jamsil Station, Sonpa-Gu Hall and Gangnam-Gu Hall).

Thereafter, a holography image may (or may not) be projected in accordance with a location of a terminal. In particular, referring to FIG. 8C, if a location of a terminal is home, a prescribed holography image may be displayed. If a location of a terminal is company, a holography image 832 is not projected.

A method of triggering a holography operation based on a time event is described with reference to FIG. 9 as follows.

FIG. 9 is a diagram for one example of triggering a holography operation based on a time event among user-designated events according to one embodiment of the present invention.

Figure 9A:
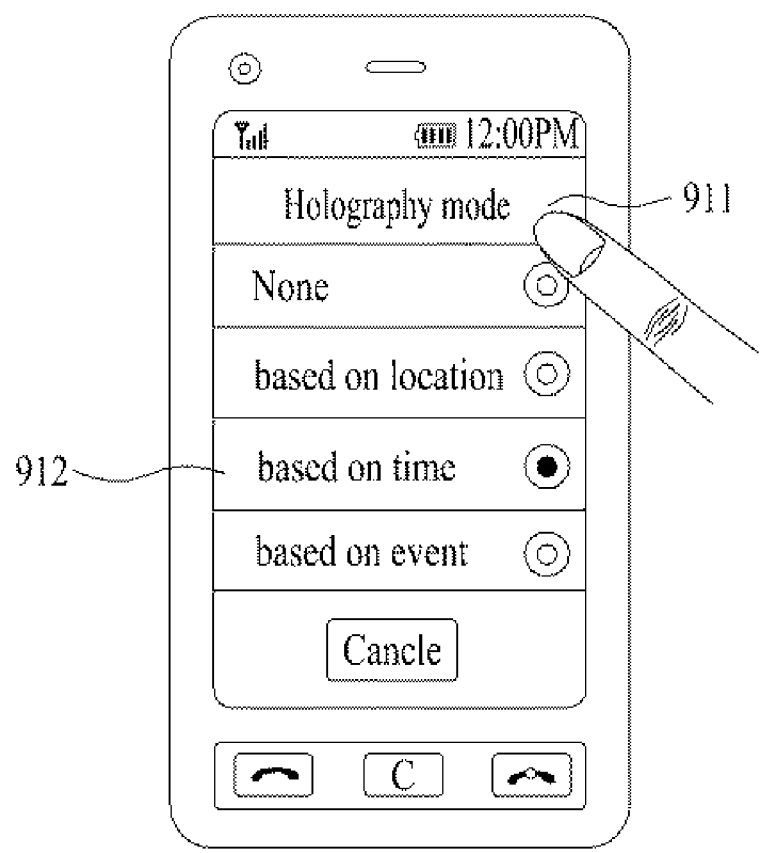
FIGS. 9A-9B are diagrams for one example of triggering a holography operation based on a time event among user-designated events according to one embodiment of the present invention.

Referring to FIG. 9A, a user activates a holography mode 911 and is then able to set a holography image to be displayed based on a time event 912 among user-designated events.

Figure 9B:
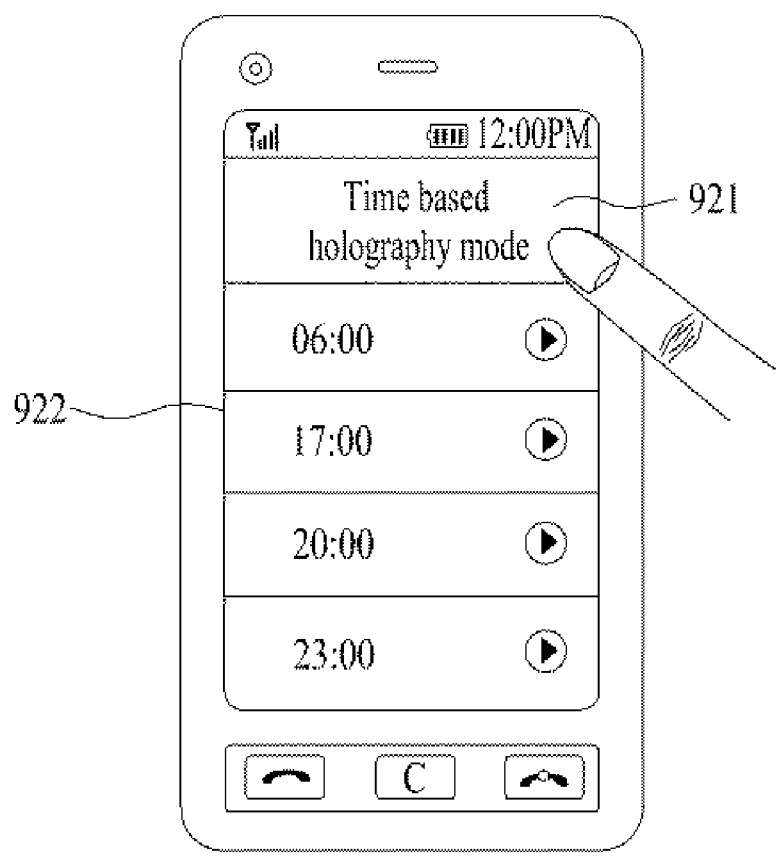

Referring to FIG. 9B, a time 922 for displaying a holography image may be designated in a time based holography mode 921. FIG. 9B exemplarily shows that a time may be set to 06:00, 17:00, 20:00 and 23:00. Alternatively, a time may be set to such a unit as a time range (e.g., 09:00~12:00), a time zone (e.g., morning, noon, evening, night, dawn, etc.), a weekday (e.g., Monday, Tuesday, Wednesday, etc.), a month (e.g., January, February, March, etc.), a season (e.g., Spring, Summer, Fall, and Winter) and the like as well as a specific time.

In doing so, a user may be able to set a holography image to be displayed at 06:00, 17:00, 20:00 and 23:00.

Thereafter, a holography image may (or may not) be projected. In particular, the holography image will be displayed at the designated time (i.e., 06:00, 17:00, 20:00 and 23:00) and may not be displayed for the rest of time.

Meanwhile, a holography image according to one embodiment of the present invention may be displayed in accordance with a set holography pattern.

In this case, the holography pattern means that a holography image projected via the holography module 156 is changed into a preset pattern in accordance with a time so as to be provided to a user.

The holography pattern may be set in various ways as follows.

First of all, it may be able to set a holography pattern in a manner of varying a distance difference between a holography output module and a holography image in accordance with time.

In particular, as the distance difference between the holography output module 156 and the holography image is changed in accordance with time, the holography image projected via the holography module 156 may be shifted upward and downward, thereby enabling a setting of a prescribed holography pattern.

It may be able to set a holography pattern in a manner of varying a shape of a holography image projected by the holography module 156.

For instance, the controller 180 controls a holography image projected by the holography module 156 to have a circular shape in the first time and then controls the pattern of the holography image to be changed into a rectangular shape. Thus, as the shape of the holography image is changed into various forms in accordance with time, a setting of the holography pattern is enabled.

It may be able to apply a method of shifting or rotating a holography image projected by the holography module 156 in right or left direction.

In particular, while a distance difference between a holography module and a holography image is constantly maintained, it may be able to set a holography pattern in a manner of moving or rotating the projected holography image in right and left directions in accordance with time or rotating the projected holography image by moving it in right and left directions.

It may be able to set a holography pattern in a manner of modifying a color or size of a projected holography image in accordance with time or controlling a holography image to flicker. And, it may be able to set a holography pattern in a manner of controlling at least one of projection brightness, play frequency, illumination, vibration feedback, sound insertion, image insertion, repetitive projection and the like.

Although the above description is based on the assumption that a holography pattern is set by an individual factor, it may be able to set a holography pattern by a plurality of factors.

For instance, it may be able to set a holography pattern in a manner of moving an rotating a projected holography image in left and right directions by changing a distance difference between the holography module 156 and a holography image in accordance with time.

The above description is made on the assumption that a holography pattern is set for a whole holography image, which is just exemplary. Optionally, it may be able to apply a holography pattern to a prescribed portion of the holography image.

In the following description, a holography pattern set for a holography image is explained in detail with reference to FIGS. 10 to 12.

First of al, a holography pattern may be set in a manner of adjusting a distance difference between a holography image and a terminal.

In particular, a holography pattern may be controlled to display a pattern of moving a projected holography image upward and downward by increasing or decreasing a distance difference between a holography image and a terminal in accordance with time.

This is described with reference to FIG. 10 as follows.

FIG. 10 is a diagram for one example of setting a holography pattern by adjusting a distance difference between a holography image and a terminal according to one embodiment of the present invention.

Figure 10A:
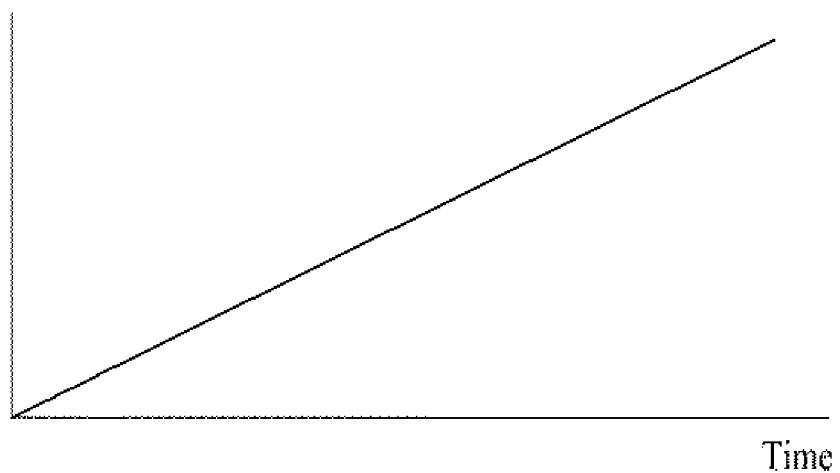
FIGS. 10A-10B are diagrams for one example of setting a holography pattern by adjusting a distance difference between a holography image and a terminal according to one embodiment of the present invention.

Referring to FIG. 10A, a distance difference between a holography image and a terminal is set to increase in proportion to time.

Figure 10B:
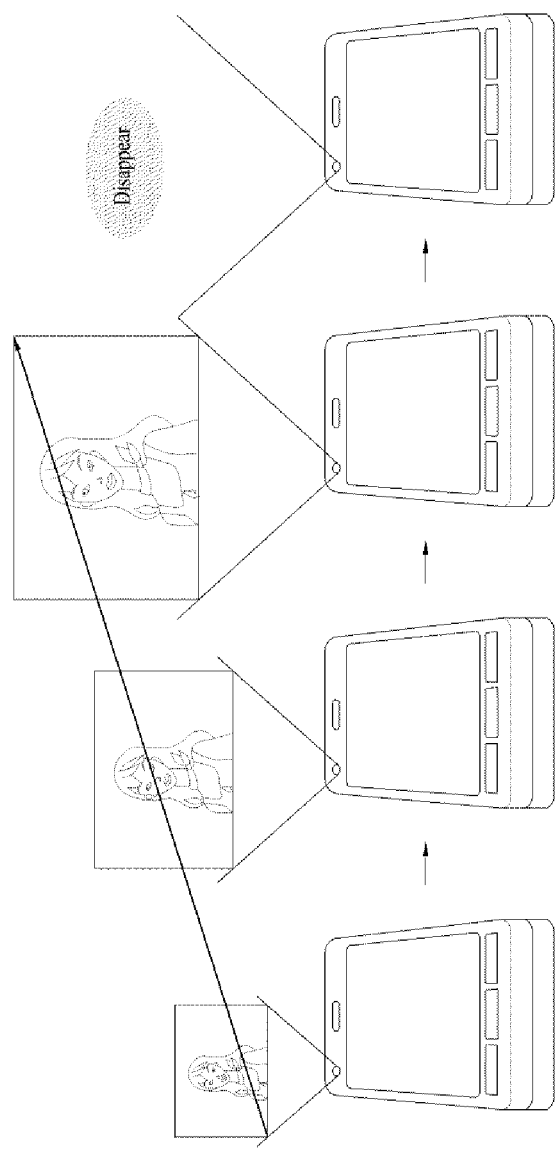

Referring to FIG. 10B, a holography image projected from a terminal moves upward by getting distant from the terminal as time goes by. If the total time set in FIG. 10A expires, the projected holography image disappears.

Hence, by adjusting a distance difference between a holography image and a terminal, it may be able to form a pattern of moving a projected holography image upward and downward.

It may be able to control a holography pattern to be set by changing a projected shape of a holography image.

In particular, by moving an image projected by the holography module 156 in right and left directions, rotating the projected image, or changing a size of the projected image, it may be able to change a shape of a projected holography image.

In the above description, a holography pattern is formed by moving or rotating an image, which is exemplary. Alternatively, it may be able to form a holography pattern in a manner of changing a displayed shape by maintaining a same distance difference between a terminal and a projected holography image.

This is described with reference to FIG. 11 as follows.

FIG. 11 is a diagram for one example of setting a holography pattern by modifying a holography projected shape according to one embodiment of the present invention.

Figure 11A:
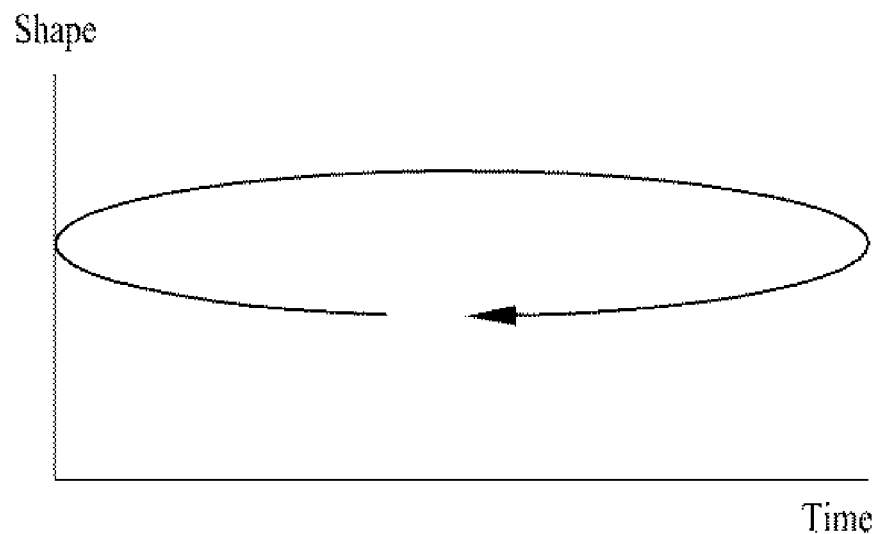
FIGS. 11A-11B are diagrams for one example of setting a holography pattern by modifying a holography projected shape according to one embodiment of the present invention.

Referring to FIG. 11A, a projected holography image is set to rotate by maintaining the same distance from a terminal.

Figure 11B:
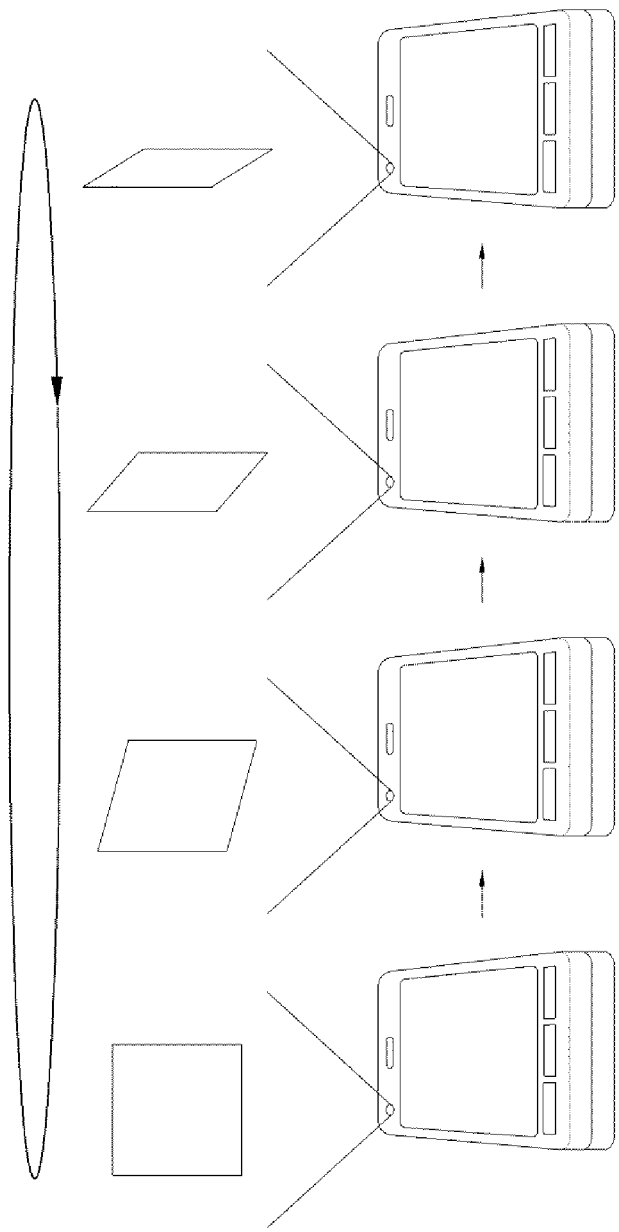

Accordingly, referring to FIG. 11B, the image projected from the terminal rotates in accordance with elapse of time by maintaining the same distance difference from the terminal.

Moreover, it may be able to set a holography pattern by changing a distance difference between a holography image and a terminal and a shape of a projected holography image together.

In particular, it may be able various kinds of holography patterns by changing a distance difference between a holography image and a terminal in accordance with time and also changing a shape of the holography image.

This is described with reference to FIG. 12 as follows.

FIG. 12 is a diagram for one example of setting a holography pattern by adjusting a distance difference and a holography projected shape according to one embodiment of the present invention.

Figure 12A:
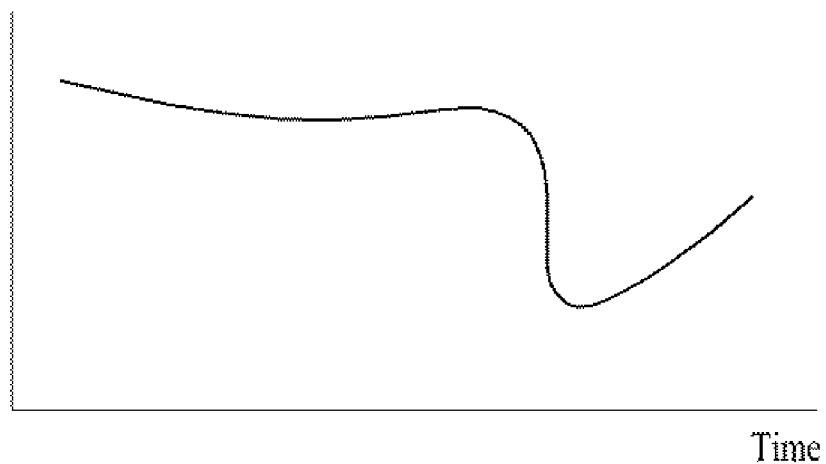
FIGS. 12A-12B are diagrams for one example of setting a holography pattern by adjusting a distance difference and a holography projected shape according to one embodiment of the present invention.
Figure 12A:
Figure 12A:
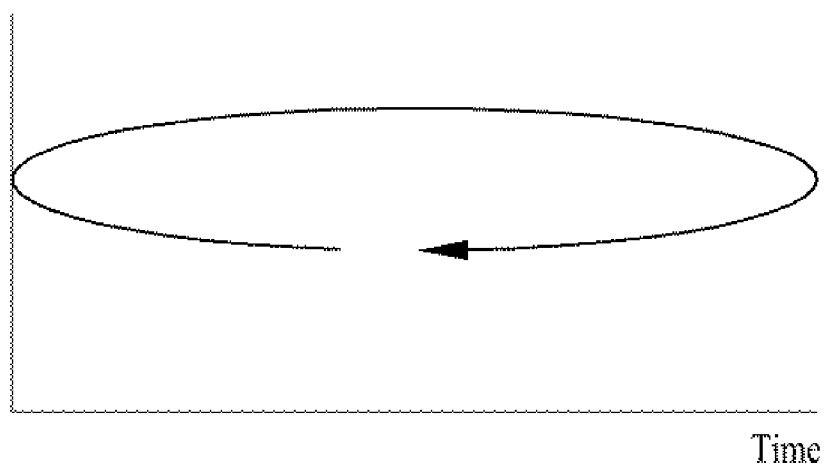

Referring to FIG. 12A, a distance difference between a holography image and a terminal is set to be maintained constantly, decreased and then increased in accordance with time. And, assume that the holography image is projected by rotating.

Figure 12B:
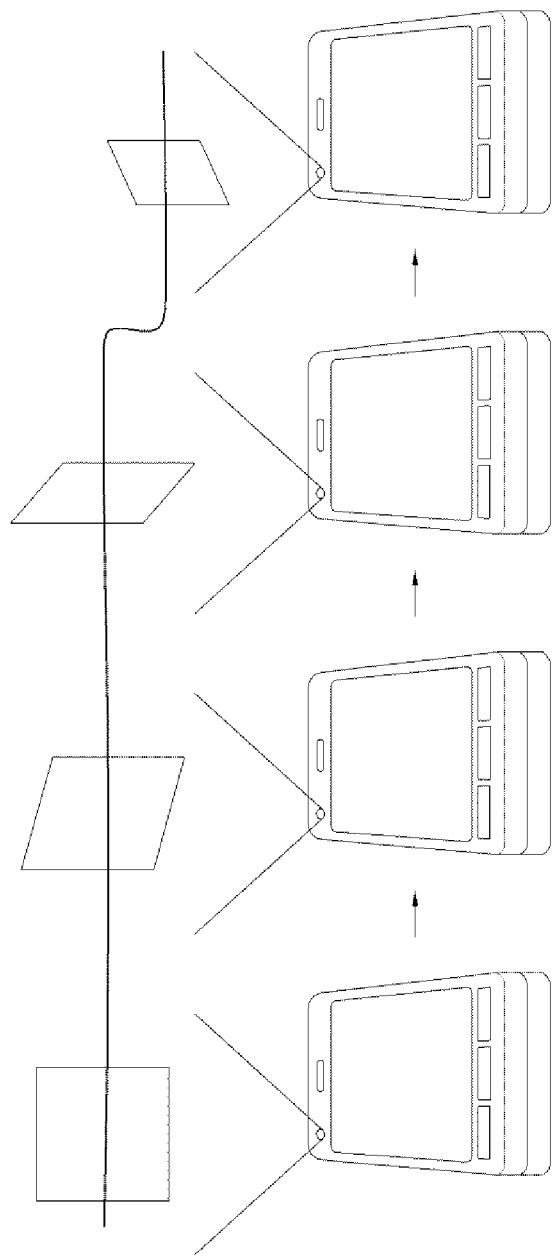

Accordingly, referring to FIG. 12B, a holography image projected by the holography module 156 is displayed by maintaining a distance difference from a terminal, a distance difference between the holography image and the terminal is decreased and then increased, while the holography image keeps being rotated and projected.

Therefore, as the holography image is moving and rotating simultaneously, it may be able to provide a user with various effects.

Meanwhile, according to one embodiment of the present invention, previously designated holography function is activated with ease based on an event recognized by a terminal.

In particular, after holography functions have been set in advance to correspond to a plurality of events, respectively, if a terminal recognizes that one of a plurality of the events has occurred using the sensing unit 140 or the like, the holography function corresponding to the recognized event may be instantly activated.

This is described in detail with reference to FIG. 13 as follows.

Figure 13:
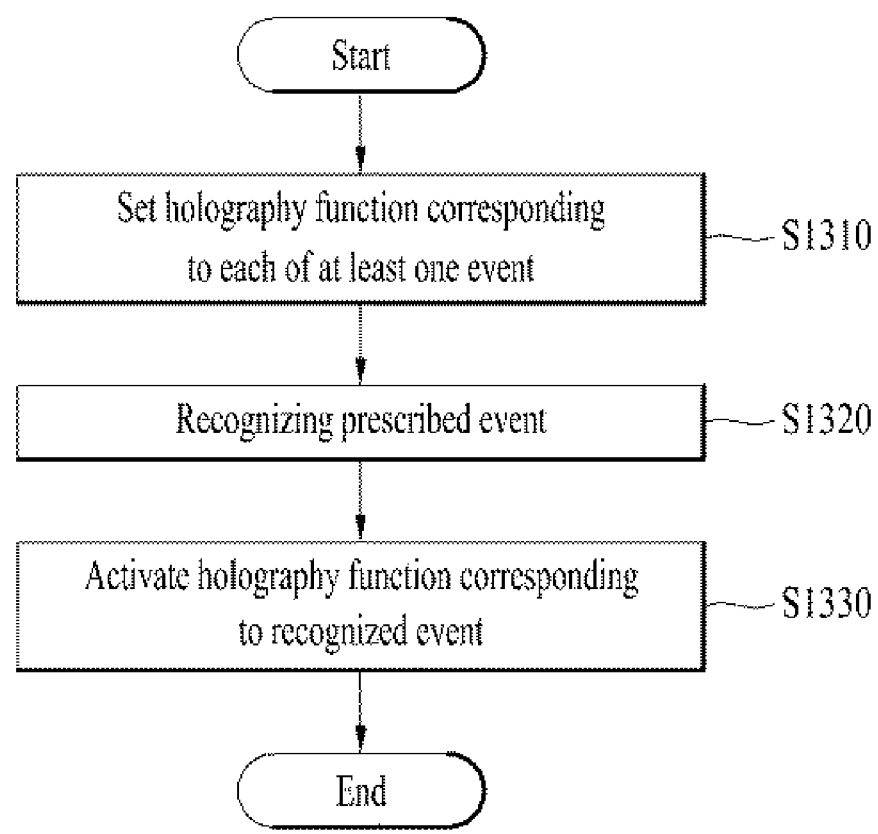
FIG. 13 is a flowchart for one example of activating a holography function previously set based on an event recognized by a terminal according to one embodiment of the present invention.

FIG. 13 is a flowchart for one example of activating a holography function previously set based on an event recognized by a terminal according to one embodiment of the present invention.

Referring to FIG. 13, a user may be able to set a holography function for a terminal to correspond to each of at least one event [S1310].

In this case, each of the at least one event corresponding to the set holography function occurs based on recognition by the terminal.

Recognition based events may include a shape recognition based event, a docking based event and a sensor recognition based event.

First of all, the shape recognition based event is based on a shape recognized via a touchscreen. In particular, the shapes recognized via the touchscreen may include a point, a line, a closed curve shape and the like, each of which is implemented through a touch input. In more particular, the closed curve shape may include one of a straight line, a line bent at a prescribed angle, a hybrid form of branch and curved lines, and the like.

For instance, the closed curve shape may include one of a circle, a triangle, a quadrangle, a pentagon, a diamond shape and the like and may be implemented in various ways in accordance with user manipulations. And, an input direction of a closed curve line may include either a clockwise direction or a counterclockwise direction.

The shape recognized via the touchscreen may include a shape through a 3D (3-dimensional) proximity touch input as well as a shape through a 2D (2-dimensional) contact touch. For instance, the proximity sensor 141 detects a presence or non-presence of an object approaching a prescribed detecting surface or an object existing in the vicinity using an electromagnetic field force or infrared without mechanical contact. Hence, the proximity sensor 141 may be able to recognize a prescribed shape in 3D by sensing a proximity touch in close distance or a proximity touch pattern (e.g., proximity touch distance, proximity touch direction, proximity touch speed, proximity touch position, proximity touch moving state, etc.) without a direct contact between the touchscreen and a pointer.

Secondly, the docking based event may mean an event that a terminal is installed at a prescribed position to achieve prescribed purpose. In particular, the docking based event may include a plurality of events, in each of which a terminal should be mounted and fixed over predetermined duration to achieve a prescribed purpose. For instance, a terminal may be mounted on and fixed to a charging device for a charging. For another instance, a terminal may be installed at and fixed to a prescribed portion of a car to play a role as a navigation system.

Thirdly, the sensor recognition based event may be based on an event recognized via the sensing unit 140.

The sensor recognition based event may include one of an event in accordance with motion or inclination variation of a terminal based on a gyro-sensor, an event in accordance with a touch input of a specific pattern, an event in accordance with fingerprint recognition, an event in accordance with voice or speech recognition, an event in accordance with eye-tracking recognition, an event in accordance with wind recognition, an event in accordance with an object identified via keyword or iris recognition, and the like.

In particular, since a gyro-sensor is capable of recognizing the variation of motion or inclination of a terminal, an event in accordance with a count or force of motion of shaking a terminal by a user, an event in accordance with an angle or force of inclining a terminal by a user and the like may be included in the sensor recognition based events.

The sensor recognition based event may include a touch input of a specific pattern recognized by the sensing unit 140. For example, the touch input of the specific pattern may include one of a user's touch to a partial region of a closed curve of a mobile terminal, a user's touch input of holding a touch area exceeding a predetermined region of a touchscreen in the palm of user's hand and the like.

For another example, the touch input of the specific pattern may include one of a long touch to a prescribed region on a touchscreen, a proximity touch to a prescribed region on a touchscreen, a long proximity touch to a prescribed region on a touchscreen, a multi-touch to a prescribed region on a touchscreen, and the like.

An event may be changed in accordance with which one of a plurality of user's fingerprints is recognized by the sensing unit 140. In particular, since a thumb, an index finer, a middle finger, a ring finger and a little finger of a user differ from each other in fingerprint, it may be able to set an event in accordance with a fingerprint of each of the fingers. Alternatively, it may be able to set an event in accordance with a different fingerprint of each user.

In case that voice is recognized via the sensing unit 140, the recognized voice is analyzed. And, each of the analyzed voice may be set to become an event.

An event in accordance with eye-tracking recognition may be utilized as an event. In particular, after a terminal has recognized eye-tracking of a user, a count of user's eye blinks or a pattern of user's eye blinks may be set to become an event.

As an event in accordance with wind recognition, a force of wind blown by a user or a pattern of wind blown by a user may be set to become an event.

An event in accordance with an object identified via keyword or iris recognition may be utilized. In this case, the keyword may include one of a specific character, a face of a specific object and the like. In particular, if it is recognized that a specific object is included in a plurality of objects displayed on a display unit using the iris or keyword recognition, it may become an event.

As mentioned in the foregoing description, the recognition based event may be categorized into a shape recognition based event, a docking based event and a sensor recognition based event.

In the following description, a holography function previously settable to correspond to each recognition based event is explained in detail.

In this case, the holography function may mean that a projected holography image or a holography pattern is determined.

First of all, a target to be projected as a holography image via the holography module 156 may include one of a plurality of contents or may include one of an activated result of an application, a holography background image and the like.

In particular, a plurality of the contents may include text contents, image contents and video contents. If a prescribed one of a plurality of the contents is previously designated to be activated in accordance with a recognized event, the designated content may be activated and projected as a holography image.

Alternatively, if a prescribed one of a plurality of applications is previously designated to be activated in accordance with a recognized event, an activated result of the designated application may be projected as a holography image.

The holography background image is to designate a holography background of a holography image, which is projected or to be projected, via a recognized event. For instance, in case that a holography background of a circular shape is previously set in association with a recognized image, a holography image will be projected in a manner of being included in the holography background of the circular shape.

As mentioned in the foregoing description, the holography pattern may mean that a holography image changes into a previously set pattern in accordance with time and is then provided to a user. In particular, in case that a specific holography pattern is set in association with a recognized event, a holography image will be projected in accordance with the set holography pattern.

Referring now to FIG. 13, after the holography function corresponding to each of the at least one event has been set, a prescribed one of the set events may be recognized by the terminal [S1320].

If the prescribed event is recognized, the controller 180 activates the holography function corresponding to the recognized event [S1330].

Therefore, a user may be able to conveniently activate various holography functions through preset recognition based events.

In the following description, detailed embodiments of the shape recognition based event, the docking based event and the sensor recognition based event are explained in detail with reference to the accompanying drawings regarding the recognition based events.

First of all, a detailed embodiment of a shape recognition based event is described.

As mentioned in the foregoing description, a shape recognition based event is based on a shape recognized via a touchscreen. In particular, using a dot, line, a closed curve shape and the like, each of which may be implemented by a touch input, it may be able to set or configure a shape recognition based event.

In this case, the shape recognized via the touchscreen may include a shape configured by a 3D (3-dimensional) proximity touch input as well as a shape configured by a general 2D (2-dimensional) contact touch input.

FIG. 14 is a diagram for one example of recognizing a shape in a shape recognition based event according to one embodiment of the present invention.

Figure 14A:
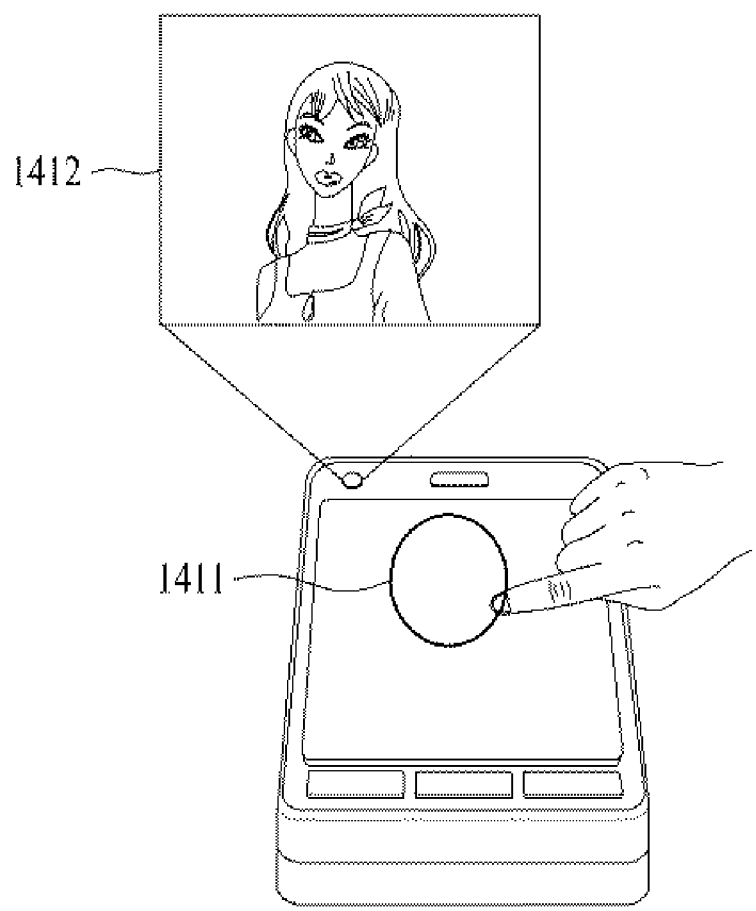
FIGS. 14A-14B are diagrams for one example of recognizing a pattern in a shape recognition based event according to one embodiment of the present invention.

Referring to FIG. 14A, a circular shape 1411 is inputted via a 2D contact touch input. The controller 180 is then able to control a holography image 1412 to be projected to correspond to the circular shape 1411.

Figure 14B:
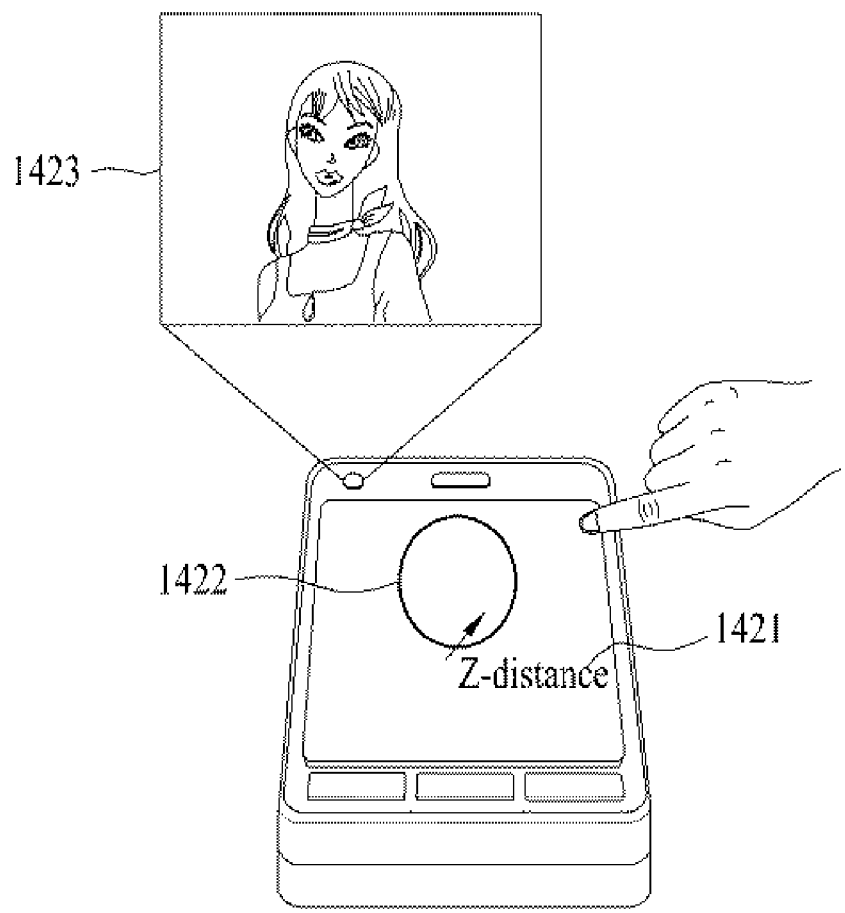

Referring to FIG. 14B, a circular shape 1422 is inputted via a 3D proximity touch input using Z-axis 1412 as well as X-axis and Y-axis. The controller 180 is then able to control a holography image 1423 to be projected to correspond to the circular shape 1422.

Therefore, it may be able to implement a shape recognition based event using a 3D proximity touch input as well as a general 2D contact touch input.

A holography function settable to correspond to a shape recognition based event may include a projected holography image or a holography pattern.

A target to be projected as a holography image may include one of a plurality of contents or one of an activated result of an application, a holography background image and the like.

In this case, a plurality of the contents may include texts, images, video contents and the like.

FIG. 15 is a diagram for one example of activating a content based on a shape recognition based event according to one embodiment of the present invention.

In FIG. 15, assume that an image content is set to correspond to a shape recognition based event.

Figure 15A:
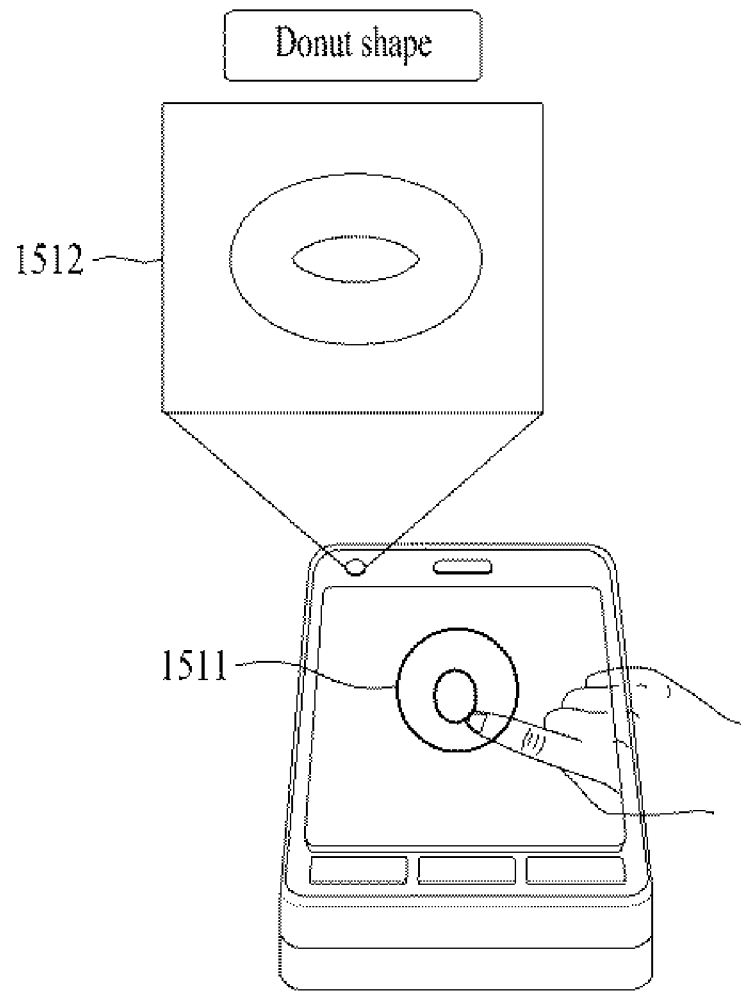
FIGS. 15A-15B are diagrams for one example of activating a content based on a shape recognition based event according to one embodiment of the present invention.

Referring to FIG. 15A, a 1st shape 1511 having a large circle with a small circle contained therein may be inputted by a user using a touch. If the 1st shape 1511 is inputted, the controller 180 may control the holography module 156 to project a donut image content 1512 configured to correspond to the 1st shape 1511.

Figure 15B:
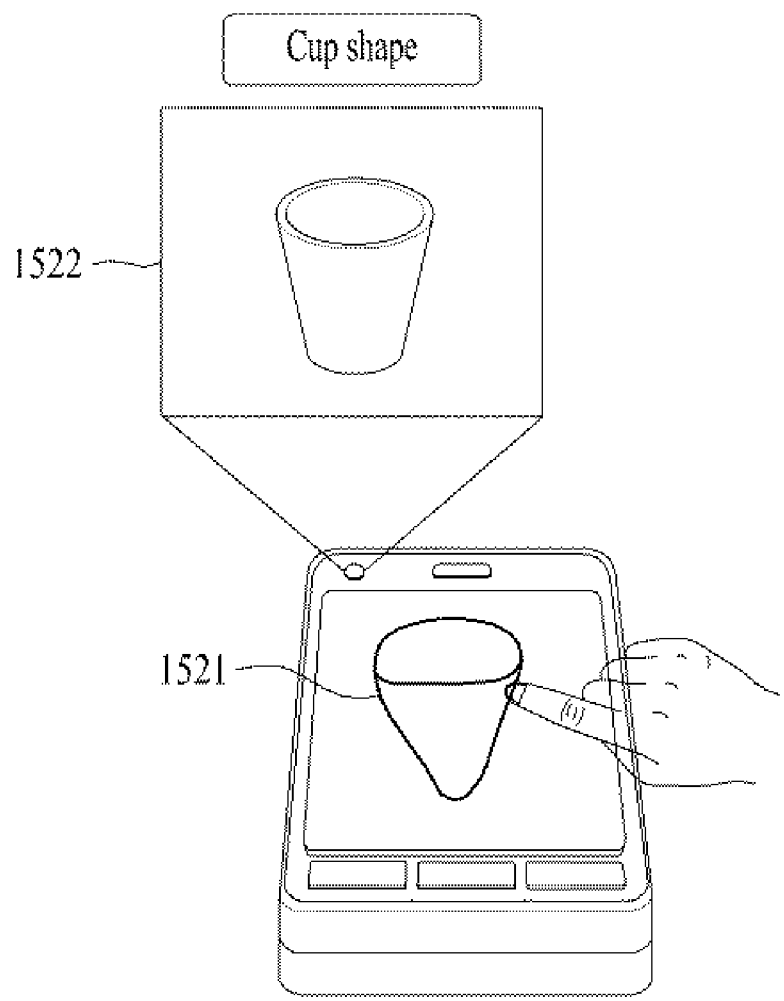

Referring to FIG. 15B, a user may input a 2nd shape 1521 via a touchscreen. If the 2nd shape 1521 is inputted, the controller 180 may control the holography module 156 to project a cup image content 1522 configured to correspond to the 2nd shape 1521.

In doing so, a plurality of image content candidates (not shown in the drawing) corresponding to the 1st/2nd shape 1511/1521 may be displayed on the touchscreen.

For instance, if the 1st shape 1511 is inputted, the controller 180 displays a list of a donut image content, a globe image content and a clock image content on the touchscreen and may control the image content selected by a user selection to be projected as a holography image.

Therefore, a user may enable an image content to be projected as a holography image based on a shape recognition based event.

Meanwhile, a target to be projected as a holography image may include an activated result of a specific application.

FIG. 16 is a diagram for one example of activating a specific application based on a shape recognition based event according to one embodiment of the present invention.

Figure 16A:
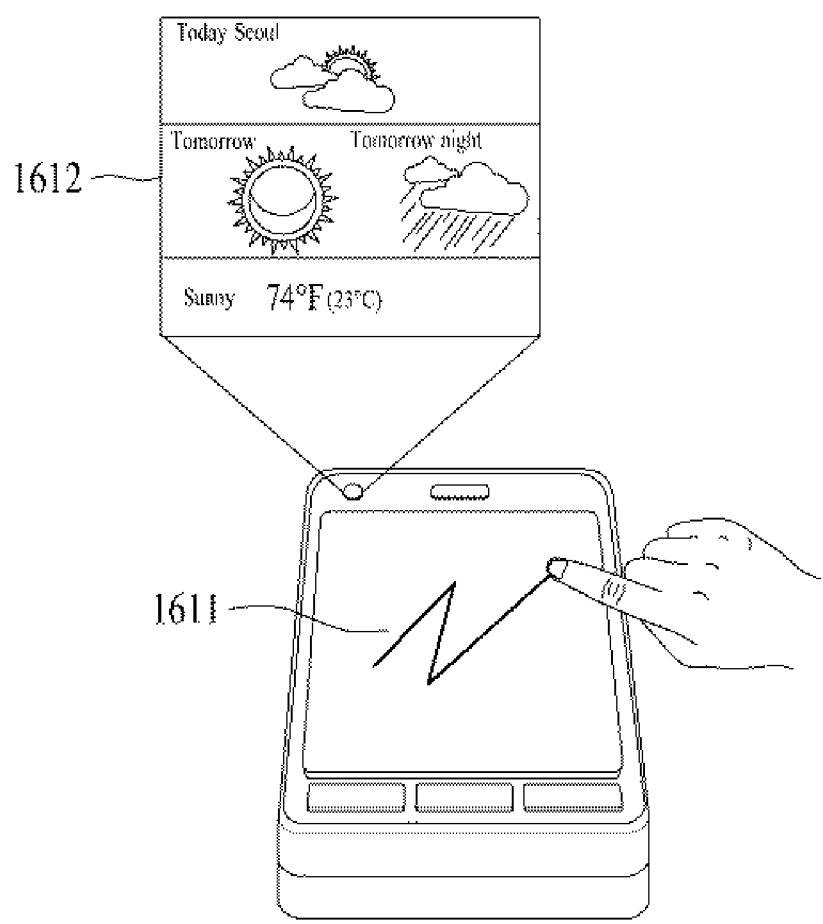
FIGS. 16A-16B are diagrams for one example of activating a specific application based on a shape recognition based event according to one embodiment of the present invention.

Referring to FIG. 16A, a user may be able to input a 1st shape 1611 via the touchscreen. If the 1st shape 1611 is inputted, the controller 180 activates a weather application to correspond to the 1st shape 1611 and may then control the holography module 156 to project an activated result 1612 of the weather application as a holography image.

Figure 16B:
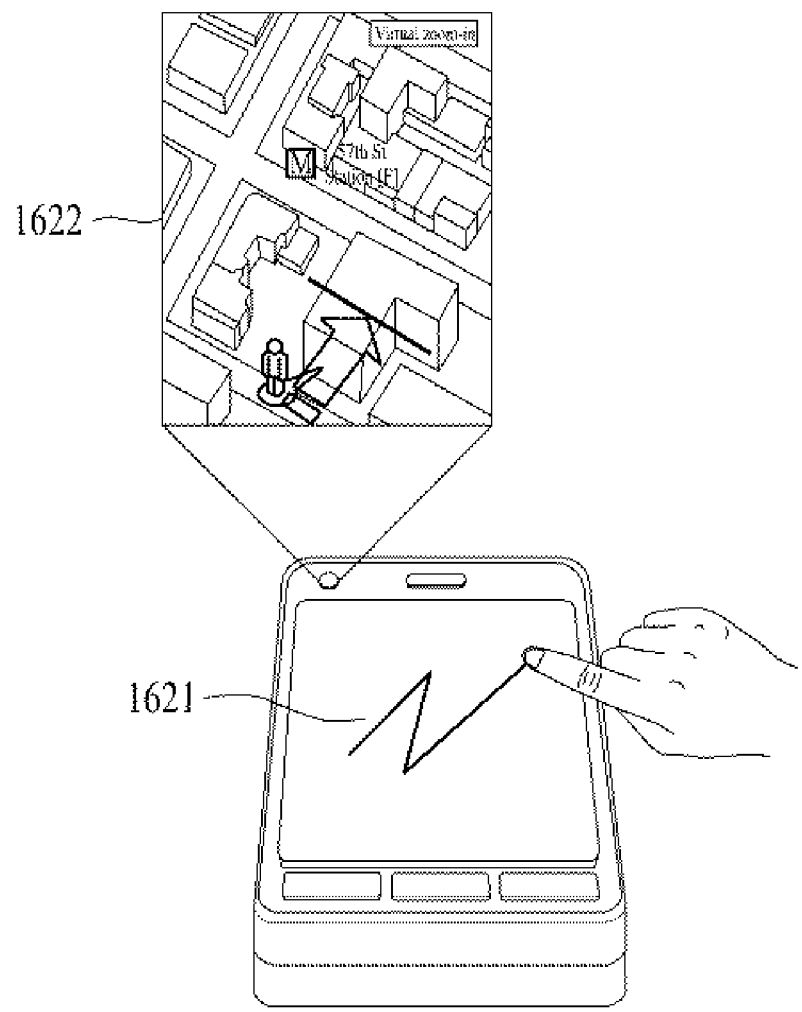

Referring to FIG. 16B, a user may be able to input a 2nd shape 1621 via the touchscreen. If the 2nd shape 1621 is inputted, the controller 180 activates a map application to correspond to the 2nd shape 1621n and may then control the holography module 156 to project an activated result 1622 of the map application as a holography image.

Therefore, the user may enable an activated result of a specific application as a holography image based on a shape recognition based event.

A settable holography function may become a holography pattern.

As mentioned in the foregoing description, it may be able to implement a holography pattern in a manner of changing a distance difference between a holography output module and a holography image in accordance with time, changing a shape of a holography image in accordance with time, shifting a holography image in right and left directions, or rotating a holography image.

And, it may be able to implement a holography pattern in a manner of modifying a color or size of a projected holography image in accordance with time or adjusting a holography image to flick. Moreover, it may be able to set or configure a holography pattern by at least one of projection brightness, play frequency, illumination, vibration feedback, sound insertion, image insertion, repetitive projection and the like.

FIG. 17 is a diagram for one example of applying a holography pattern based on a shape recognition based event according to one embodiment of the present invention.

Figure 17A:
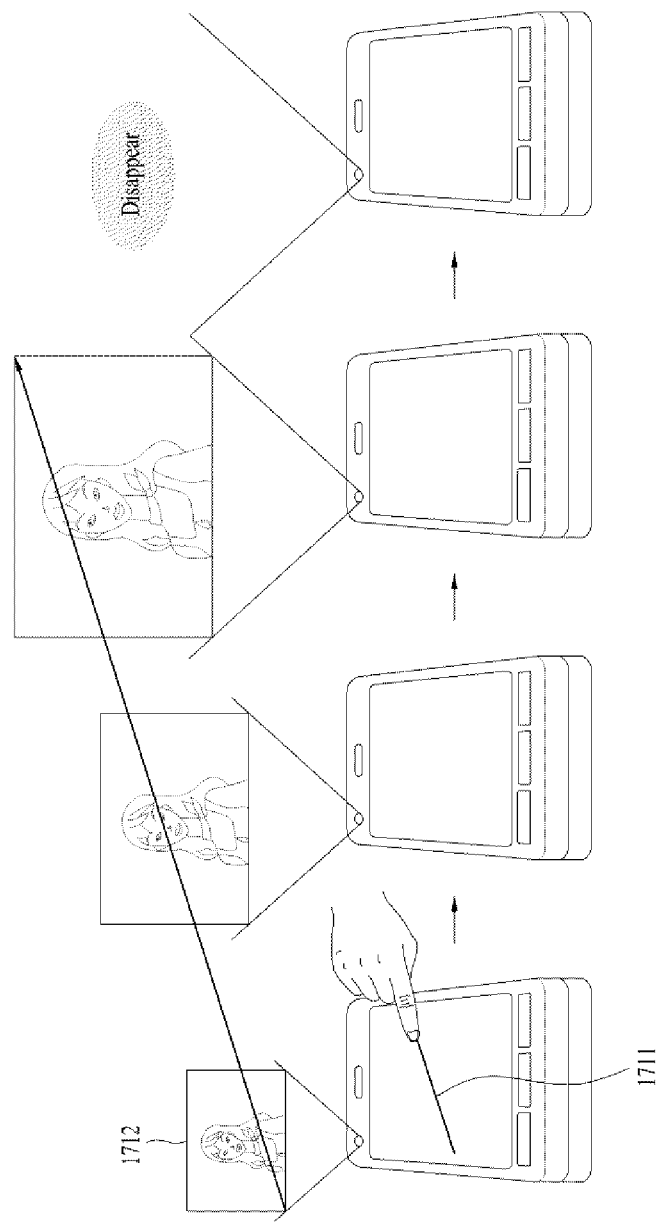
FIGS. 17A-17B are diagrams for one example of applying a holography pattern based on a shape recognition based event according to one embodiment of the present invention.

Referring to FIG. 17A, a user may input a 1st shape 1711 via the touchscreen. If the 1st shape 1711 is inputted, the controller 180 determines a holography pattern in accordance with the 1st shape 1711 and may control the holography module 156 to project a holography image in accordance with the determined holography pattern.

Figure 17B:
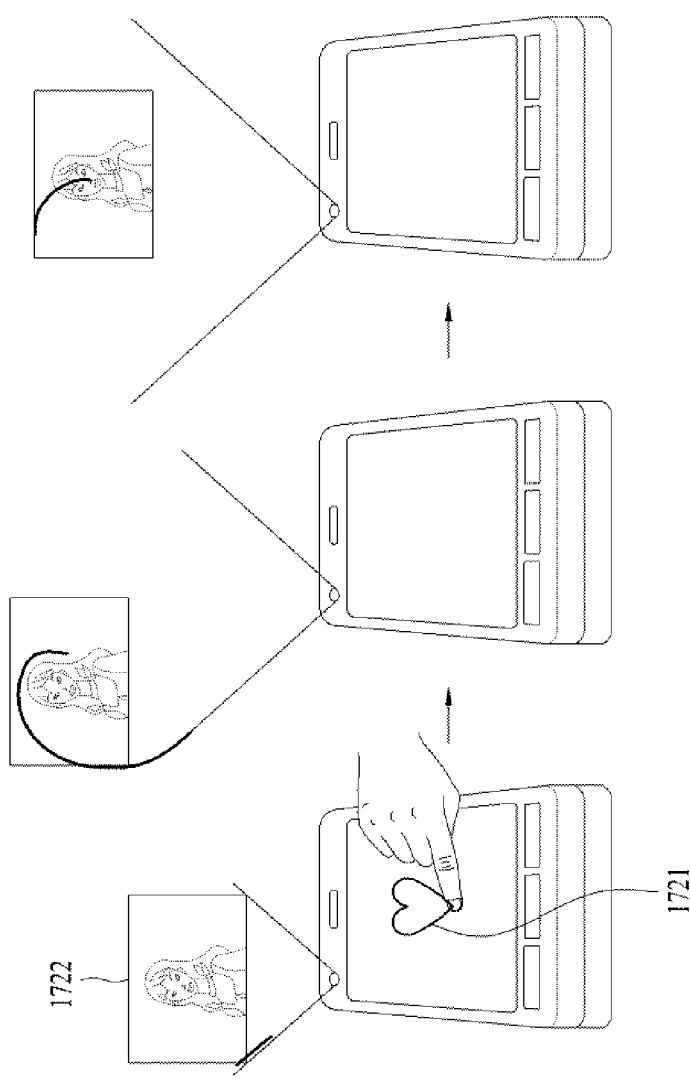

Referring to FIG. 17B, a user may input a 2nd shape 1721 via the touchscreen. If the 2nd shape 1721 is inputted, the controller 180 determines a holography pattern in accordance with the 2nd shape 1721 and may control the holography module 156 to project a holography image in accordance with the determined holography pattern.

Therefore, a user may conveniently change a holography pattern of a projected holography image based on a shape recognition based event.

Meanwhile, a target, which can be projected as a holography image, may become a holography background image.

In particular, a holography background image is to designate a holography background of a holography image, which is projected or will be projected, via a recognized event.

A holography background image may include a straight line, a line bent at a prescribed angle, a hybrid form of branch and curved lines, and the like. For instance, the closed curve shape may include one of a circle, a triangle, a quadrangle, a pentagon, a diamond shape and the like and may be implemented in various ways in accordance with user manipulations.

A holography background image, like a holography image, may be implemented by 2D stereoscopic image system or 3D stereoscopic image system. In particular, the 3D stereoscopic image system follows a stereoscopic method of providing different images to both eyes, respectively.

A content of a holography image may be displayed on a whole region or a partial region of a holography background. Moreover, as the holography background is partitioned into 4 sections, 4 different image contents may be projected as a holography image on the 4 sections, respectively.

Besides, the holography background image shall be described in detail with reference to FIG. 20 later.

FIG. 18 is a diagram for one example of setting a holography background based on a shape recognition based event according to one embodiment of the present invention.

Figure 18A:
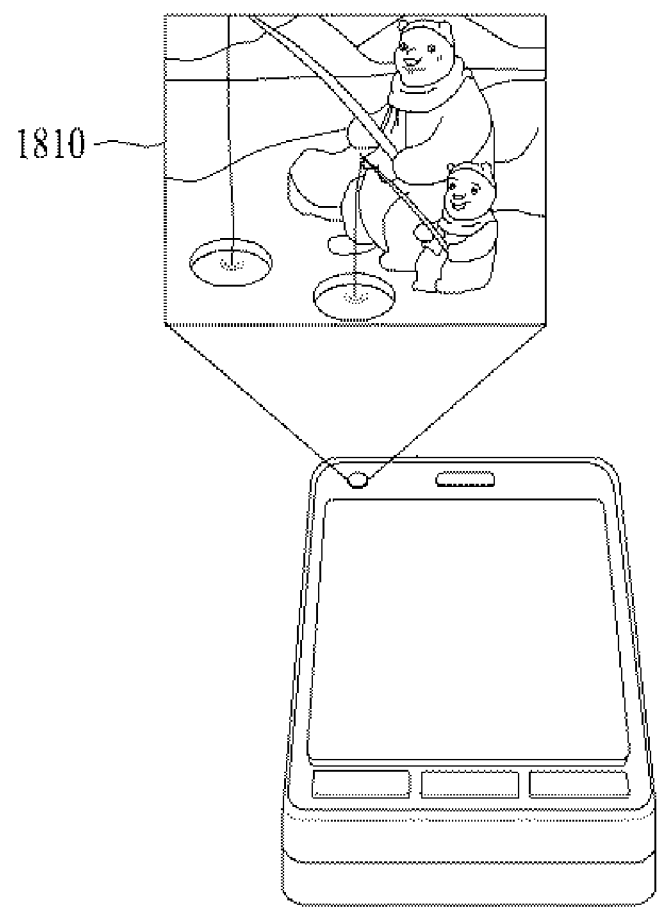
FIGS. 18A-18D are diagrams for one example of setting a holography background based on a shape recognition based event according to one embodiment of the present invention.

Referring to FIG. 18A, an image content 1810 is projected as a holography image.

Figure 18B:
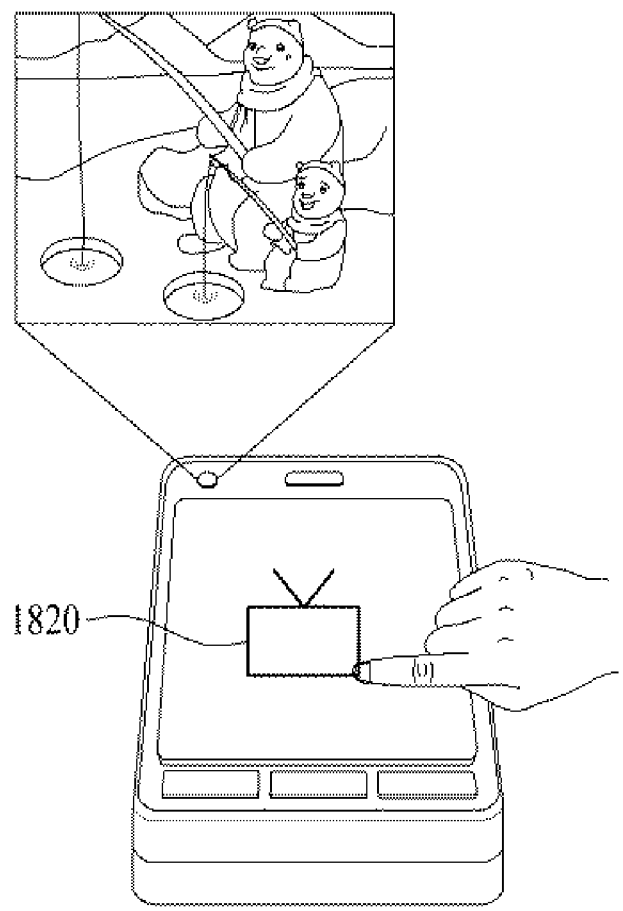

In doing so, referring to FIG. 18B, a user may input a 1st shape 1820 via the touchscreen. If the 1st shape 1820 is inputted, the controller 180 determines a holography background corresponding to the 1st shape 1820 and may control a holography image to be projected in a manner that the image content 1810 is included within the determined holography background.

The controller 180 may control the touchscreen to display a list of candidates for a plurality of holography backgrounds applicable in association with the 1st shape 1820.

Figure 18C:
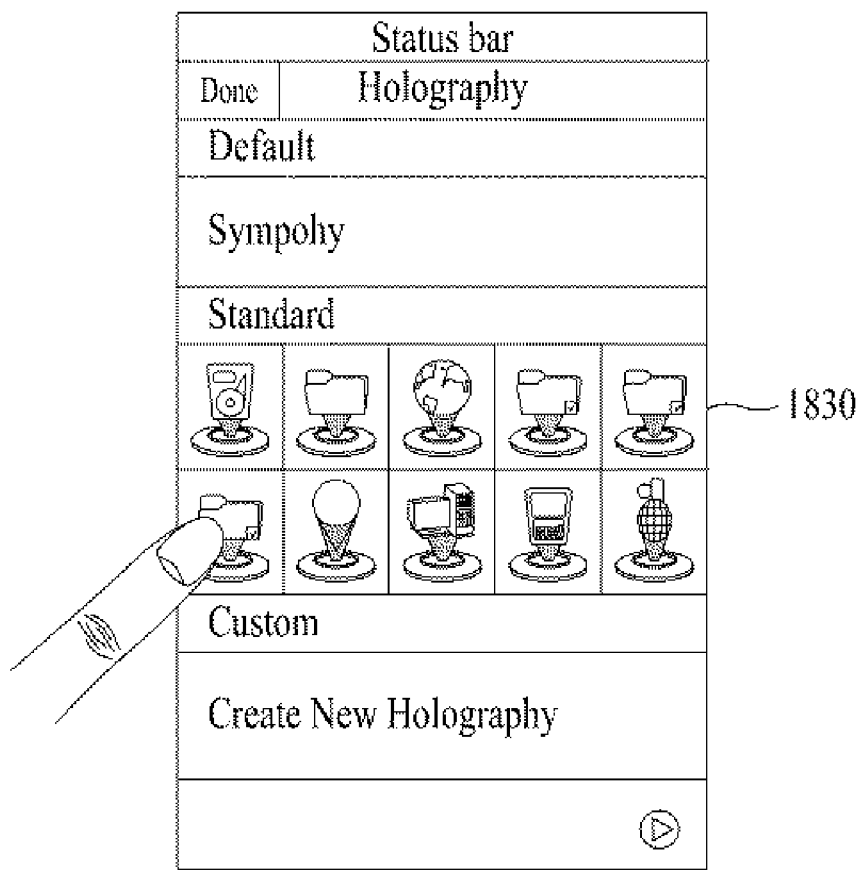

In doing so, the list may be displayed as thumbnails, which is shown in FIG. 18C.

Referring to FIG. 18C, a candidate list 1830 of holography backgrounds settable to correspond to the 1st shape 1820 may be displayed as thumbnails. A user may be able to select a prescribed holography background from the displayed holography background candidate list 1830.

Figure 18D:
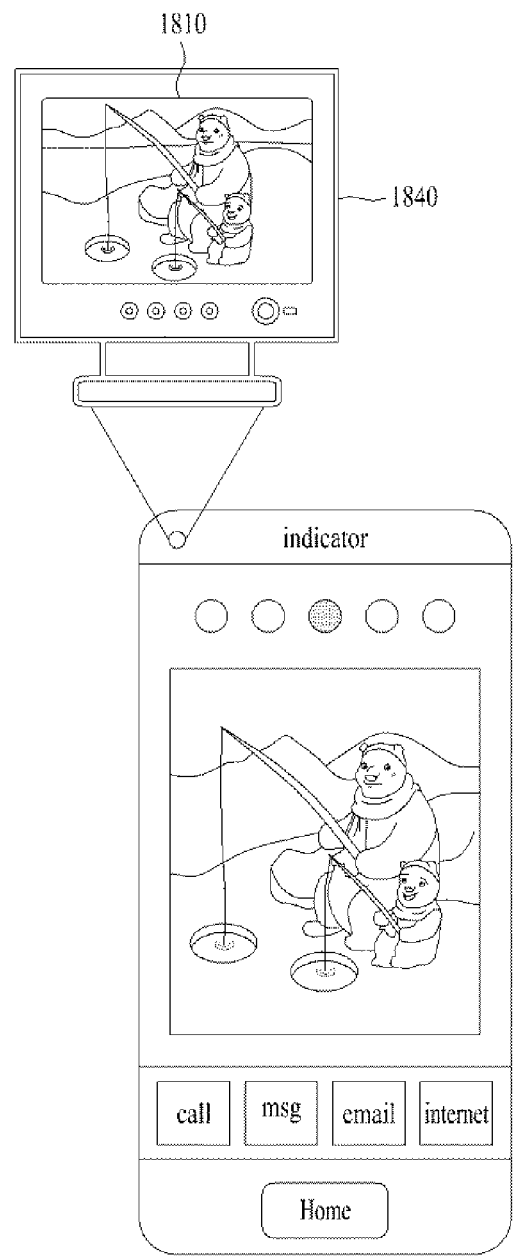

Referring to FIG. 18D, the controller 180 controls the holography module to output a holography image in a manner that the image content 1810 is displayed on a prescribed region within the selected holography background 1840.

FIG. 19 is a diagram for one example of displaying a plurality of image contents on a predetermined region within a holography background according to one embodiment of the present invention.

In FIG. 19, assume that a content projected as a holography image includes an image content.

As mentioned in the foregoing description, an image content may be displayed on a whole or partial region of a holography background and a ratio of this region may be randomly modified by a user. Moreover, a holography background is partitioned into a plurality of regions and a plurality of image contents may be displayed on a plurality of the regions, respectively.

Figure 19A:
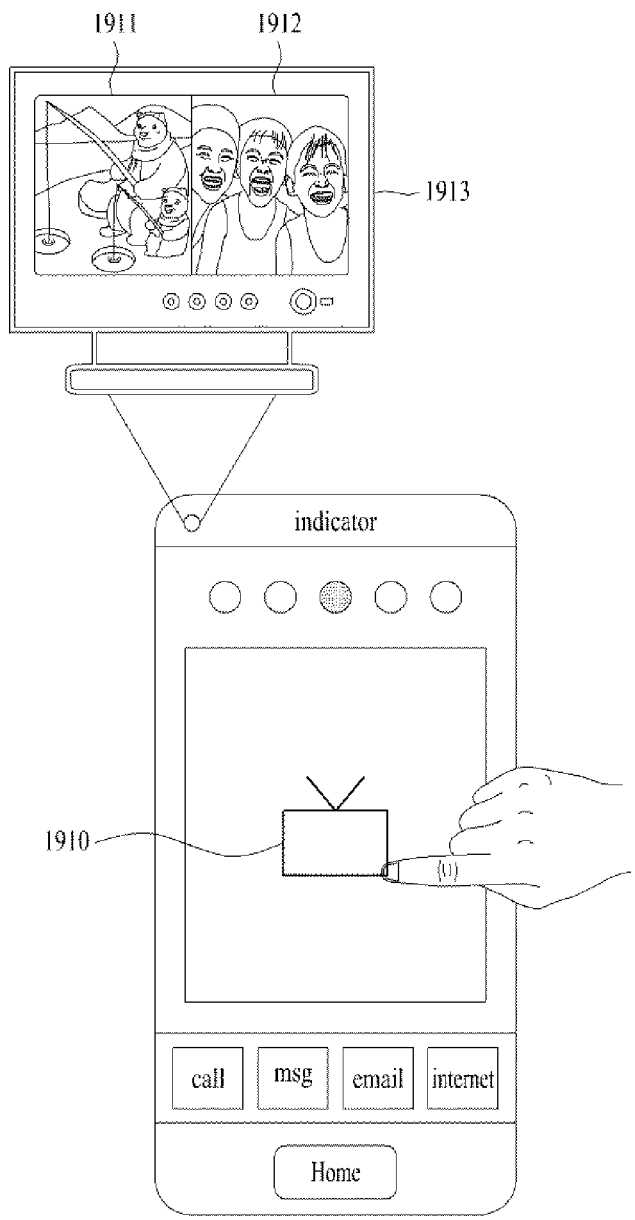
FIGS. 19A-19B are diagrams for one example of displaying a plurality of image contents on a predetermined region within a holography background according to one embodiment of the present invention.

Referring to FIG. 19A, a user may input a 1st shape 1910 via the touchscreen. If the 1st shape 1910 is inputted, the controller 180 determines a holography background 1913 corresponding to the 1st shape 1910 and may control a holography image to be projected in a manner that an image content is included within the determined holography background 1913.

In FIG. 19A, the image content is designated to be displayed on a region amounting to 80% of the holography background 1913. The region amounting to 80% of the holography background 1913 is divided into two regions 1911 and 1912. And, two image contents are displayed on the two regions 1911 and 1912 as a holography image, respectively.

Figure 19B:
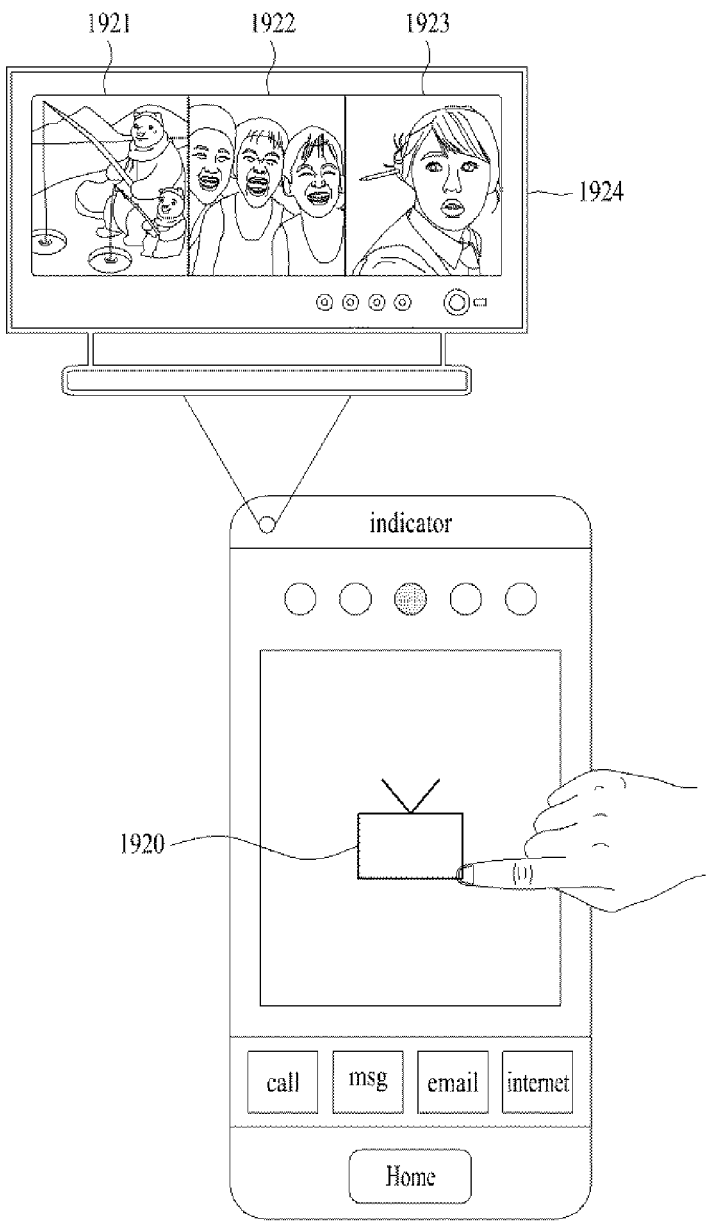

Referring to FIG. 19B, a user may input a 2nd shape 1920 via the touchscreen. If the 2nd shape 1920 is inputted, the controller 180 determines a holography background 1924 corresponding to the 2nd shape 1920 and may control a holography image to be projected in a manner that an image content is included within the determined holography background 1913.

In FIG. 19B, the image content is designated to be displayed on a region amounting to 85% of the holography background 1924. The region amounting to 85% of the holography background 1924 is divided into 3 regions 1921, 1922 and 1923. And, 3 image contents are displayed on the 3 regions 1921, 1922 and 1923 as a holography image, respectively.

FIG. 20 is a diagram for one example of a holography background based on a shape recognition based event according to one embodiment of the present invention.

Figure 20A:
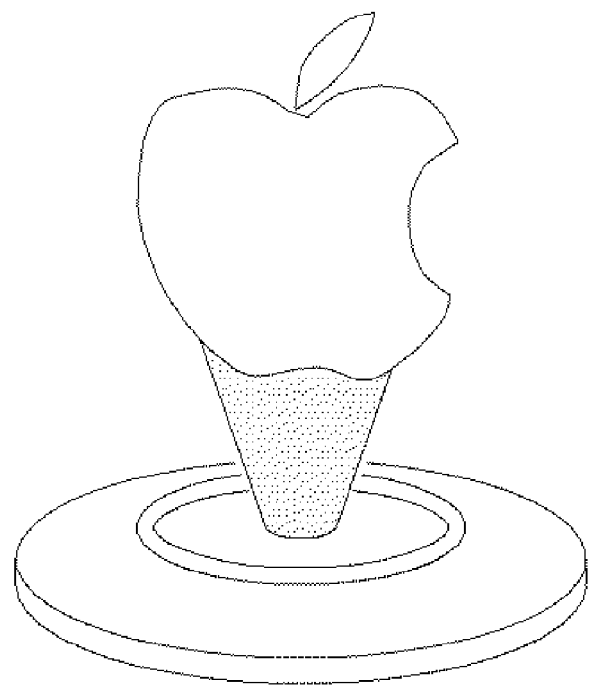
FIGS. 20A-20K are diagrams for one example of a holography background based on a shape recognition based event according to one embodiment of the present invention.

In particular, FIG. 20A shows one example of implementing a holography background of an apple shape.

Figure 20B:
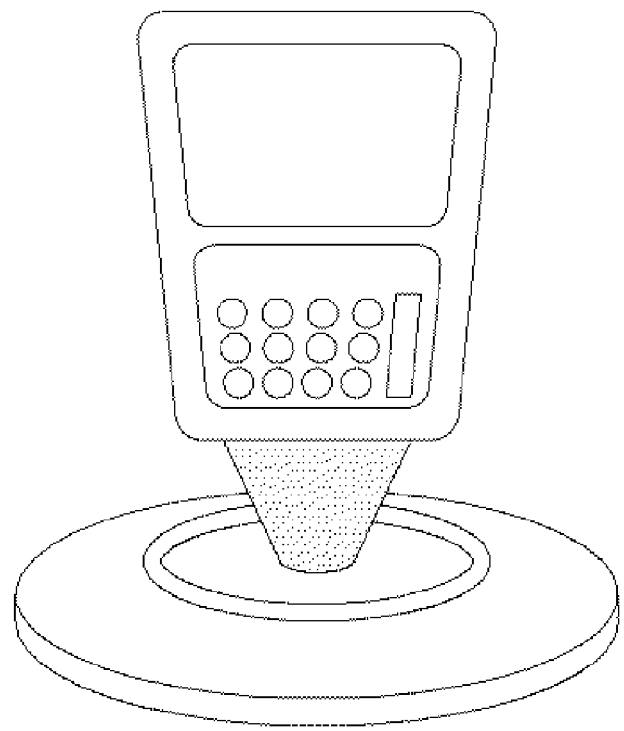

FIG. 20B shows one example of implementing a holography background of a calculator shape.

Figure 20C:
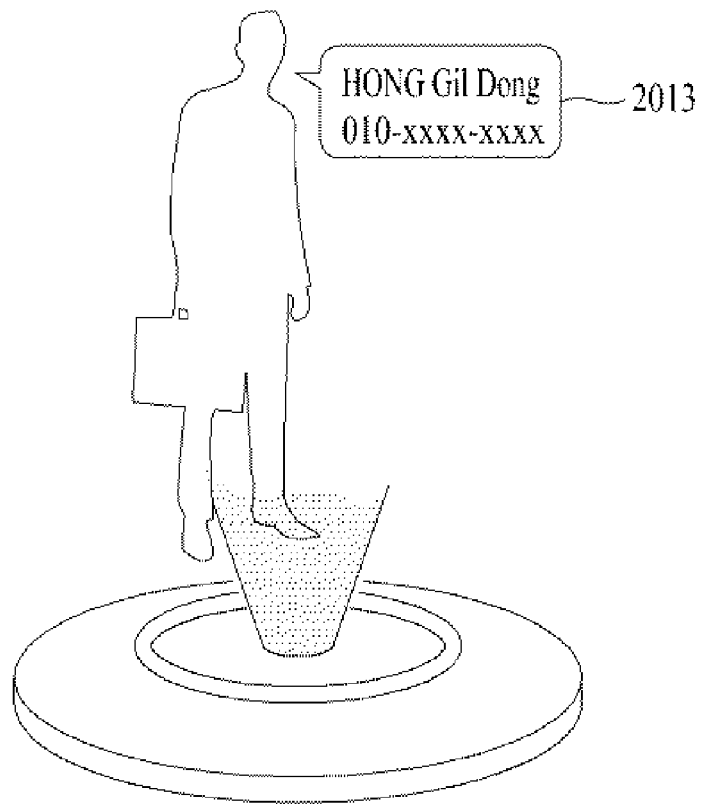

FIG. 20C shows one example of implementing a holography background of a character shape. In doing so, a detailed information 2013 on an object may be displayed on a prescribed region of the holography background as well.

Figure 20D:
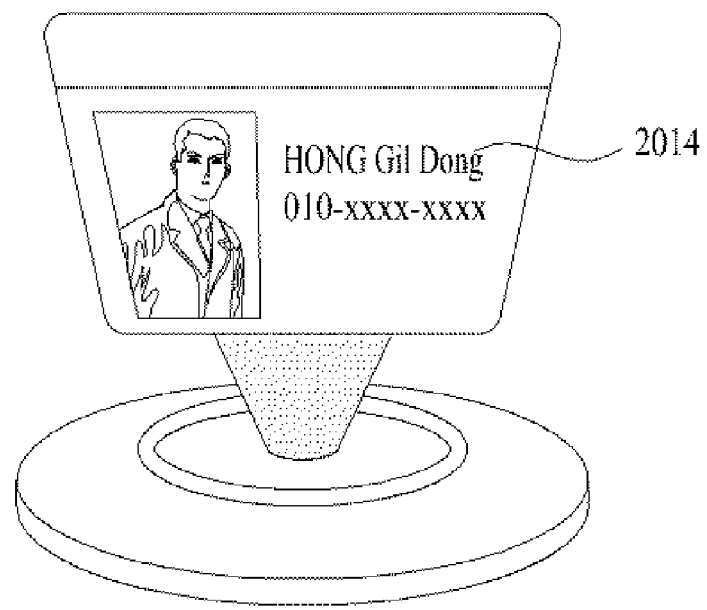

FIG. 20D shows one example of implementing a holography background of a business card shape. In doing so, a detailed information 2014 on an object may be displayed on a prescribed region of the holography background as well.

Figure 20E:
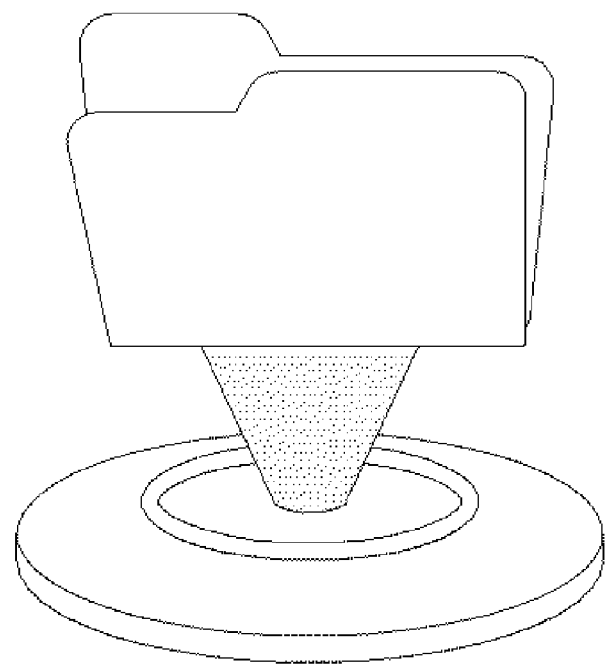

FIG. 20E shows one example of implementing a holography background of a folder shape.

Figure 20F:
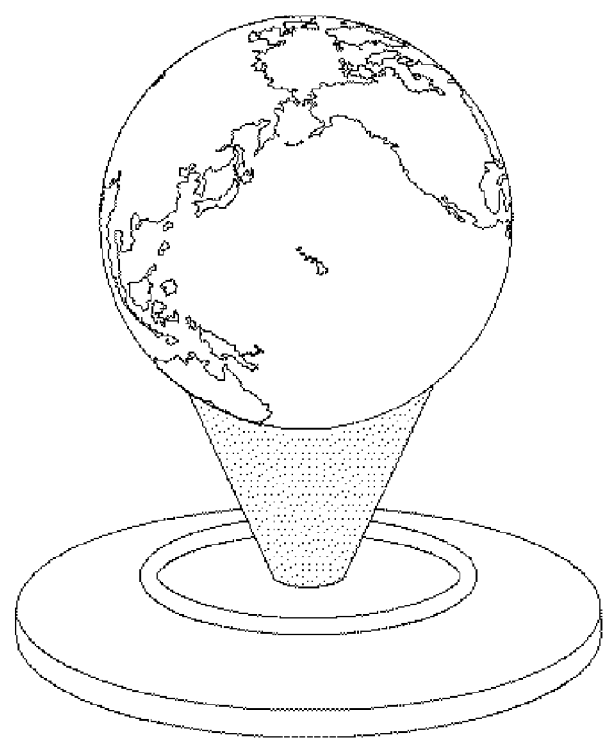

FIG. 20F shows one example of implementing a holography background of a globe shape.

Figure 20G:
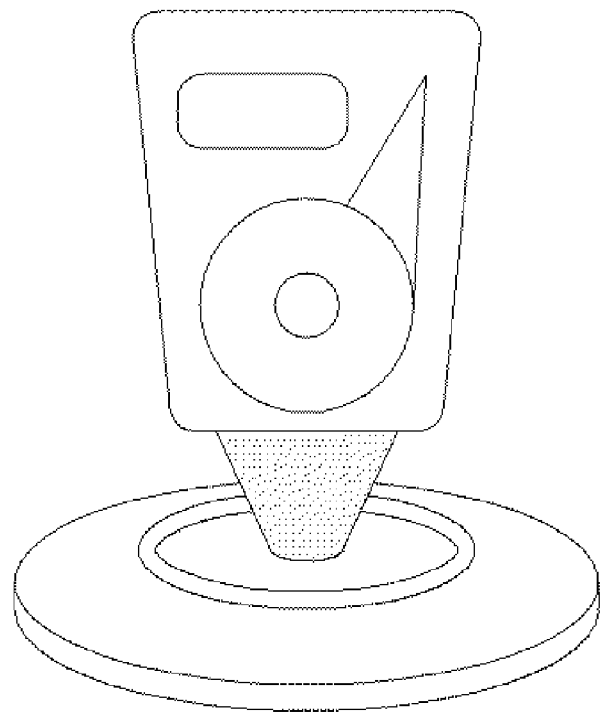

FIG. 20G shows one example of implementing a holography background of a video image shape.

Figure 20H:
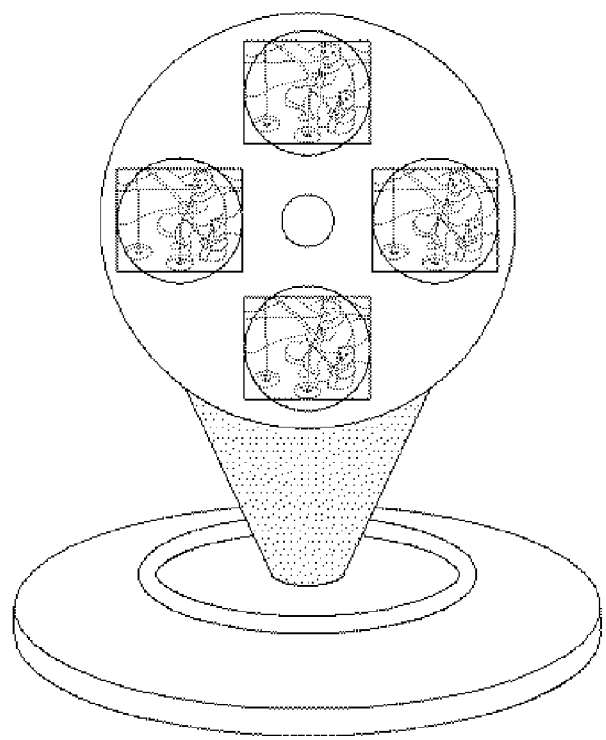

FIG. 20H shows one example of implementing a holography background of a gallery shape. In doing so, a plurality of image contents may be projected as a gallery shape together with the holography background.

Figure 20I:
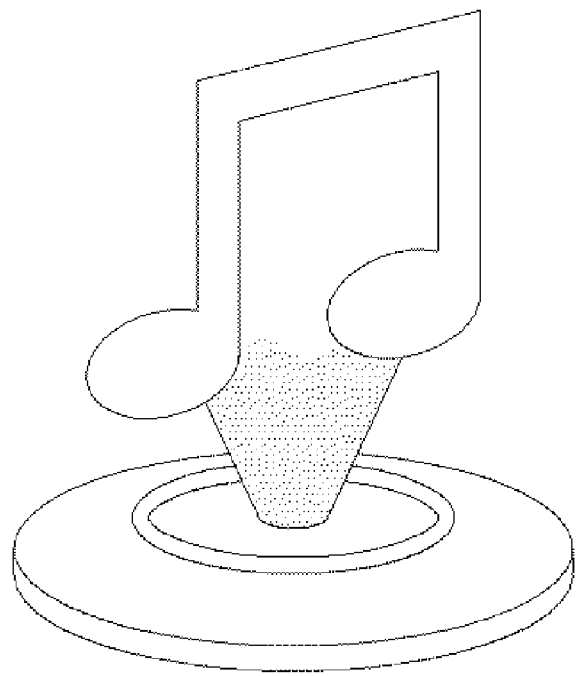

FIG. 20I shows one example of implementing a holography background of a music image shape.

Figure 20J:
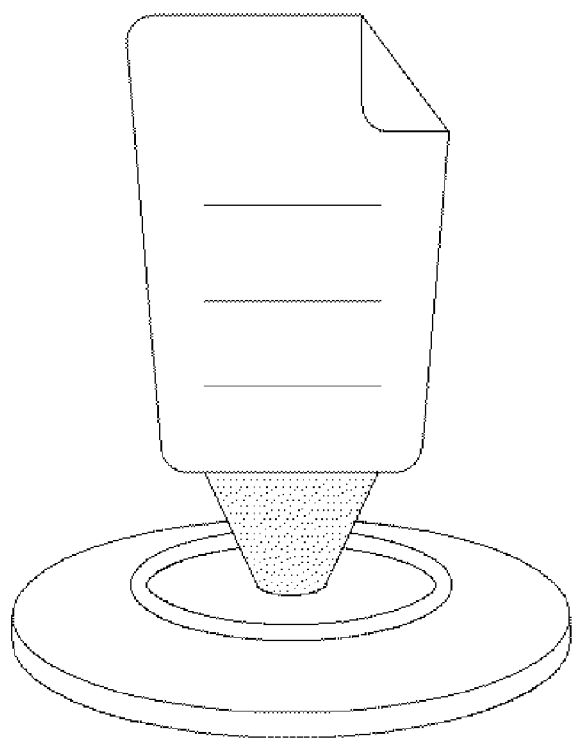

FIG. 20J shows one example of implementing a holography background of a memo shape.

Figure 20K:
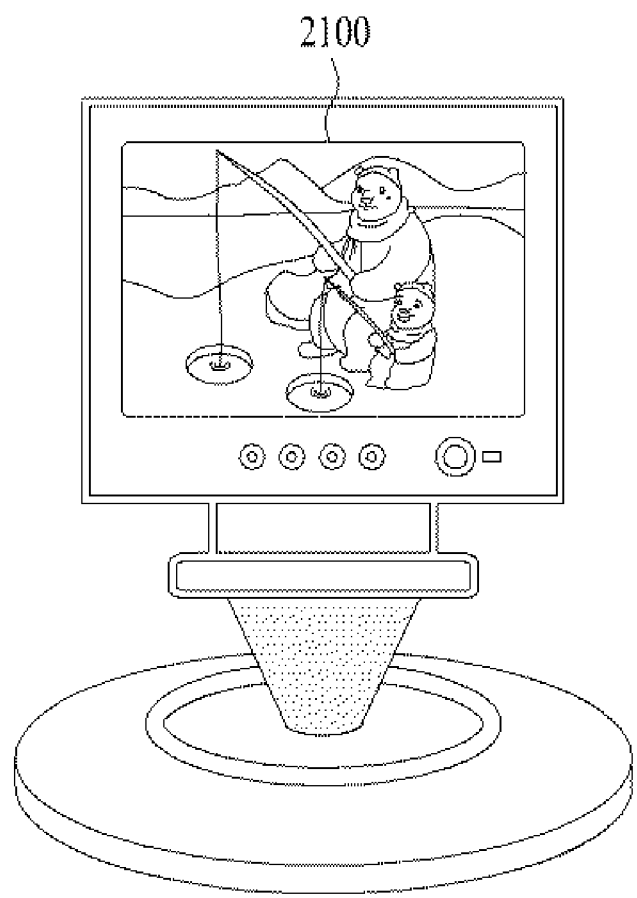

FIG. 20K shows one example of implementing a holography background of a TV image shape.

Yet, the above-mentioned holography backgrounds are just exemplary. More holography backgrounds may be implemented in various ways using the closed curve shape including a straight line, a line bent at a prescribed angle, a hybrid form of branch and curved lines, and the like.

Meanwhile, the recognition based event may be implemented into a docking based event.

In particular, the docking based event may mean an event in which a terminal is mounted or installed at a specific position to achieve a prescribed purpose. And, the docking based event may include every event (e.g., a charging event) in which a terminal is mounted and fixed over prescribed duration to achieve a prescribed purpose.

In doing so, contents of a projected holography image may include a plurality of contents and an activated result of an application.

Specifically, regarding a plurality of applications, an activated result of a specific application in idle mode may be projected as a holography image. And, applications settable to idle mode may include an e-frame application, a clock application, a schedule application, an alarm application, an illumination (mood) application, a CCTV application and the like.

FIG. 21 is a diagram for one example of projecting a holography image based on a docking based event according to one embodiment of the present invention.

In FIG. 21, assume that a terminal is charged and docked with an external charging device 2100.

Figure 21A:
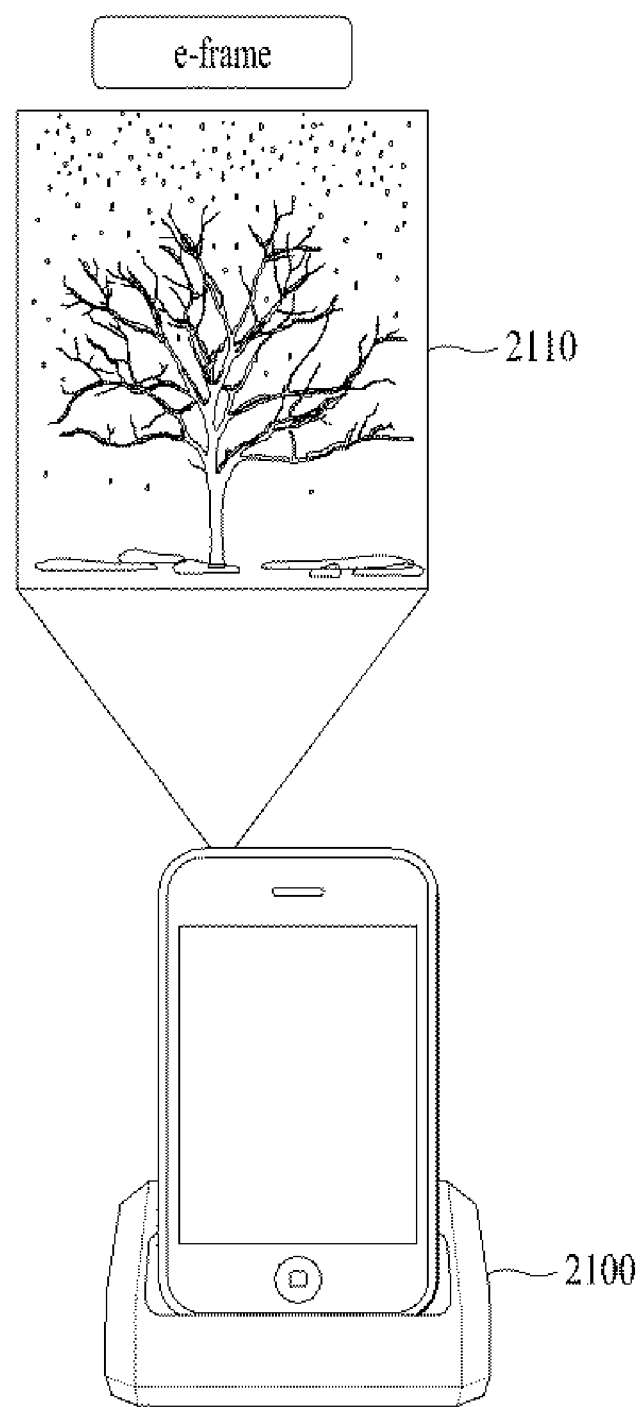
FIGS. 21A-21E are diagrams for one example of projecting a holography image based on a docking based event according to one embodiment of the present invention.

Referring to FIG. 21A, an e-frame mode 2110 is activated as an idle mode. In the e-frame mode, data of a taken or downloaded picture or video is automatically displayed on a holography e-frame. In doing so, the displayed data may include a photo/video taken on the appointed day, a photo/video downloaded in preset period, a photo/video in a specific folder and the like.

Figure 21B:
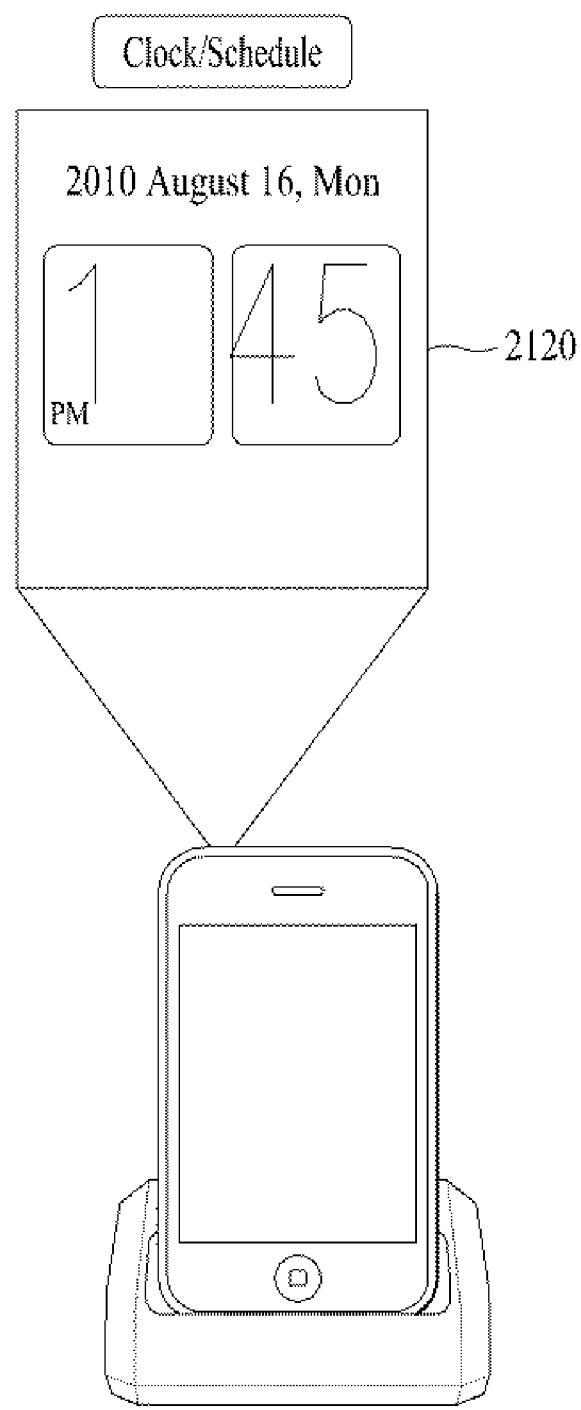

Referring to FIG. 21B, a clock/schedule mode 2120 is activated as an idle mode. In particular, a holography image may be usable for the purpose of a table clock. In doing so, it may display world time information.

Figure 21C:
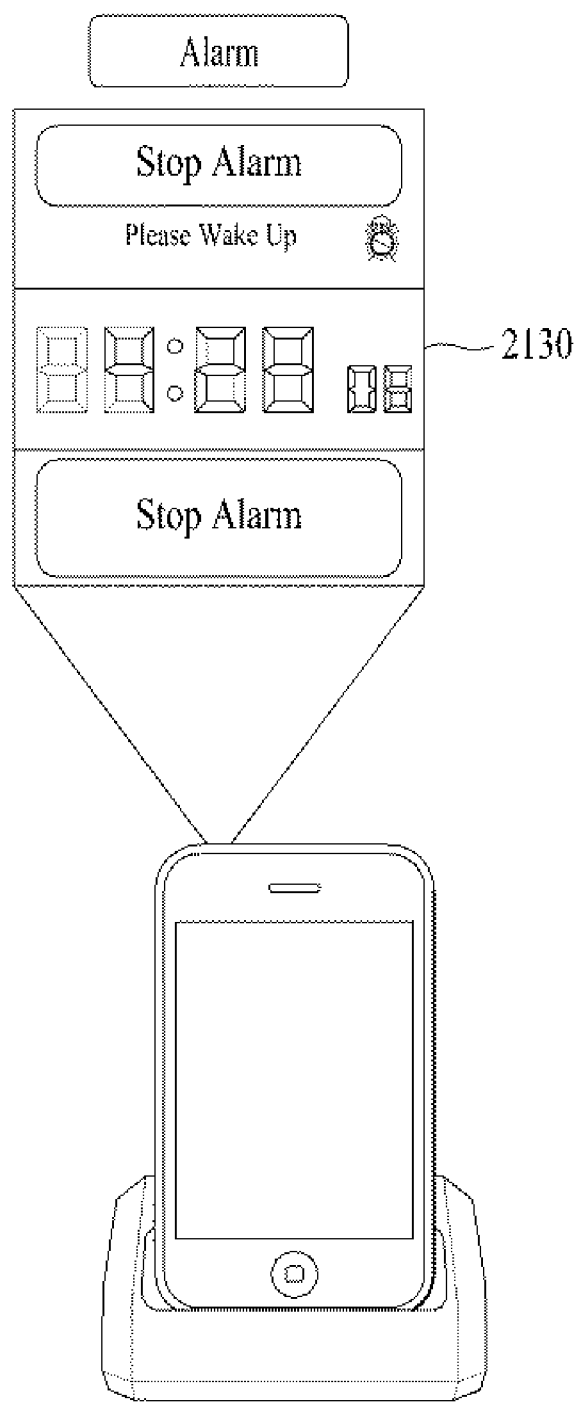

Referring to FIG. 21C, an alarm mode 2130 is activated as an idle mode. In particular, if a preset time expires, an alarm of a holography image is transmitted from the terminal.

Figure 21D:
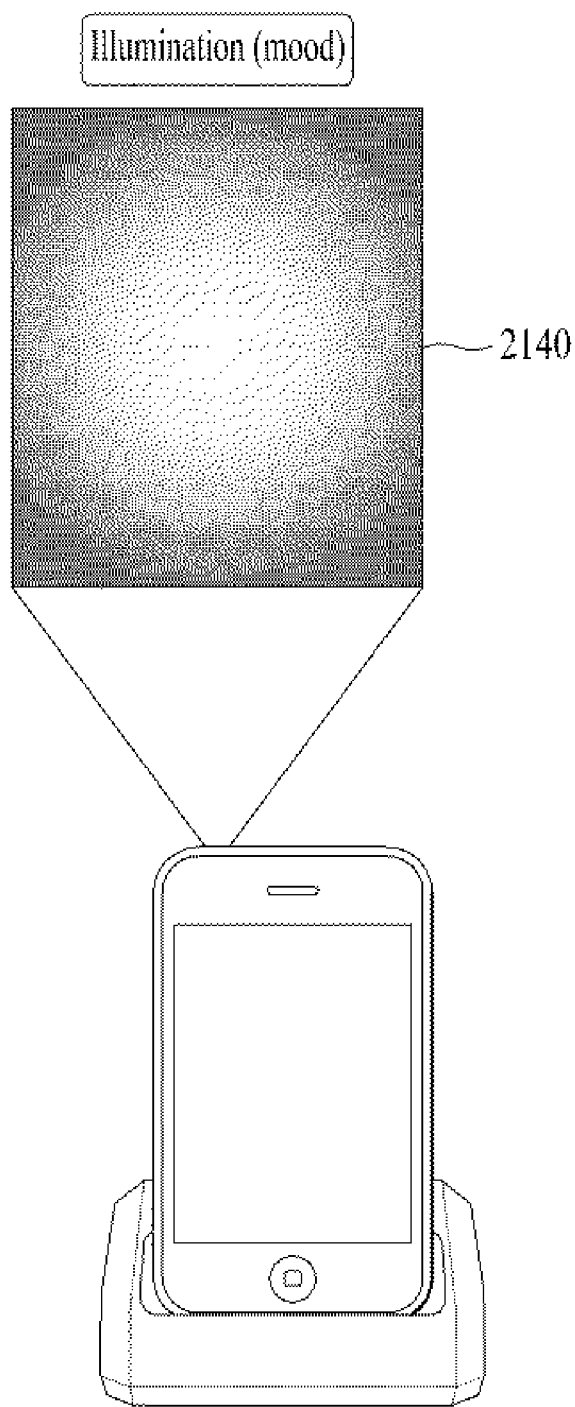

Referring to FIG. 21D, an illumination mode 2140 is activated as an idle mode. In this case, the illumination mode 2140 uses a holography image as an illumination of various patterns. In doing so, brightness of the illumination may be designated to change automatically in accordance with ambient brightness.

Figure 21E:
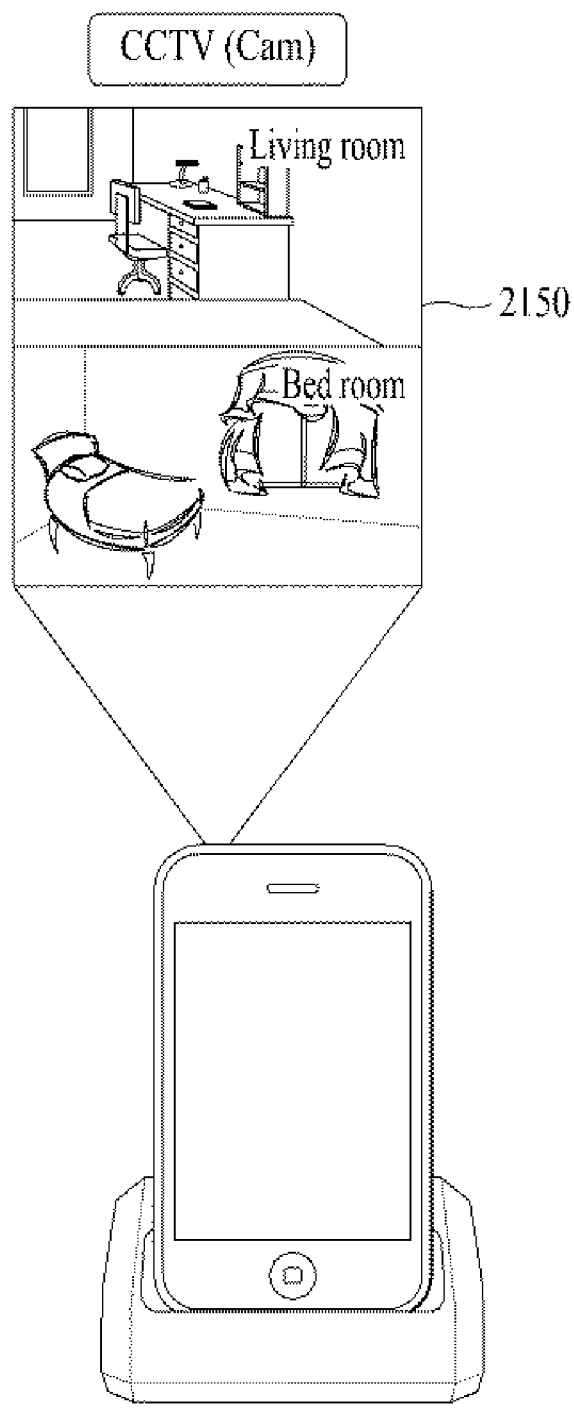

Referring to FIG. 21E, a CCTV mode 2140 is activated as an idle mode. The CCTV mode 2140 receives a CCTV information 2150 via the wireless communication unit from an external device in charge of a CCTV function and then projects the received CCTV information 2150 as a holography image.

Meanwhile, if a docking based event occurs, a plurality of applications are sequentially activated in order designated by a user and an activated result may be projected as a holography image.

For instance, menus usable in docking state may be projected as a holography image. For another instance, a multimedia related application (e.g., a photo application, a video application, a broadcast application, a web browsing application, a beam projector application, etc.) is automatically activated and a corresponding activated result is then projected as a holography image. For another instance, a search for photos or videos taken or downloaded on the appointed day is automatically executed and the found photos or videos may be then sequentially projected as holography images, respectively.

For a further instance, a search for weather, schedule, news, email and the like on a prescribed day is automatically executed and the found results may be then sequentially projected as holography images, respectively.

FIG. 22 is a diagram for one example of projecting an activated result of a plurality of applications as a holography image based on a docking based event according to one embodiment of the present invention.

Figure 22A:
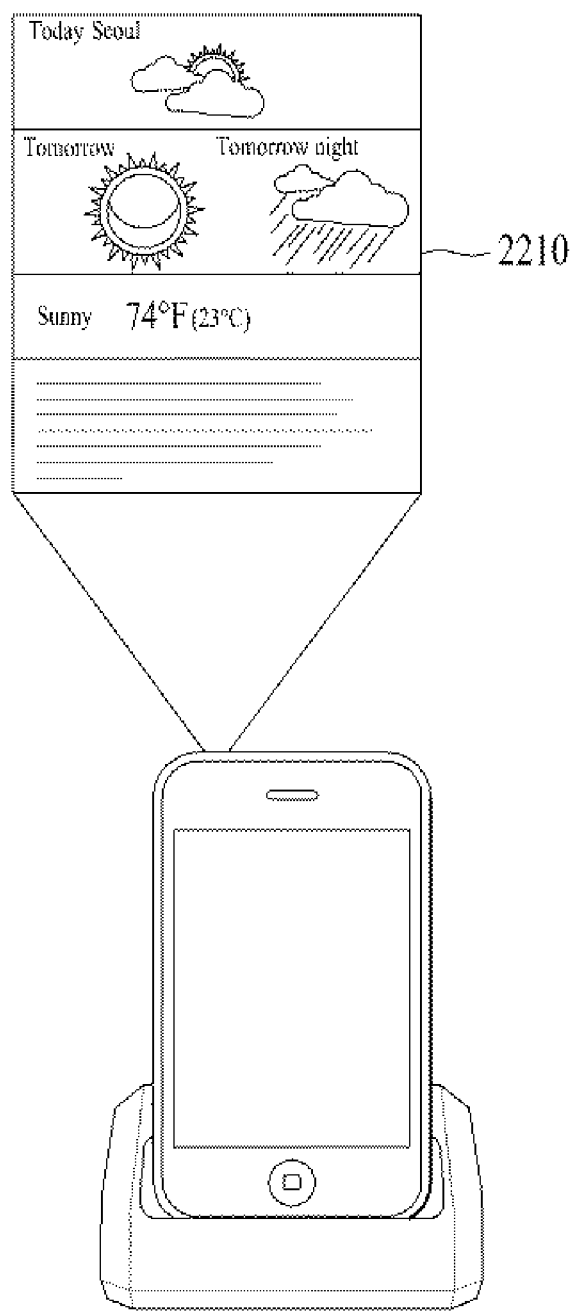
FIGS. 22A-22B are diagrams for one example of projecting an activated result of a plurality of applications as a holography image based on a docking based event according to one embodiment of the present invention.
Figure 22B:
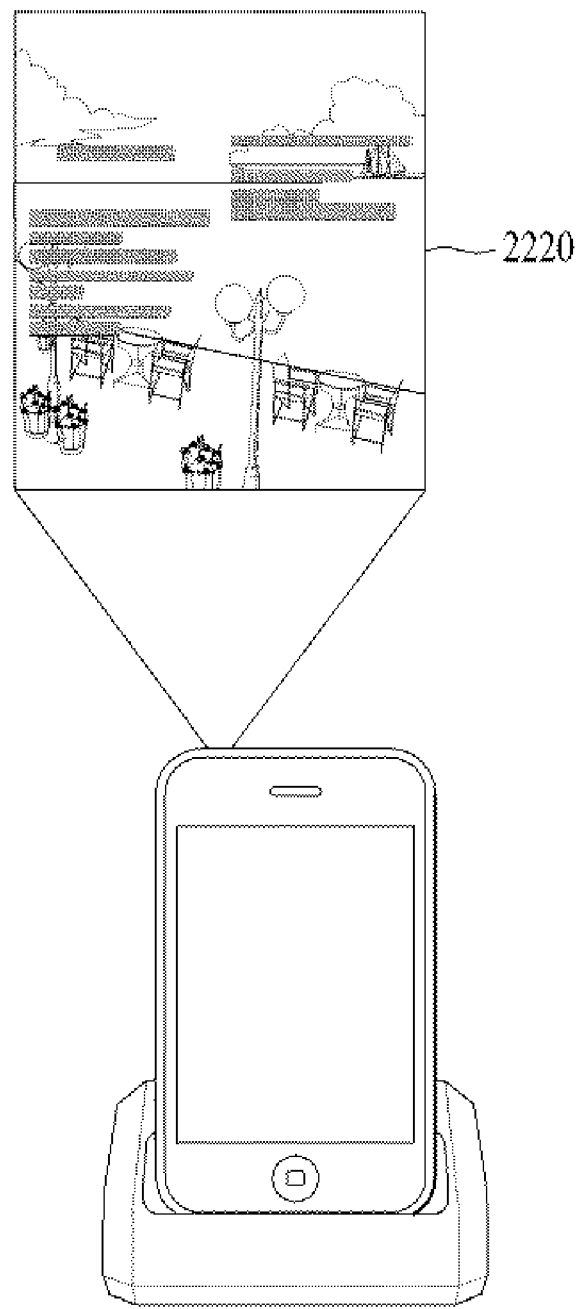

FIG. 22A and FIG. 22B show holography images sequentially changed in accordance with time, respectively.

Referring to FIG. 22A, the controller 180 may project an activated result of an application for tomorrow's weather as a holography image 2210.

If a prescribed time expires, referring to FIG. 22B, the controller 180 automatically performs a search for photos taken or downloaded on the appointed day and may then project the search result as a holography image 2220.

Therefore, a user may be able to conveniently project a plurality of previously designated contents as holography images in desired order.

Meanwhile, if a docking based event occurs, the terminal may be able to transmit information on a set holography function to an external device capable of projecting a holography image via the wireless communication unit 110.

For instance, information on multimedia related application (e.g., a photo application, a video application, a broadcast application, a web browsing application, a beam projector application, etc.) may be transmitted to an external device via short-range communication network or wire/wireless communication network.

Having received the information on the holography function, the external device may be able to project a holography image in accordance with the set holography function.

Figure 23:
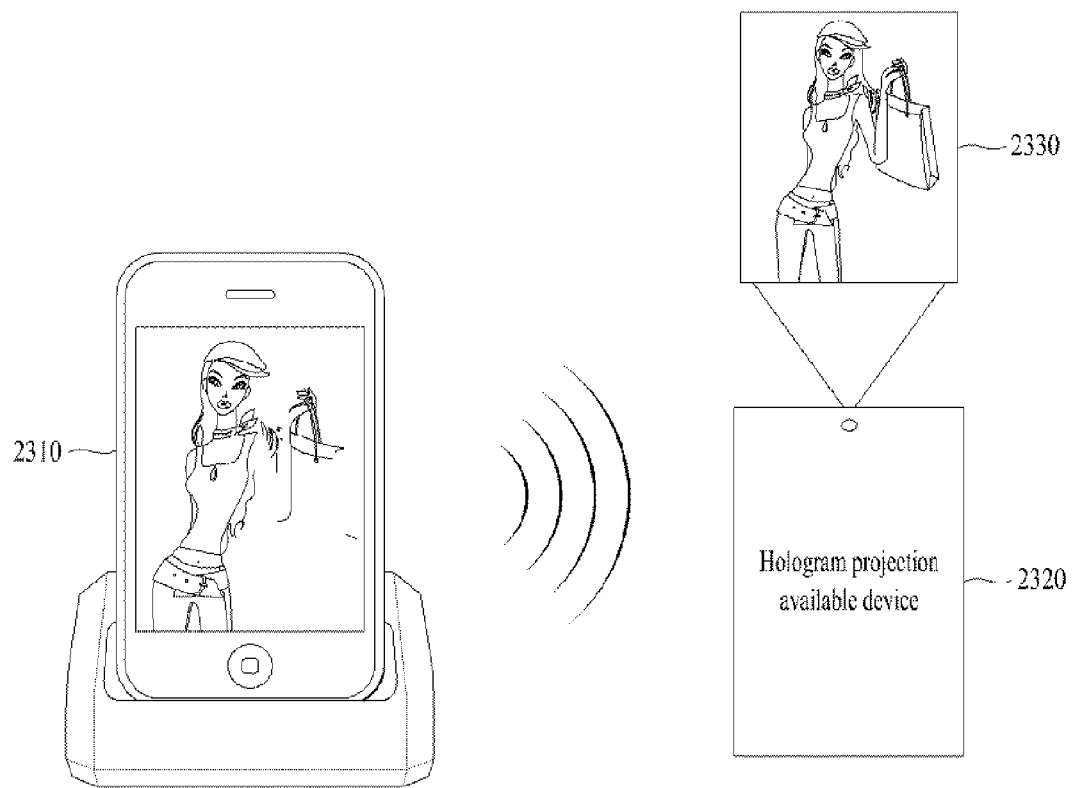
FIG. 23 is a diagram for one example of sharing holography related information with another external device based on a docking based event according to one embodiment of the present invention.

FIG. 23 is a diagram for one example of sharing holography related information with another external device based on a docking based event according to one embodiment of the present invention.

Referring to FIG. 23, in case that a docking based event occurs, the terminal 2310 transmits information on a set holography function to an external device 2320 capable to project a holography image via the wireless communication unit 110.

Having received the information on the holography function, the external device 2320 may be able to project a holography image 2330 in accordance with the received holography function.

Meanwhile, a recognition based event may be implemented into a sensor recognition based event.

The sensor recognition based event is based on an event recognized via the sensing unit 140. In particular, the sensor recognition based event may include one of an event in accordance with motion or inclination variation of a terminal based on a gyro-sensor, an event in accordance with a touch input of a specific pattern, an event in accordance with fingerprint recognition, an event in accordance with voice or speech recognition, an event in accordance with eye-tracking recognition, an event in accordance with wind recognition, an event in accordance with an object identified via keyword or iris recognition, and the like.

A holography function settable via the sensor recognition based event may become a projected holography image or a holography pattern.

Targets, which can be projected as a holography image, may include a plurality of contents, an activated result of an application, a holography background image and the like.

In this case, a plurality of the contents may include texts, images, video contents and the like.

FIG. 24 is a diagram for a detailed example of applying a sensor recognition based event according to one embodiment of the present invention.

Figure 24A:
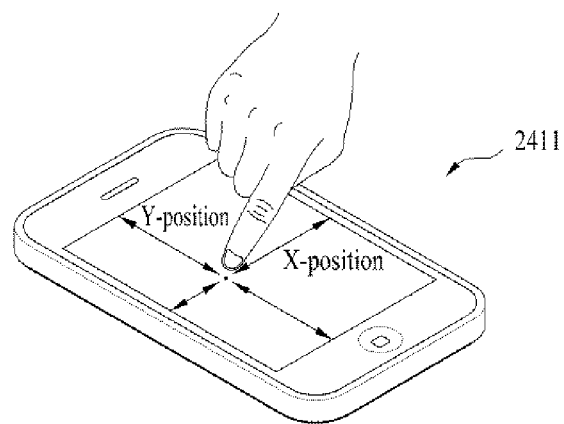
FIGS. 24A-24G are diagrams for a detailed example of applying a sensor recognition based event according to one embodiment of the present invention.
Figure 24A:
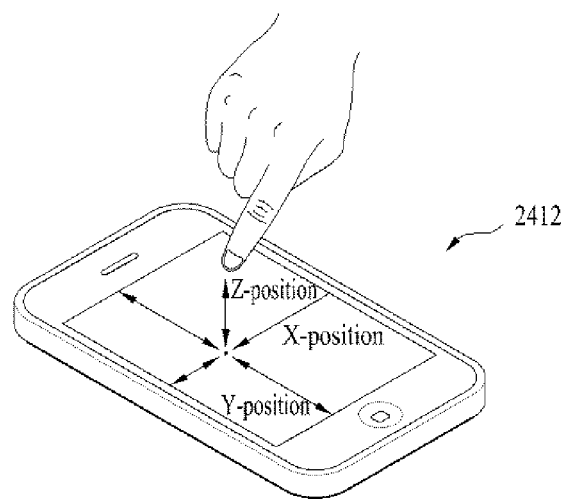

First of all, FIG. 24A relates to a description of a touch input event of a specific pattern recognized via the sensing unit 140. For example of a touch input 2411 of a specific pattern may include one of a user's touch to a partial region of a closed curve of a mobile terminal, a user's touch input of holding a touch area exceeding a predetermined region of a touchscreen in the palm of user's hand and the like. For another example, the touch input of the specific pattern may include one of a long touch to a prescribed region on a touchscreen, a proximity touch to a prescribed region on a touchscreen, a long proximity touch to a prescribed region on a touchscreen, a multi-touch to a prescribed region on a touchscreen, and the like.

The specific-pattern touch input event may include a 3D (3-dimensional) proximity touch input 2412 as well as a general 2D (2-dimensional) contact touch. In particular, a 3D specific-pattern touch input may be recognized by sensing a proximity touch in close distance or a proximity touch pattern (e.g., proximity touch distance, proximity touch direction, proximity touch speed, proximity touch position, proximity touch moving state, etc.) without a direct contact between the touchscreen and a pointer.

Figure 24B:
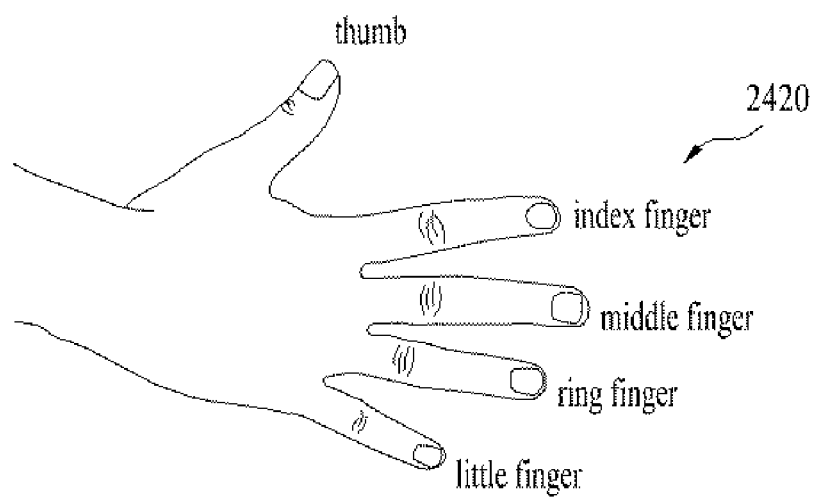

Secondly, FIG. 24B relates to a description of an event in accordance with fingerprint recognition. An event 2420 in accordance with the fingerprint recognition may be generally applicable to an individual person. Moreover, since a thumb, an index finer, a middle finger, a ring finger and a little finger of a same user also differ from each other in fingerprint, it may be able to set an event in accordance with a fingerprint of each of the fingers.

In this case, a fingerprint recognizer to recognize user's fingerprints may be separately provided to the terminal or implemented as a film on a prescribe region of the touchscreen.

Figure 24C:
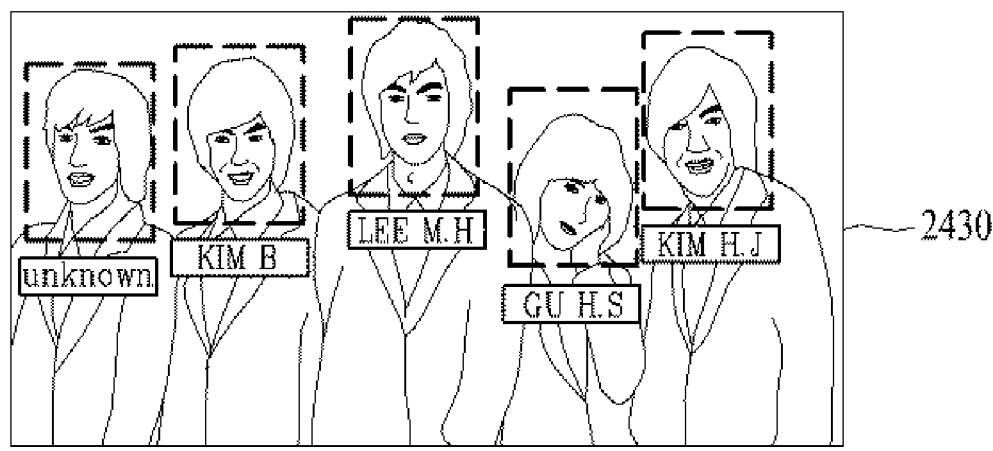

FIG. 24C relates to a description of an event in accordance with an object identified by keyword or iris recognition. In this case, the keyword may include one of a specific character, a face of a specific object and the like. In particular, if it is recognized that a specific object is included in a plurality of objects displayed on a display unit using the iris or keyword recognition, it may become an event.

Referring to FIG. 24C, since there occurs an event 2430 indicating that a face of a specific object is included, a holography function set for this may be activated.

Figure 24D:
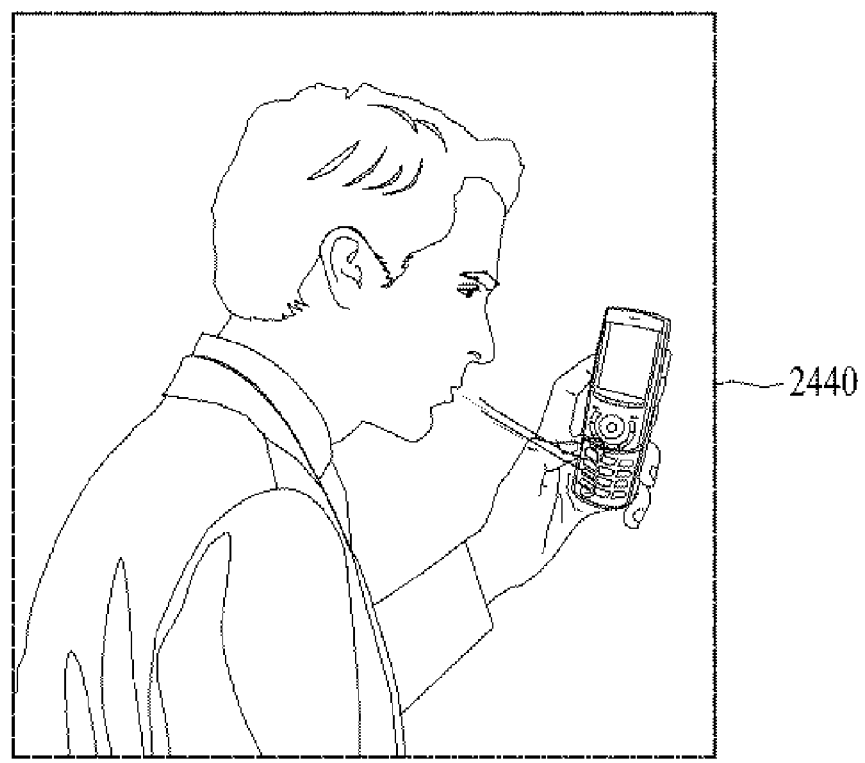

FIG. 24D relates to a description of an event in accordance with wind recognition.

The event in accordance with the wind recognition may utilize a force of wind blown by a user or a pattern of wind blown by a user as an event.

Referring to FIG. 24D, a holography function set in accordance with a force 2440 of wind blown by a user is activated.

Meanwhile, an event in accordance with eye-tracking recognition may be utilized.

Figure 24E:
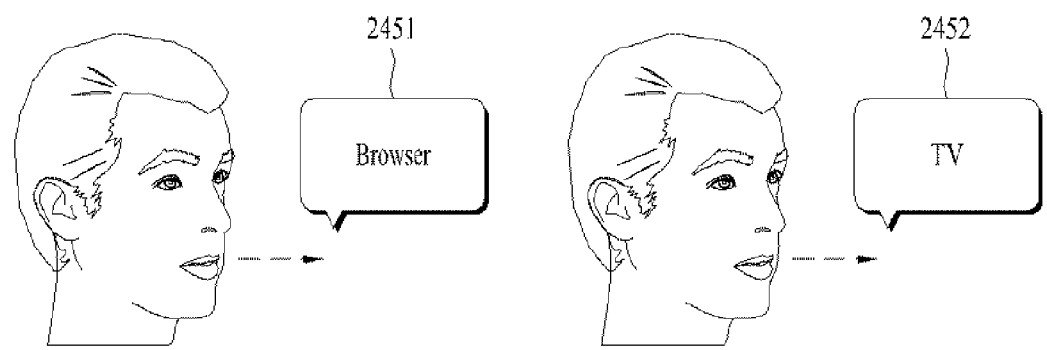
Figure 24F:
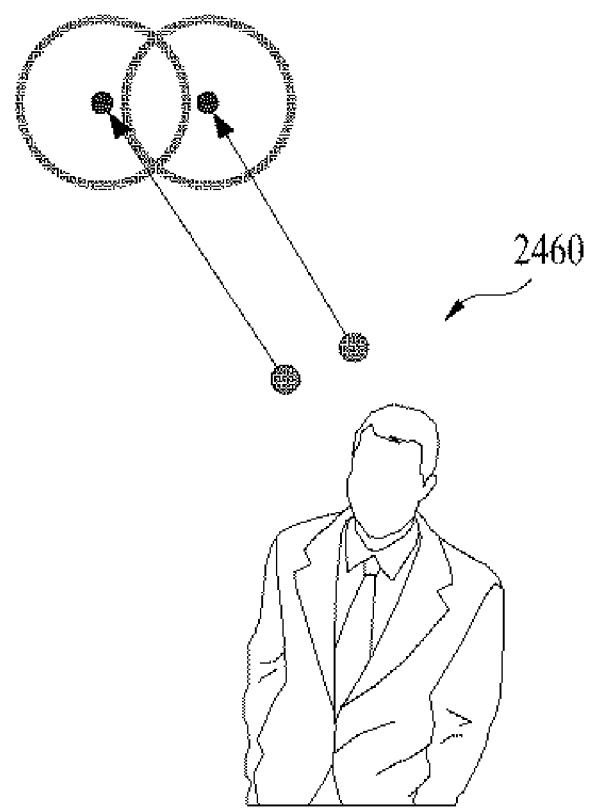

Referring to FIG. 24E, after a terminal has recognized eye-tracking of a user, a count of user's eye blinks or a pattern of user's eye blinks may be used as an event 2460.

Moreover, a gyro-sensor using event may be utilized. In particular, since a gyro-sensor is capable of recognizing the variation of motion or inclination of a terminal, an event in accordance with a count or force of motion of shaking a terminal by a user, an event in accordance with an angle or force of inclining a terminal by a user and the like may be included in the sensor recognition based events.

Figure 24G:
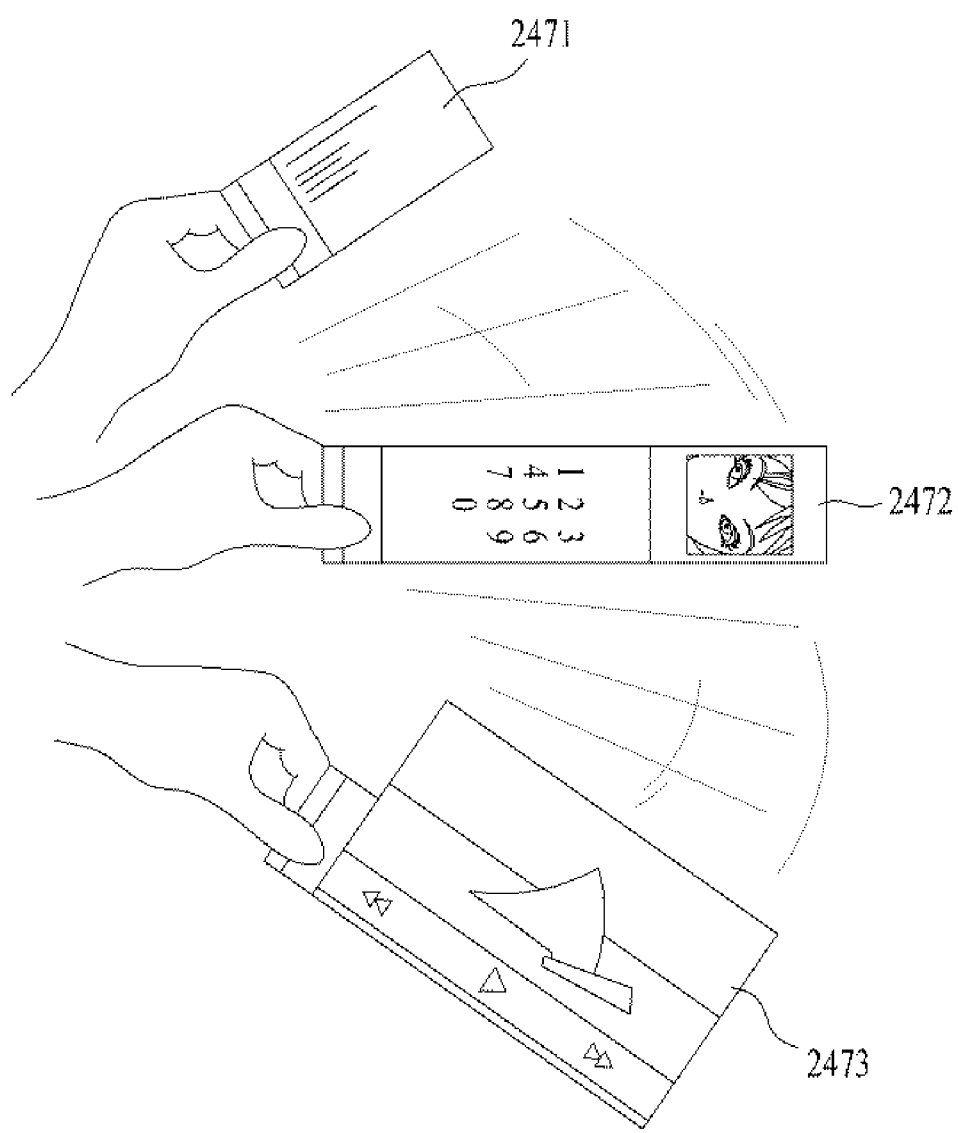

Referring to FIG. 24G, since a position of a terminal is changed into a position 2473 from a position 2471 via a position 2472, a holography function set to correspond to a variation of this inclination may be activated.

In the following description, one example of activating a holography function via the above-mentioned sensor recognition based event is explained in detail.

FIG. 25 is a diagram for describing an event in accordance with voice recognition among sensor recognition based events according to one embodiment of the present invention.

Figure 25A:
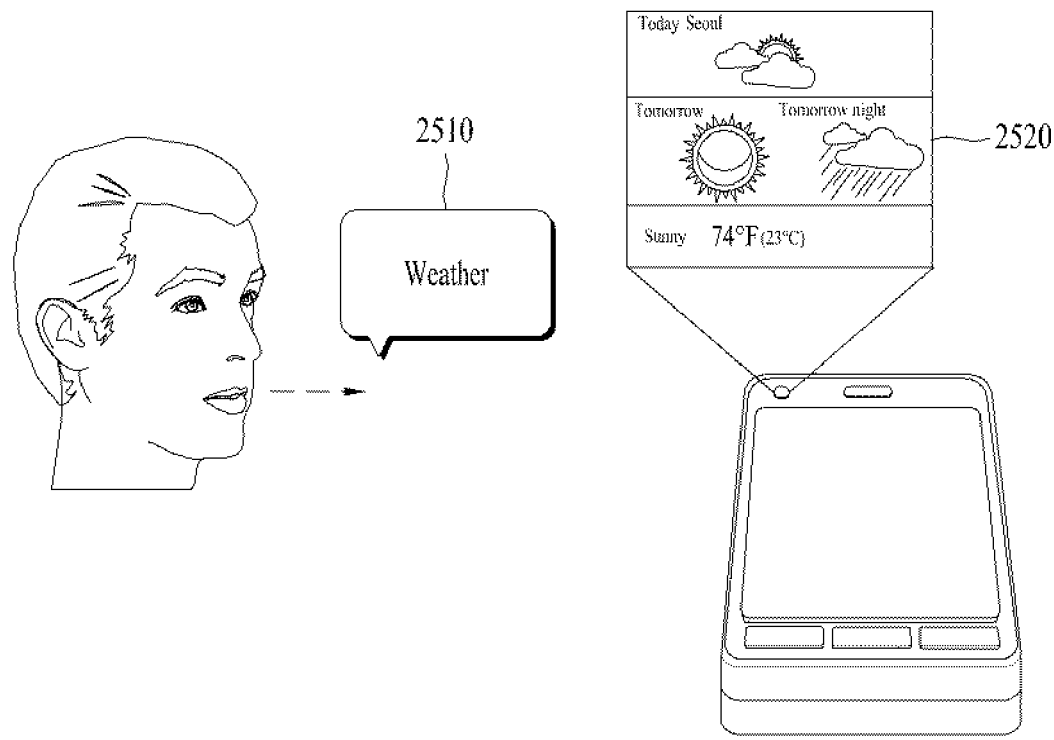
FIGS. 25A-25B are diagrams for describing an event in accordance with voice recognition among sensor recognition based events according to one embodiment of the present invention.

Referring to FIG. 25A, the terminal may receive an input of a voice 'weather' 2510 from a user. The controller 180 analyzes the recognized voice and then activates a weather application. Moreover, the controller 180 controls a result of the activated weather application to be projected as a holography image 2520.

Figure 25B:
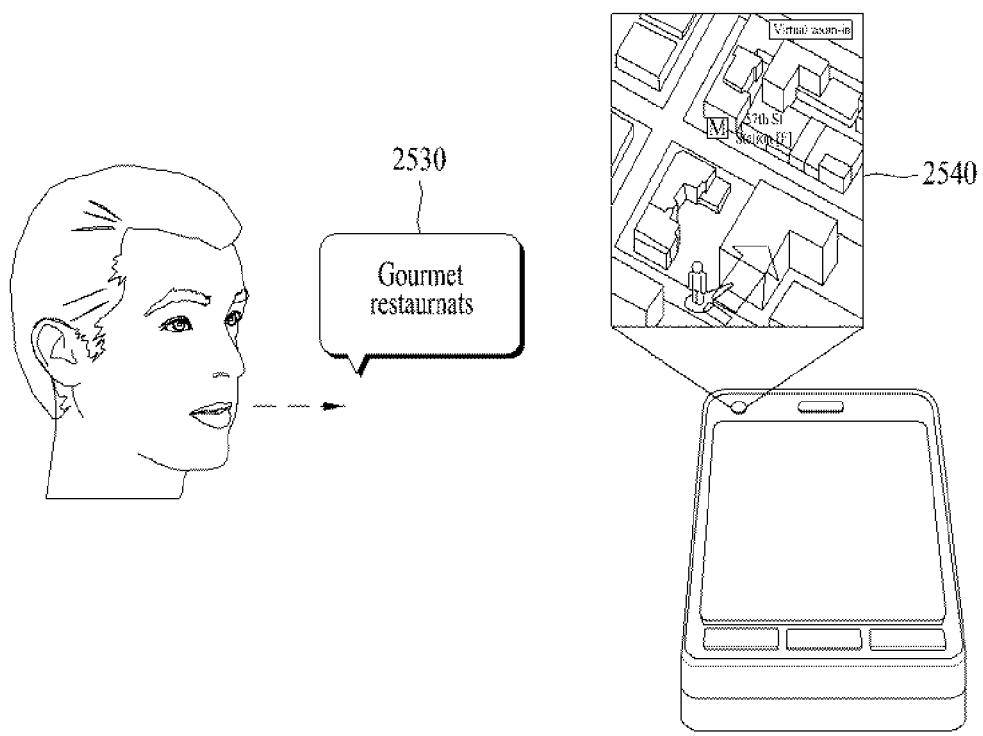

Referring to FIG. 25B, the terminal may receive an input of a voice 'gourmet restaurants' 2530 from a user. The controller 180 analyzes the recognized voice and then activates a previously set map application. Moreover, the controller 180 controls a result of the activated map application to be projected as a holography image 2540.

FIG. 26 is a diagram for describing an event in accordance with eye-tracking recognition among sensor recognition based events according to one embodiment of the present invention.

Figure 26A:
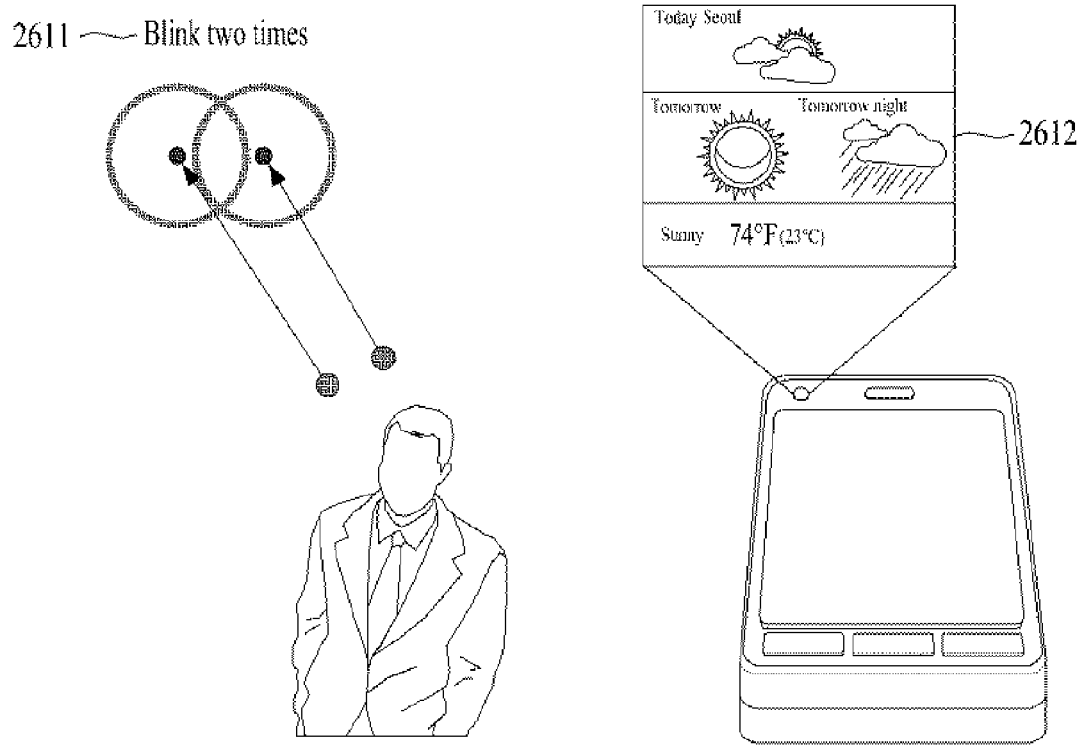
FIGS. 26A-26B are diagrams for describing an event in accordance with eye-tracking recognition among sensor recognition based events according to one embodiment of the present invention.

Referring to FIG. 26A, after the terminal has recognized user's eye tracking, it may be able to recognize that the user has blinked two times 2611. Subsequently, the controller 180 analyzes the recognized two eye blinks and then activates a previously set weather application. Moreover, the controller 180 controls a result of the activated weather application to be projected as a holography image 2612.

Figure 26B:
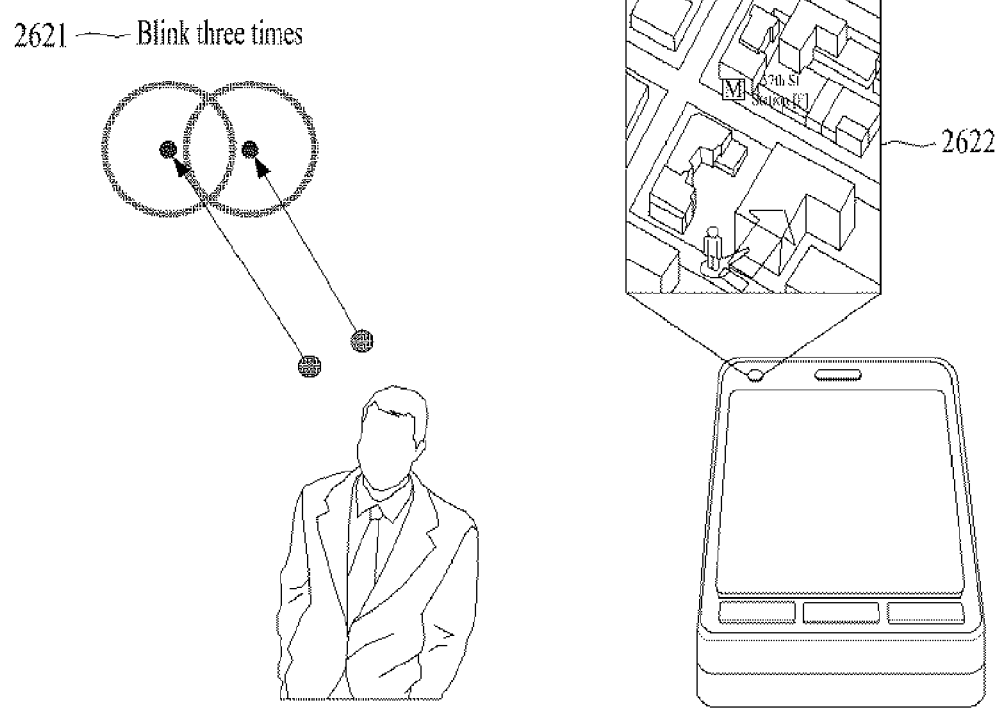

Referring to FIG. 26B, after the terminal has recognized user's eye tracking, it may be able to recognize that the user has blinked three times 2621. Subsequently, the controller 180 analyzes the recognized three eye blinks and then activates a previously set map application. Moreover, the controller 180 controls a result of the activated map application to be projected as a holography image 2622.

Figure 27:
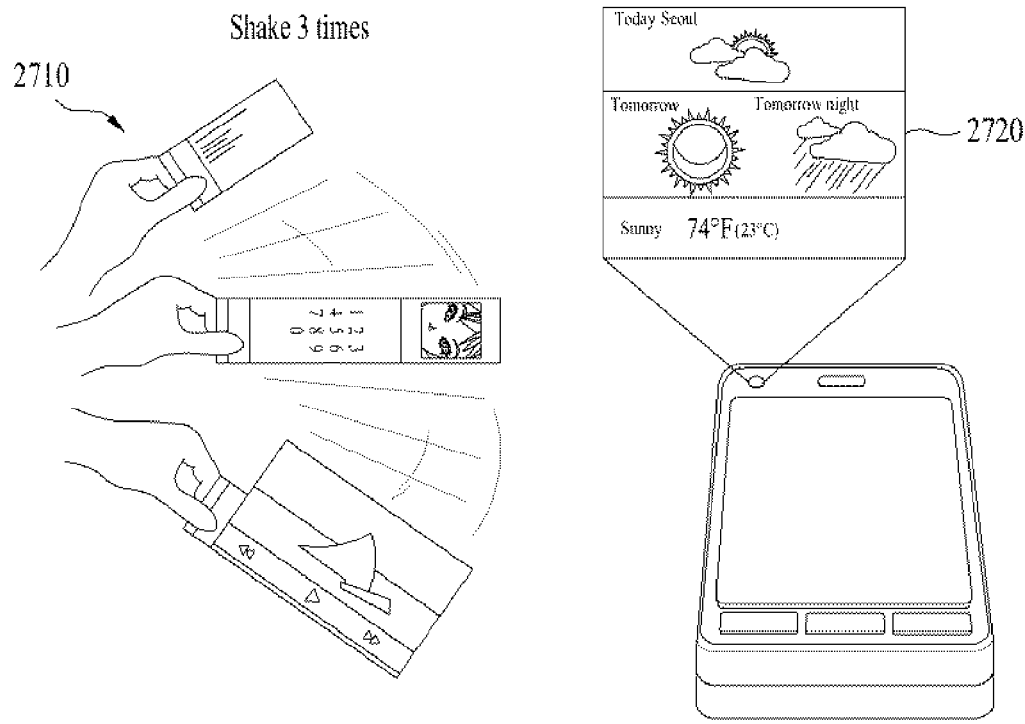
FIG. 27 is a diagram for describing an event in accordance with motion or inclination variation of a terminal among sensor recognition based events according to one embodiment of the present invention.

FIG. 27 is a diagram for describing an event in accordance with motion or inclination variation of a terminal among sensor recognition based events according to one embodiment of the present invention.

Referring to FIG. 27, the sensing unit 140 recognizes that the terminal has been shaken three times. Accordingly, the controller 180 activates a previously set weather application.

Moreover, the controller 180 controls a result of the activated weather application to be projected as a holography image 2720.

Figure 28:
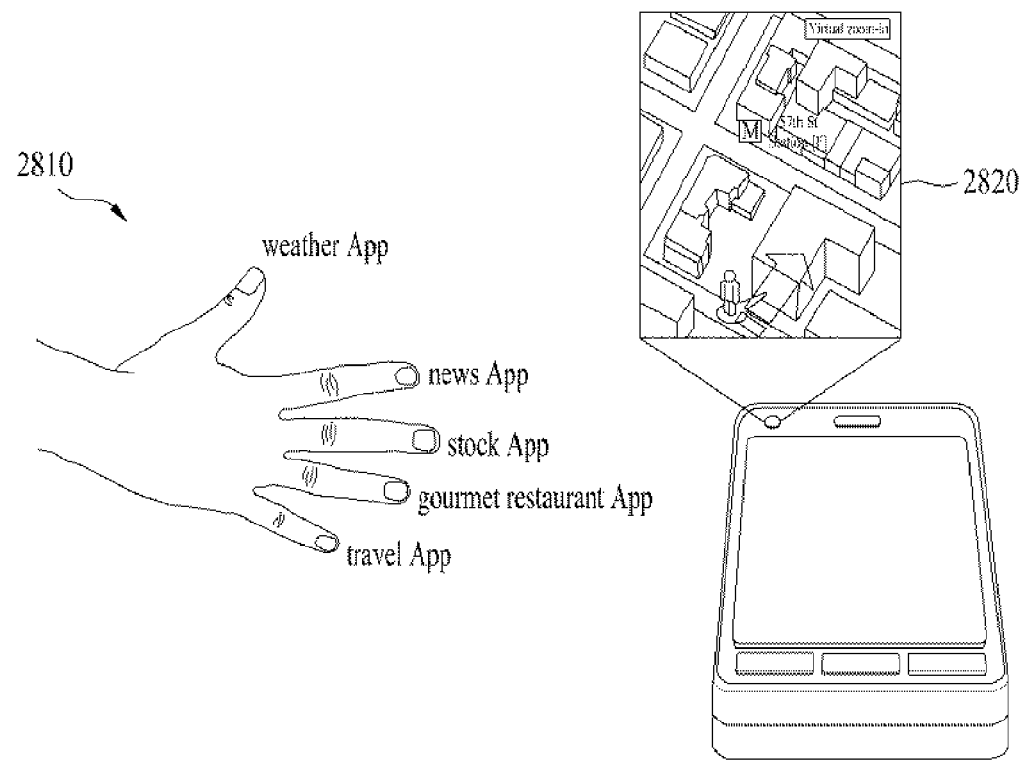
FIG. 28 is a diagram for describing an event in accordance with fingerprint recognition among sensor recognition based events according to one embodiment of the present invention.

FIG. 28 is a diagram for describing an event in accordance with fingerprint recognition among sensor recognition based events according to one embodiment of the present invention.

Referring to FIG. 28, assume that a thumb, an index finer, a middle finger, a ring finger and a little finger of a user are designated to correspond to a weather application, a news application, a stock application, a gourmet restaurant application and a travel application, respectively.

The user may input a fingerprint of the thumb to a fingerprint recognizer of a film type implemented on a prescribed region of the touchscreen. Accordingly, the controller 180 activates a previously set weather application. Moreover, the controller 180 controls a result of the activated weather application to be projected as a holography image 2820.

Meanwhile, a holography function settable via a sensor recognition based event may be set to implement a holography background image.

This is described with reference to FIG. 29 as follows.

FIG. 29 is a diagram for one example of setting a holography background based on a sensor recognition based event according to one embodiment of the present invention.

Referring to FIG. 29, assume that a thumb, an index finer, a middle finger, a ring finger and a little finger of a user are designated to correspond to a weather application, a gourmet restaurant application, a news application, a stock application and a travel application, respectively.

And, assume that a fingerprint recognizer of a film type is implemented on a prescribed region of the touchscreen.

Figure 29A:
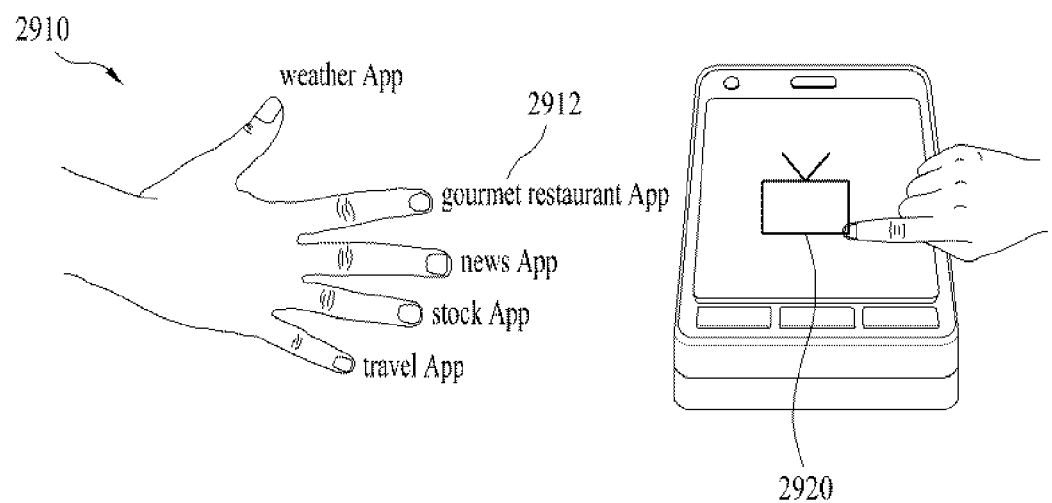
FIGS. 29A-29B are diagrams for one example of setting a holography background based on a sensor recognition based event according to one embodiment of the present invention.
Figure 29B:
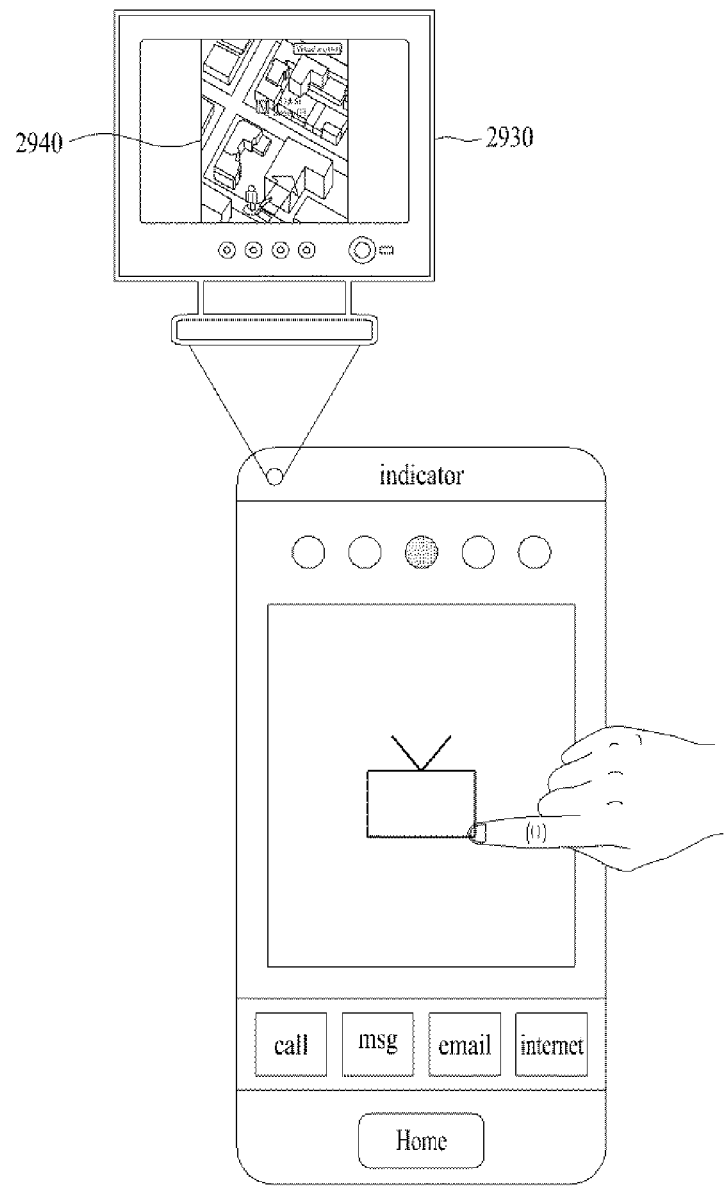

Referring to FIG. 29A, a user may be able to input a 1st shape 2920 to the touchscreen using the index finger 2912 among all fingers 2910.

The controller 180 simultaneously recognizes a fingerprint of the index finger 2912 and the 1st shape 2920, activates the gourmet restaurant application corresponding to the fingerprint of the index finger 2912, and then projects a corresponding result as a holography image 2940. In doing so, referring to FIG. 29B, the controller 180 may control the holography image 2940 in accordance with the gourmet restaurant application to be projected together with a holography background 2930 in a manner of being included in a prescribed region of a holography background 2930 corresponding to the 1st shape 2920.

Meanwhile, a user may control a holography image projected based on a sensor recognition based event.

In particular, in case that there occurs one of an event in accordance with motion or inclination variation of a terminal based on a gyro-sensor, an event in accordance with a touch input of a specific pattern, an event in accordance with fingerprint recognition, an event in accordance with voice or speech recognition, an event in accordance with eye-tracking recognition, an event in accordance with wind recognition, and an event in accordance with an object identified via keyword or iris recognition, the controller may project a holography image, enlarge/reduce a projected holography image, switch an item of a projected holography image, and/or change a background color.

FIG. 30 is a diagram for one example of controlling a projected holography image based on a sensor recognition based event according to one embodiment of the present invention.

Figure 30A:
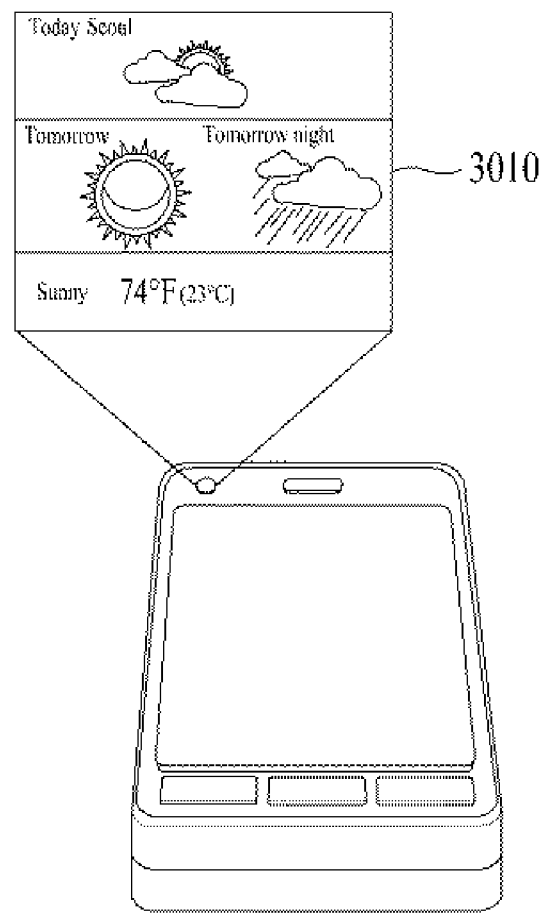
FIGS. 30A-30C are diagrams for one example of controlling a projected holography image based on a sensor recognition based event according to one embodiment of the present invention.

Referring to FIG. 30A, an activated result of a weather application is projected as a holography image 300.

Figure 30B:
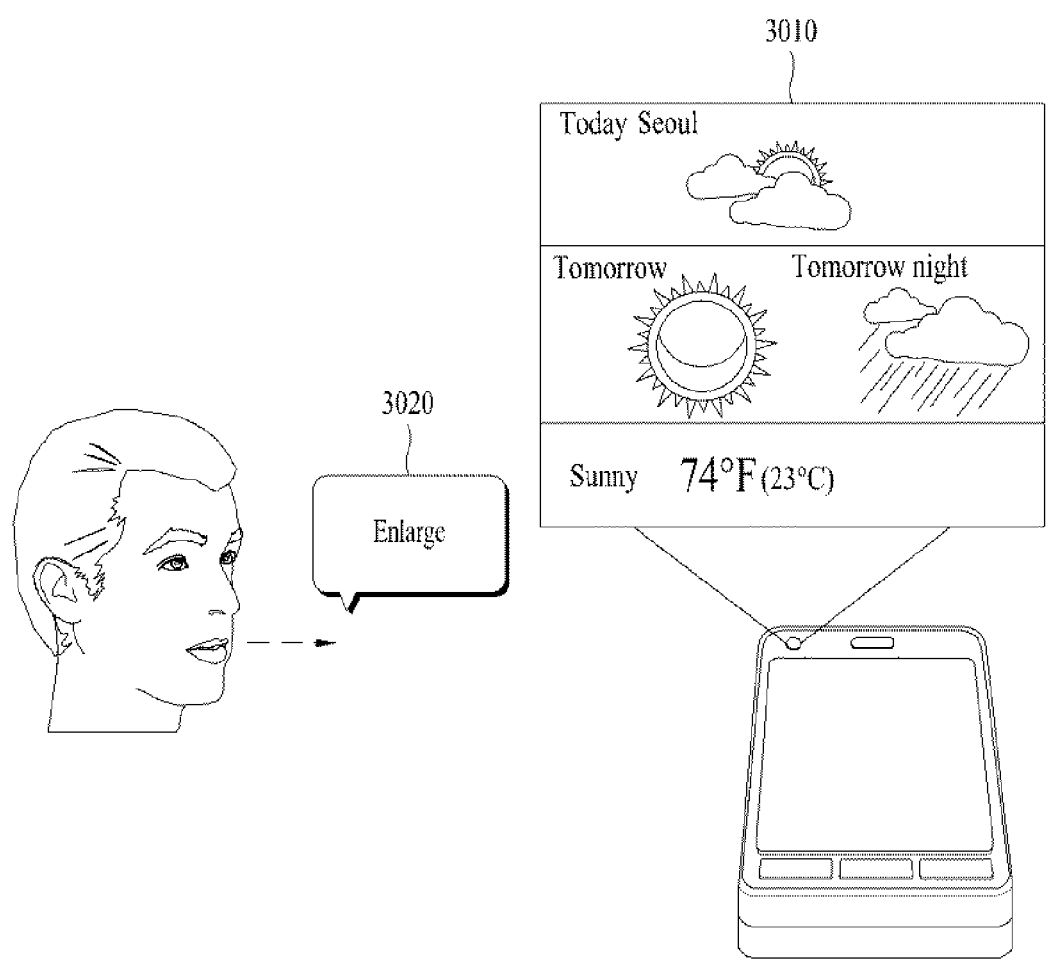

In doing so, referring to FIG. 30B, a user may be able to input a voice 'enlarge' 3020. And, the controller 180 correspondingly increases a size of the projected holography image 3010 at a preset ratio.

Figure 30C:
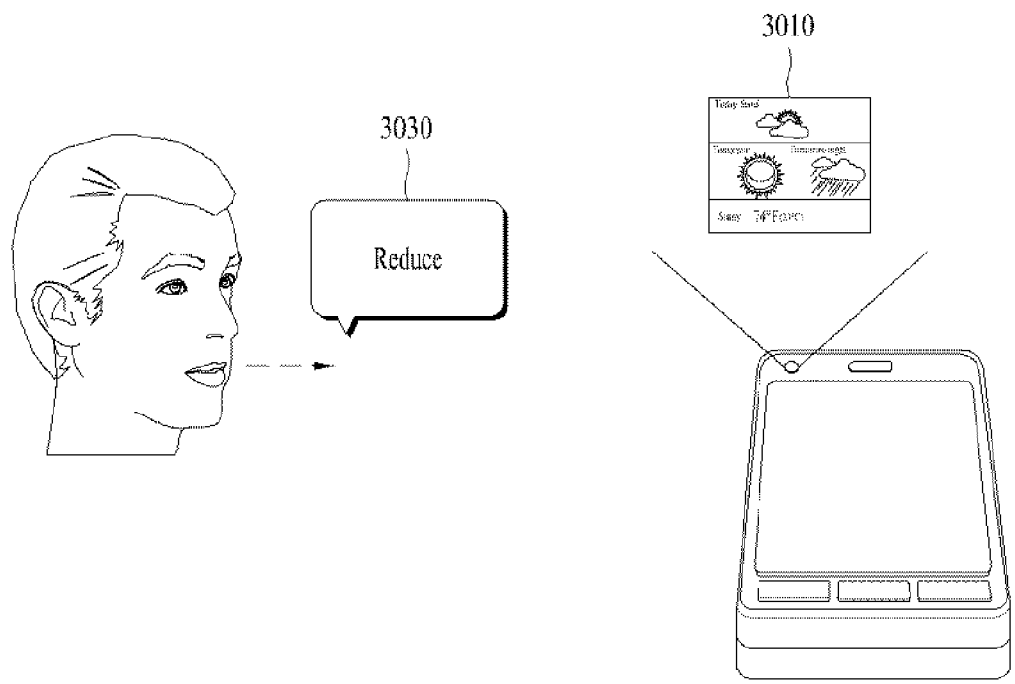

Alternatively, referring to FIG. 30C, a user may be able to input a voice 'reduce' 3030. And, the controller 180 correspondingly decreases a size of the projected holography image 3010 at a preset ratio.

Therefore, the user may be able to conveniently control a projected holography image based on a sensor recognition based event.

Meanwhile, according to the present invention, the above-described methods can be implemented in a program recorded medium as computer-readable codes. Computer-readable media include ROM, RAM, CD-ROM, magnetic tapes, floppy discs, optical data storage devices, and the like for example and also include carrier-wave type implementations (e.g., transmission via Internet).

The aforementioned embodiments for a mobile terminal including a display unit configured to display a stereoscopic image are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention may be applicable to such a system as a terminal, implemented as a multimedia player provided with composite functions such as photographing of photos or videos, playback of music or video files, game play, broadcast reception and the like for example. In particular the present invention may be applicable to a wireless mobile communication apparatus used for a cellular system.

The invention claimed is:
1. A mobile terminal comprising:
a user input unit;
a touchscreen;
a controller;
a holography storing medium configured to record an interference pattern generated by interference of light;
a holography output module configured to output a first holography image attributed to diffraction between the light applied to the holography storing medium and the interference pattern under the control of the controller; and
a sensing unit configured to detect a plurality of recognition based events,
wherein if at least one holography function corresponding to each of a plurality of the recognition based events is previously designated via the user input unit and a first event among a plurality of the recognition based events is detected via the sensing unit, the controller controls the first holography image to be outputted in accordance with a first holography function corresponding to the first event, wherein a plurality of the recognition based event comprise a shape recognition based event, a docking recognition based event and a sensor recognition based event, wherein the shape recognition based event is based on an event of inputting a shape via the touchscreen, wherein the docking recognition based event is based on an event of fixing a location of the mobile terminal over preset duration, and wherein the sensor recognition based event is based on an event recognized by each of a plurality of sensors included in the sensing unit.

2. The mobile terminal of claim 1, wherein the shape inputted via the touchscreen in the shape recognition based event comprises a dot, a line and a closed curve shape.

3. The mobile terminal of claim 1, wherein the at least one holography function comprises at least one selected from the group consisting of a content setting function for the first holography image, a pattern setting function for the first holography image and a holography background setting function for the first holography image.

4. The mobile terminal of claim 3, wherein at least one of a plurality of contents and applications is set as a content for the first holography image through the content setting function.

5. The mobile terminal of claim 3, wherein the holography pattern set via the pattern setting function is determined by at least one of a distance difference between the holography output module and the first holography image and a shape of the first holography image and wherein each of the distance difference and the shape of the first holography image is variable in accordance with time.

6. The mobile terminal of claim 3, wherein the holography pattern set via the pattern setting function is determined by at least one selected from the group consisting of shift, rotation, color change, size change and flickering of the first holography image and wherein each of the shift, the rotation, the color change, the size change and the flicking is variable in accordance with time.

7. The mobile terminal of claim 3, wherein the first holography image is outputted by being included in a first region within the holography background through the holography background setting function.

8. The mobile terminal of claim 7, wherein the controller partitions the first region into a plurality of regions by a command inputted via the user input unit and wherein the controller controls the first holography image to be included in each of a plurality of the regions.

9. The mobile terminal of claim 1, further comprising a wireless communication unit, wherein the controller establishes a data path to at least one external device via the wireless communication unit and wherein the controller controls information on the holography function corresponding to the first event to be transmitted to the at least one external device via the established data path.

10. The mobile terminal of claim 1, wherein if a plurality of holography functions are set to correspond to the first event, wherein the controller displays a first list of a plurality of the holography functions on the touchscreen, and wherein if a prescribed holography function is selected from the first list, the controller controls the first holography image to be outputted in accordance with the selected prescribed holography function.

11. The mobile terminal of claim 1, wherein if the first event is a docking recognition based event, the controller controls a content of the first holography image to be set to an activated result of at least one of a plurality of idle applications previously set to correspond to the first event and wherein a plurality of the idle applications comprise an e-frame idle application, a clock idle application, a schedule idle application, an alarm idle application, an illumination idle application and a CCTV idle application.

12. The mobile terminal of claim 1, wherein the sensor recognition based event comprises a motion recognition event, a specific-pattern touch input recognition event, a fingerprint recognition event, a voice recognition event, an eye-tracking recognition event, a wind recognition event and a specific object recognition event.

13. The mobile terminal of claim 12, wherein the motion recognition event is determined in accordance with at least one selected from the group consisting of an inclination level value of the terminal sensed by the sensing unit, an inclining speed of the terminal sensed by the sensing unit, a moving path of the terminal sensed by the sensing unit, a moving speed of the terminal sensed by the sensing unit, and a count of predetermined section round-trips of the terminal sensed by the sensing unit.

14. The mobile terminal of claim 12, wherein in the specific-pattern touch input recognition event, the specific-pattern touch input comprises one of a long touch input, a proximity touch input, a long proximity touch input and a double touch input.

15. The mobile terminal of claim 1, wherein if the first holography image is outputted in accordance with the holography function corresponding to the first event and a second event among a plurality of the recognition based events is detected via the sensing unit, the controller controls the first holography image to be modified and outputted in accordance with a second holography function corresponding to the second event.

16. The mobile terminal of claim 15, wherein the second holography function comprises a size setting function, a content setting function, a pattern setting function and a holography background setting function for the first holography image.

17. A method of controlling a mobile terminal, the method comprising:

designating at least one holography function corresponding to each of a plurality of recognition based events detected via a sensing unit;

detecting a first event among a plurality of the recognition based events via the sensing unit; and outputting a first holography image from a holography output module in accordance with a first holography function corresponding to the first event, wherein a plurality of the recognition based event comprise a shape recognition based event, a docking recognition based event and a sensor recognition based event, wherein the shape recognition based event is based on an event of inputting a shape via a touchscreen, wherein the docking recognition based event is based on an event of fixing a location of the mobile terminal over preset duration, and wherein the sensor recognition based event is based on an event recognized by each of a plurality of sensors included in the sensing unit.

18. The method of claim 17, wherein the at least one holography function comprises at least one selected from the group consisting of a content setting function for the first holography image, a pattern setting function for the first holography image and a holography background setting function for the first holography image.

19. A mobile terminal comprising:

a user input unit;

a controller;

a holography storing medium configured to record an interference pattern generated by interference of light;

a holography output module configured to output a first holography image and a second holography image attributed to diffraction between the light applied to the holography storing medium and the interference pattern under the control of the controller; and a sensing unit configured to detect a plurality of recognition based events, wherein if at least one holography function corresponding to each of a plurality of the recognition based events is previously designated via the user input unit and a first event among a plurality of the recognition based events is detected via the sensing unit, the controller controls the first holography image to be output in accordance with a first holography function corresponding to the first event, wherein the at least one holography function comprises a holography background setting function for the first holography image and the second holography image, and wherein the holography background setting function is configured to output the first holography image as a content image and independently output the second holography image as a background image of the content image.

* * * * *